US008102877B1

(12) United States Patent
Liu et al.

(10) Patent No.: US 8,102,877 B1
(45) Date of Patent: Jan. 24, 2012

(54) SYSTEMS AND METHODS FOR POLICY-BASED INTELLIGENT PROVISIONING OF OPTICAL TRANSPORT BANDWIDTH

(75) Inventors: Stephen S. Liu, Acton, MA (US); Lily F. Chen, Fort Lee, NJ (US); Dhaval V. Thaker, Temple Terrace, FL (US); Anurag K. Mishra, Tampa, FL (US); William J. Moran, Wesley Chapel, FL (US); Benjamin Pomales, Tampa, FL (US)

(73) Assignee: Verizon Laboratories Inc., Waltham, MA (US)

( * ) Notice: Subject to any disclaimer, the term of this patent is extended or adjusted under 35 U.S.C. 154(b) by 1435 days.

(21) Appl. No.: 11/224,502

(22) Filed: Sep. 12, 2005

Related U.S. Application Data

(60) Provisional application No. 60/608,833, filed on Sep. 10, 2004, provisional application No. 60/635,836, filed on Dec. 14, 2004.

(51) Int. Cl.
*H04J 3/16* (2006.01)
(52) U.S. Cl. .......................... 370/468; 370/255; 370/477
(58) Field of Classification Search .................. None
See application file for complete search history.

(56) References Cited

U.S. PATENT DOCUMENTS

| | | | |
|---|---|---|---|
| 6,741,572 B1 * | 5/2004 | Graves et al. ................. 370/254 |
| 6,931,011 B2 | 8/2005 | Giacopelli et al. |
| 6,985,488 B2 * | 1/2006 | Pan et al. .................... 370/395.3 |
| 7,069,326 B1 | 6/2006 | Bush |
| 7,209,964 B2 | 4/2007 | Dugan et al. |
| 7,215,644 B2 * | 5/2007 | Wu et al. ...................... 370/248 |
| 7,321,932 B1 * | 1/2008 | Monga et al. ................. 709/227 |
| 7,366,768 B2 | 4/2008 | Deo et al. |
| 7,400,583 B2 * | 7/2008 | Friskney et al. .............. 370/235 |
| 7,437,449 B1 * | 10/2008 | Monga et al. ................. 709/224 |
| 7,492,714 B1 * | 2/2009 | Liao et al. .................... 370/235 |
| 7,570,886 B1 | 8/2009 | Afferton et al. |
| 7,599,373 B1 * | 10/2009 | Kalmanek et al. ......... 370/395.1 |
| 7,733,870 B1 * | 6/2010 | Liu et al. .................... 370/395.2 |
| 7,778,236 B2 * | 8/2010 | Yu ................................. 370/351 |
| 2003/0137937 A1 * | 7/2003 | Tsukishima et al. .......... 370/230 |
| 2003/0206552 A1 | 11/2003 | Lohr |
| 2005/0008014 A1 * | 1/2005 | Mitra et al. .................... 370/392 |
| 2005/0073955 A1 * | 4/2005 | MacLean et al. ............. 370/235 |
| 2006/0002705 A1 | 1/2006 | Cline et al. |
| 2007/0201366 A1 | 8/2007 | Liu |
| 2008/0317465 A1 | 12/2008 | Yu |

OTHER PUBLICATIONS

Mannie, E., "Generalized Multi-Protocol Label Switching Architecture," IETF, Internet Draft draft-ietf-ccamp-gmpls-architecture-xx.txt, 2003.
"Generic Framing Procedure (GFP)", ITU-T 0.7041/Y.1303, International Telecommunication Union, Dec. 2001.
"Architecture for the Automatic Switched Optical Network (ASON)," ITU-T Recommendation G.8080, 2001.

(Continued)

*Primary Examiner* — Michael J Moore, Jr.

(57) ABSTRACT

Policy-based, on-demand provisioning of optical transport bandwidth is disclosed. In one of many possible embodiments, a system is provided for policy-based, on-demand provisioning of optical transport bandwidth. The system includes a layer-specific operation support subsystem (OSS) configured to manage network elements that form a sub-network over an optical transport network. The optical transport network provides bandwidth-on-demand provisioning capabilities. The layer-specific OSS includes one or more predefined bandwidth provisioning policies. The layer-specific OSS is configured to selectively request on-demand provisioning of bandwidth on the sub-network based on the predefined bandwidth provisioning policies.

30 Claims, 33 Drawing Sheets

OTHER PUBLICATIONS

"ITU-T G.7042/Y.1305: Link Capacity Adjustment Scheme (LCAS) for Virtual Concatenated Signals", International Telecommunication Union, Nov. 2001.

"Multi-Technology Network Management Solution Set—NML-EML Interface V.2.0", TeleManagement Forum (TMF), TMF 814, Aug. 2002.

"NGOSS Requirements Technical Specification", TeleMangement Forum (TMF), TMF 052, Jul. 2001.

"ITU-T G.707/Y.1322: Network Node Interface for the Synchronous Digital Hierarchy (SDH)", International Telecommunication Union, Oct. 2000.

"User Network Interface (UNI) 1.0 Signaling Specification, Release 2: Common Part", Optical Internetworking Forum, Jan. 21, 2004.

IETF, Internet Draft draft-ietf-ccamp-gmpls-architecture-xx.txt, "Generalized Multi-Protocol Label Switching Architecture," 2003.

ITU-T Recommendation G.707, G.7041 & G.7042, These ITU documents cover NG-SONET GFP, VCAT, and LCAS signaling specification, 2001.

ITU-T Recommendation G.8080, "Architecture for the Automatic Switched Optical Network (ASON)," 2001.

OIF UNI 1.0 Release 2 Implementation Agreement, "User Network Interface (UNI) 1.0 Signaling Specification, Release 2," 2003.

TeleManagement Forum (TMF), TMF 814, "Multi-Technology Network Management Solution Set—NML-EML Interface V.2.0", Jul. 2001.

TeleMangement Forum (TMF), TMF 052, "NGOSS Requirements Technical Specification", Jul. 2001.

Huawei Technologies Co., "Proposal of the generic RACS functional architecture", ETSI TISPAN, No. 4td170r1, Sep. 13, 2004, pp. 1-5, XP002424685.

ETSI Standards, "NGN Functional Architecture", European Telecommunications Standards Institute, Sophia-Antipo, FR, No. V 110, Dec. 2004, pp. 1-23, XP014023277.

ITU WG3: "Revision 1 of TR-RACS, FGNGN-OD-00074" ITU-T Internal Document, International Telecommunication Union, Geneva, CH, Dec. 3, 2004, pp. 1-22, XP002424686.

* cited by examiner

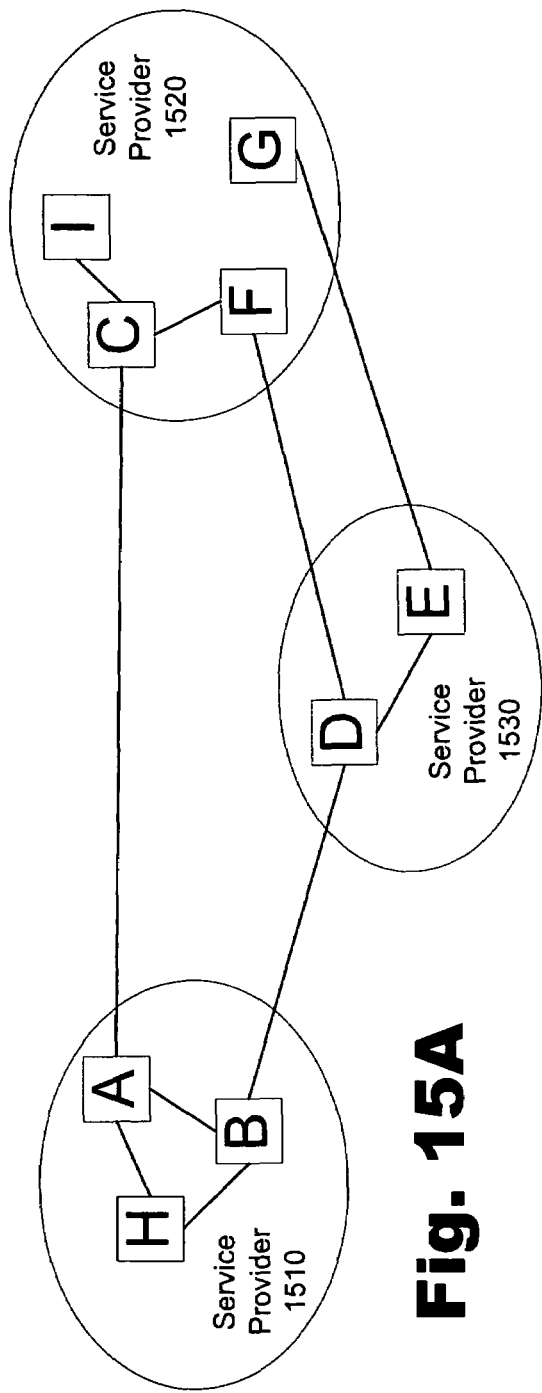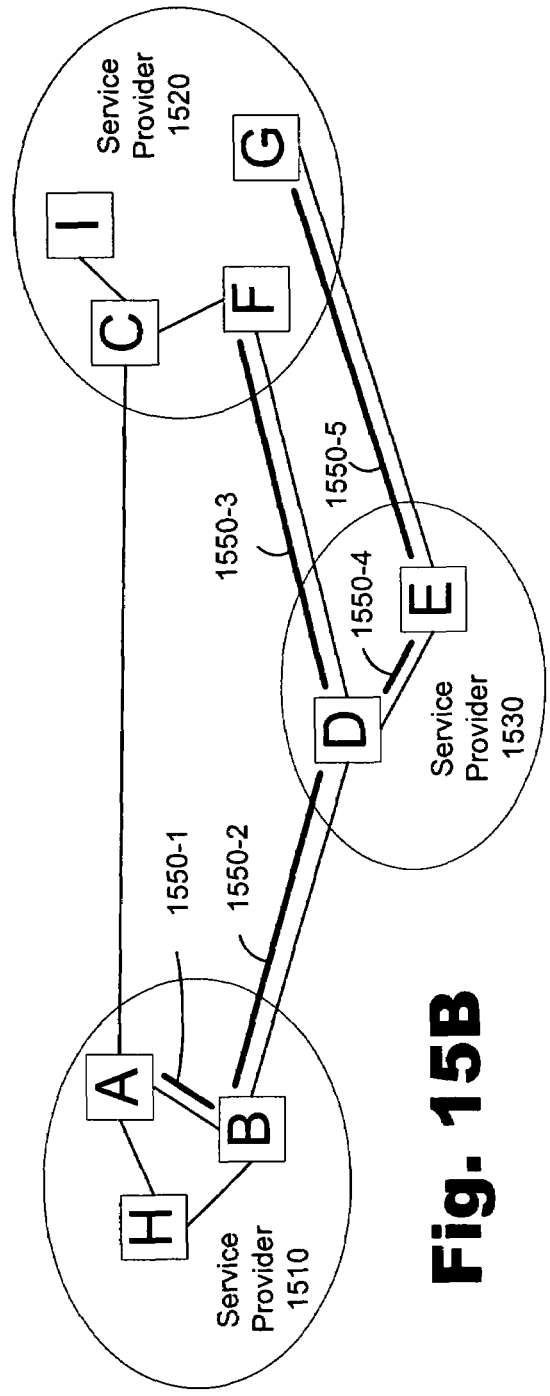
Fig. 15A
Fig. 15B

SYSTEMS AND METHODS FOR POLICY-BASED INTELLIGENT PROVISIONING OF OPTICAL TRANSPORT BANDWIDTH

RELATED APPLICATIONS

The present application claims priority under 35 U.S.C. §119(e) to both U.S. Provisional Patent Application Ser. No. 60/608,833, by Stephen Shyan-Shiang Liu et al., filed on Sep. 10, 2004, and entitled BANDWIDTH-ON-DEMAND SYSTEMS AND METHODS and U.S. Provisional Patent Application Ser. No. 60/635,836, by Stephen Shyan-Shiang Liu et al., filed on Dec. 14, 2004, and entitled SYSTEMS AND METHODS FOR POLICY-BASED INTELLIGENT PROVISIONING OF OPTICAL TRANSPORT BANDWIDTH, the contents of which are hereby incorporated by reference in their entireties.

The contents of U.S. patent application entitled BANDWIDTH-ON-DEMAND SYSTEMS AND METHODS, filed concurrently herewith in the name of Stephen Shyan-Shiang Liu et al., are hereby incorporated by reference in their entirety.

BACKGROUND INFORMATION

Optical transport core networks are used to transmit voice, data, video, multimedia, and other forms of communication services. In the past, different communication services (e.g., voice and data) were delivered over core networks by distinct dedicated transport networks that were separately managed and operated. However, the dedicated transport networks were complex and required excessive manpower to operate. Moreover, the use of dedicated transport networks to deliver different services resulted in inefficient utilization of network resources.

More recently, packet-based, converged, multi-service networks (P-CMSNs) have been introduced for transporting mixed types of services. Compared with the costs associated with dedicated transport networks, P-CMSNs afford service providers savings in both capital and operating expenses.

For P-CMSNs to successfully support mixed communication services, several basic requirements should be satisfied. For example, the mixed services may include different classes of service, each of which has a specific set of quality-of-service (QoS) requirements. The P-CMSNs should provide adequate levels of QoS for the different classes of service. For example, adequate QoS levels should be provided to allow service providers to guarantee QoS for premium services. Maintaining QoS requirements usually entails the use of techniques designed to provide adequate monitoring and control of QoS parameters such as end-to-end latency, end-to-end jitter, and packet loss associated with transporting communication services.

Unfortunately, P-CMSNs include characteristics that form obstacles to the successful adherence to QoS requirements. For example, packet-based networks conventionally adopt highly distributed dynamic routing mechanisms, which often and unexpectedly redistribute traffic loads over the packet-based networks, based on unscheduled network events, such as congestions or faults. This causes routing instability and makes traffic loads and patterns very difficult to predict in packet-based networks. In addition, existing techniques for predicting and characterizing network traffic load congestions are not suited for modeling aggregate packet traffic from multiple sources. Because of the unpredictable routing nature of P-CMSNs, and the lack of suitable traffic engineering tools, service providers cannot reliably guarantee QoS levels for premium services carried by P-CMSNs, which results in lost revenues, customer dissatisfaction, or both.

Because maintaining QoS is a challenge to the implementation of a P-CMSN, attempts have been made to circumvent the QoS issue. For example, intelligent queuing mechanisms have been implemented at egress ports of P-CMSN packet routers to manage the flow of packet data over the networks. While these queuing mechanisms can accommodate routine fluctuations of traffic demand as well as many unexpected network events, the complexity of the mechanisms renders them difficult to implement and manage. Because the queuing mechanisms should be implemented at the egress port for every router in the P-CMSN in order to be effective, the complexity of implementing and managing the mechanisms makes them impractical to implement over wide area networks. Moreover, there is no guarantee that the queuing mechanisms can prevent congestion caused by unforeseen network events.

Another approach for circumventing the QoS issue can be referred to as "over-engineering" the network. This term refers to a technique used to control the utilization rates of links of the network. In general, when the utilization of a link exceeds a certain threshold, the link will become congested and QoS will begin to deteriorate. To prevent the link utilization rate from exceeding the threshold, excess bandwidth is permanently provisioned so that even peak traffic loads are not likely to exceed the threshold. However, this approach is not practical or cost-effective, especially for wide area networks, because the extra bandwidth (which may be 30% to 50% of the total bandwidth) is not used to generate revenue during non-peak traffic flow patterns. Consequently, the total costs of services are increased.

The above-described approaches for circumventing the QoS issue, when used either alone or in combination, have not been able to overcome their inherent limitations. Consequently, conventional techniques for implementing P-CMSNs do not reliably, efficiently, or cost-effectively maintain and deliver desired QoS levels for communication services transmitted over the P-CMSNs.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 15A is a block diagram illustrating a meshed peering arrangement between several service providers, according to one embodiment.

FIG. 15B is a block diagram illustrating the meshed peering arrangement of service providers of FIG. 15A with additional bandwidth provisioned at select links of the peering arrangement, according to one embodiment.

DETAILED DESCRIPTION OF PREFERRED EMBODIMENTS

I. Introduction

The disclosed methods and systems for policy-based intelligent on-demand provisioning of optical transport bandwidth support the maintenance of quality-of-service (QoS) levels for services over packet-based converged multi-service packet networks (P-CMSNs). Predefined policies, such as service-provisioning policies and/or QoS-triggered provisioning policies, are employed to selectively and intelligently initiate on-demand provisioning of optical transport bandwidth. The systems and methods support network functional-layer services, including wide-area virtual local area (W-VLAN) network services over optical transport sub-networks. With the policy-based bandwidth-on-demand capabilities disclosed herein, the present systems and methods provide classes of service capable of offering oversubscription and guaranteed QoS at network layers. These and other functions provided by the present systems and methods will be more apparent from the following discussion.

In the specification and throughout the claims, the term "provisioning" is meant to be understood broadly to include acts performed to provide, remove, or alter bandwidth topology on which network traffic rides, as will be understood by those skilled in the art. Provisioning may include any acts performed to provide, remove, or alter bandwidth, including selection of physical network routes, allocation or de-allocation of hardware, engineering connections between the hardware to form or remove network paths, and activation or deactivation of the network paths.

II. Packet-Based Network Architecture

Figure 1A:
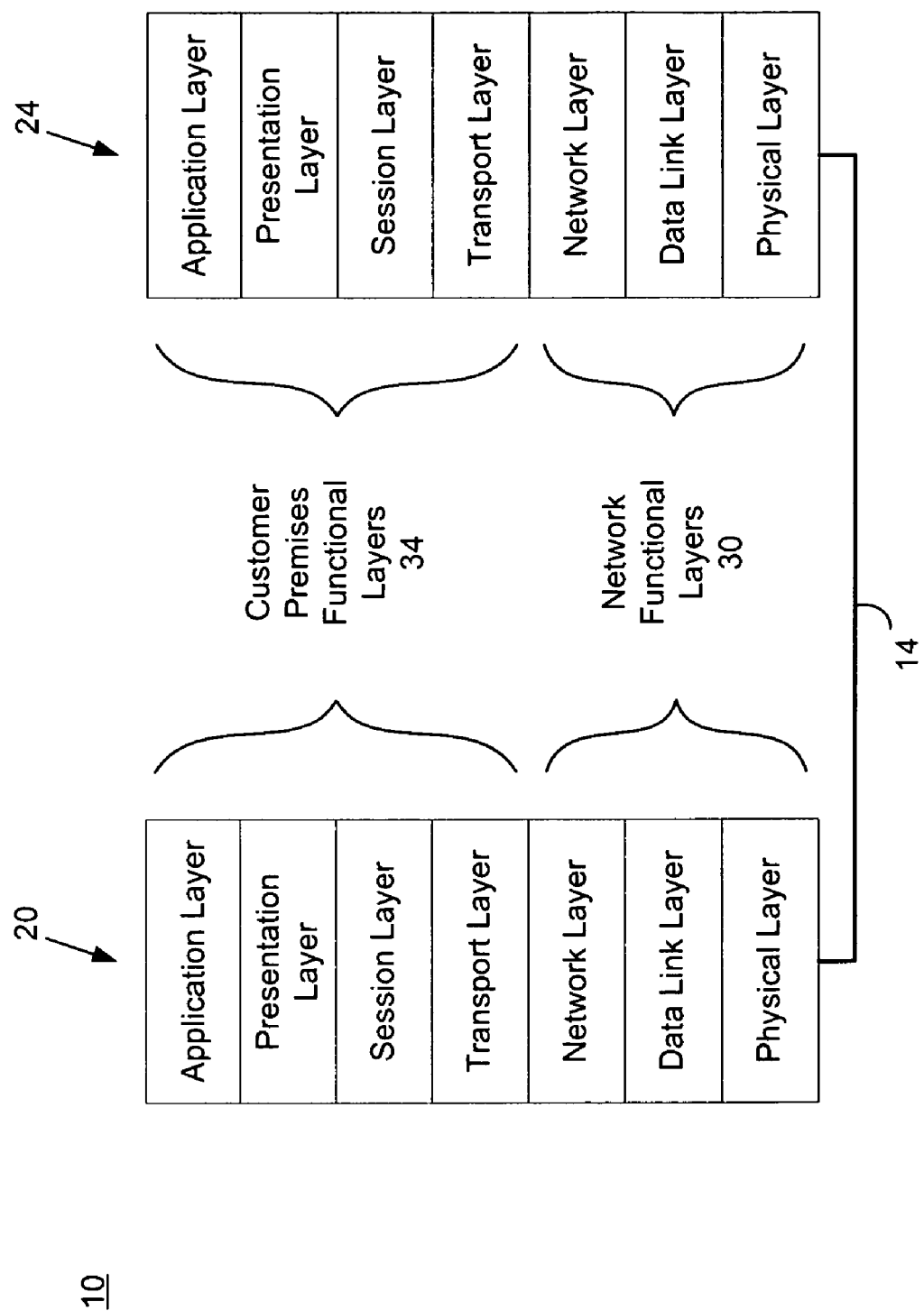
FIG. 1A illustrates a reference model of Open Systems Interconnection (OSI), which has been widely adopted to characterize communication network architectures.

Packet-based networks (e.g., P-CMSNs) are generally based on industry-adopted architecture protocols designed to facilitate the transmission of data packets. For example, FIG. 1A is a reference model of Open Systems Interconnection (OSI) (OSI model 10), which has been widely adopted to characterize communication network architectures. As shown in FIG. 1A, the OSI model 10 consists of seven layers arranged to represent a complete end-user-oriented network architecture. In the OSI model 10, each layer provides a service to the layer above it. For example, the physical layer (which is commonly referred to as "Layer 1") provides a foundation for the communication architecture. All layers above Layer 1 ride on Layer 1 services, which are typically in the form of raw bandwidth. FIG. 1A shows a physical layer path 14 representative of a raw bandwidth medium provided by the physical layer. The physical layer path 14 provides the raw bandwidth for physically connecting two separate points on a network, such as a first network point 20 and a second network point 24 shown in FIG. 1A.

The lower three layers of the OSI model 10 make up a group of layers that provide network functions. The layers of this group can be referred to as network functional layers 30, which are generally responsible for providing network-level services that deliver data to network demark points. The network functional layers 30 can be configured to define a network's transport technology (e.g., a packet-switching technology).

A second group of OSI layers is designed to ensure that data is ultimately delivered to an end-user at the appropriate destination and in the proper format for an end-user application (e.g., voice, video, and data applications). This second group can be referred to as customer premises functional layers 34, which consist of the upper four layers (the application, presentation, session, and transport layers) of the OSI model 10, as shown in FIG. 1A. The customer premises functional layers 34 are configured to adapt end user application data into a format suitable for transmission using the transport technology specified by the network functional layers 30.

Figure 1B:
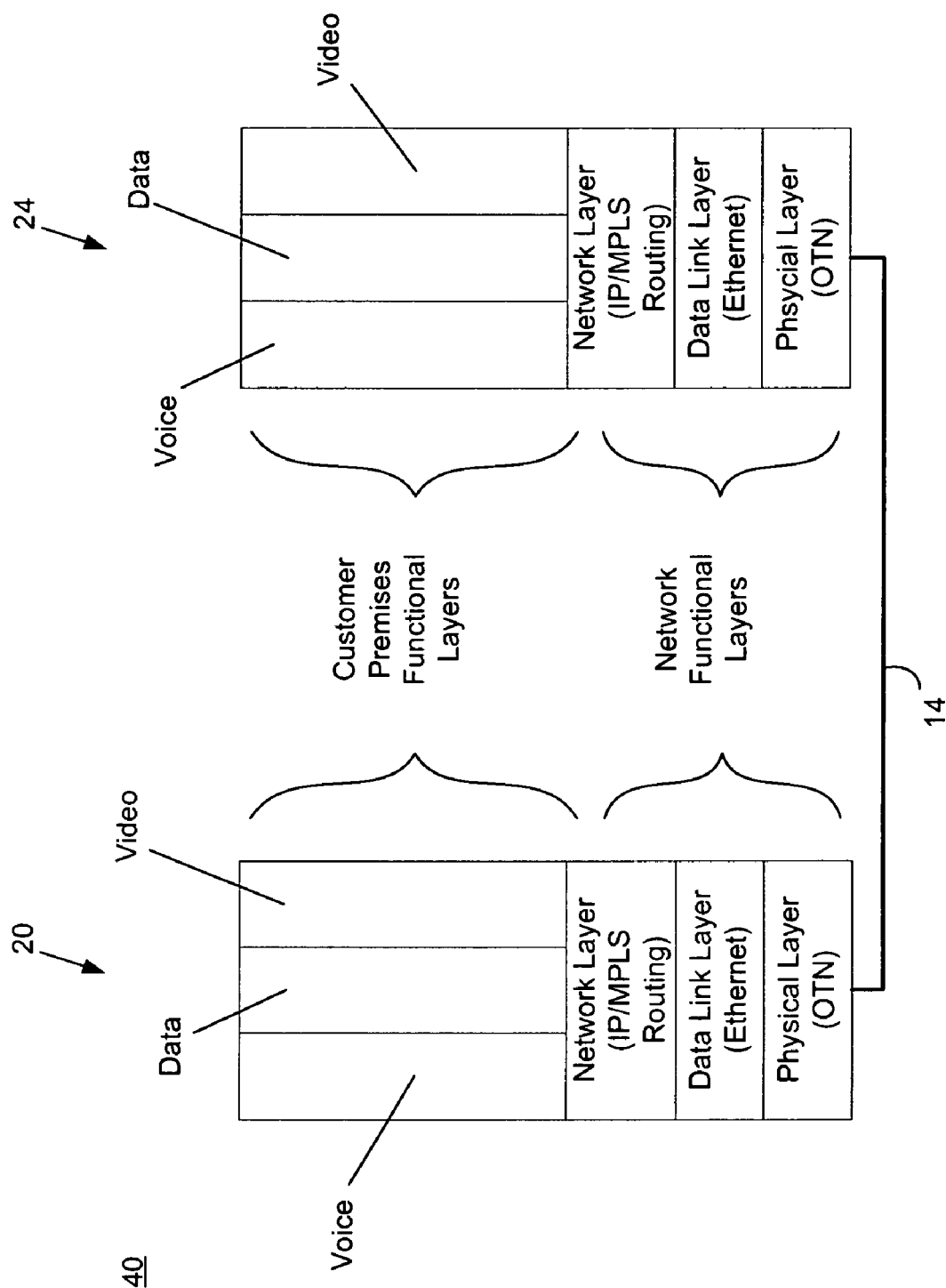
FIG. 1B is a representation of a packet-based, converged multi-service network (P-CMSN) architecture, according to one embodiment.

For packet-based converged multi-service networks (P-CMSNs), information streams generated by end-user services are converted into packet format for transport and delivery using a packet network's transport technology as defined by the network functional layers 30. FIG. 1B illustrates a representation of a P-CMSN architecture 40, according to one embodiment. As shown in FIG. 1B, the network functional layers 30 support the end-user application data carried by the customer premises functional layers 34. FIG. 1B shows end-user application data in the form of voice, data, and video data.

As shown in FIG. 1B, the physical layer (Layer 1) is based on optical transport network (OTN) technology. Layer 1 may be based on any optical transport network technology capable of providing real-time bandwidth-on-demand services as described further below. For example, the optical transport network technology may include next-generation SONET (NG-SONET) and next generation optical transport network (NG-OTN) technologies, which are discussed in greater detail below.

The data link layer (Layer 2) may adopt packet-based local area network (LAN) technology. For example, FIG. 1B illustrates that Layer 2 may adopt Ethernet LAN and/or Ethernet switching technologies.

The network layer (Layer 3) may utilize packet-based wide area network (WAN) technologies. For example, FIG. 1B shows that Layer 3 may use IP/MPLS packet switching and routing technologies. Table 1 lists examples of platforms that may be used to implement the network functional layers 30. Table 1 further lists types of end-user services that may be supported by the network functional layers 30. Several of the platforms and services listed in Table 1 will be described in greater detail further below. The list of platforms and services in Table 1 is not exhaustive of those that may be used within the spirit and scope of the present invention. Table 1 merely lists examples of platforms and services that may be used and/or implemented in some embodiments.

TABLE 1

Examples of Layer-Specific Platforms and Services

| Layers | Platforms | Services |
| --- | --- | --- |
| Layer 3 | IP/MPLS Routers | TCP/UDP/MPLS-based services, Layer-3 VPN, VoIP, etc. |
| Layer 2 | LAN Switch, VLAN Switch | VLAN, Layer-2 VPN |
| Layer 1 | NG-OTN Platforms (MSPP, OXC, WXC, DWDM, etc.) | Raw Bandwidth, Ethernet Private Line, Bandwidth-on-Demand, Layer-1 VPN |

Each of the network functional layers 30 shown in FIG. 1B can provide specific services to upper layers and/or directly to end users. For example, once end-user application data streams are converted into packet streams for transport over the network functional layers 30, the packet streams can access packet transport services provided either at Layer 2 or Layer 3 in FIG. 1B, depending on the end-user application requirements. As discussed below, Layer 2 and Layer 3 services are able to access services provided by Layer 1 (e.g., on-demand provisioning of optical transport bandwidth) to utilize bandwidth for transporting the packet streams over the P-CMSN.

III. Examples of Sub-Networks for Layer-Specific Services

Figure 2:
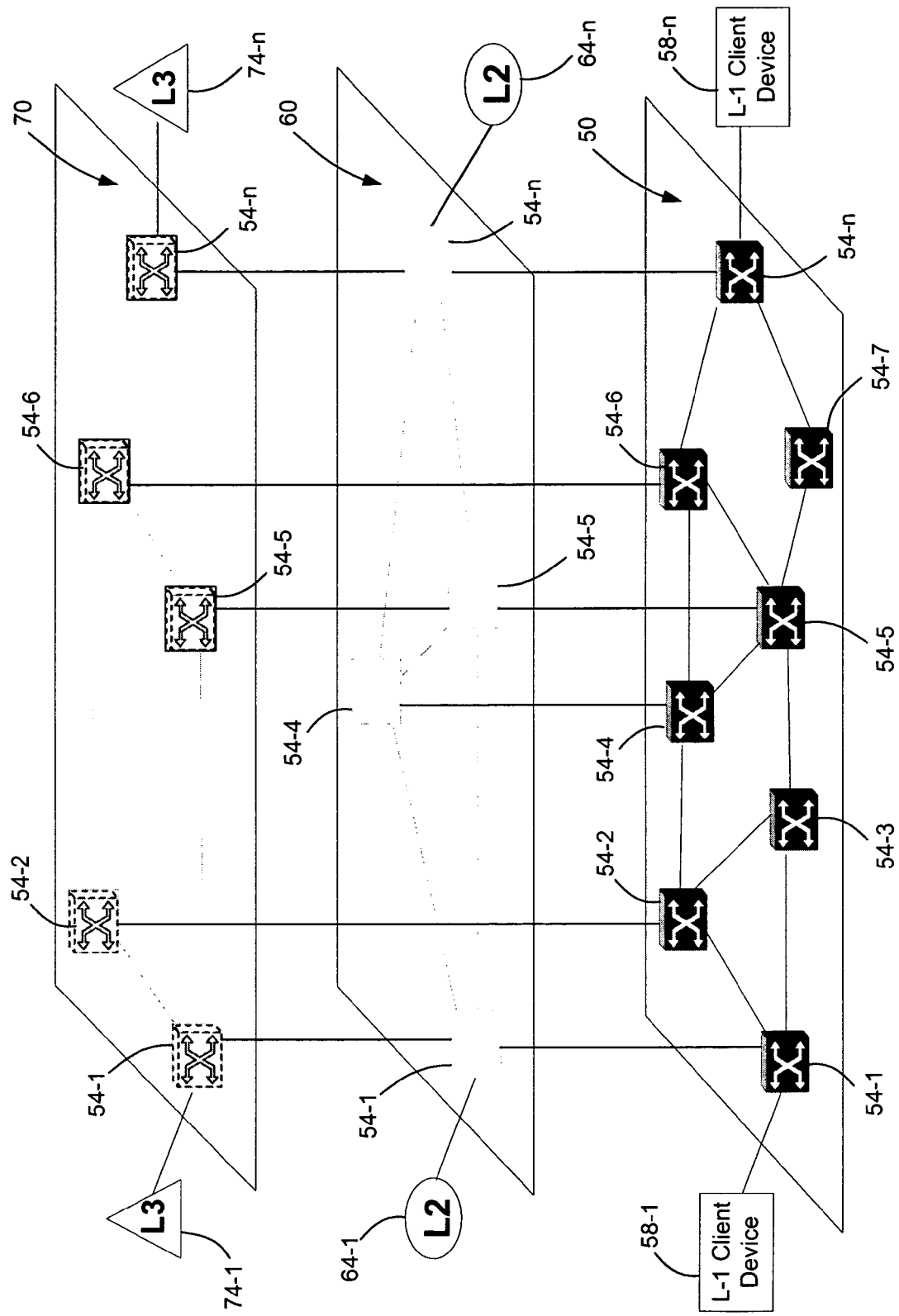
FIG. 2 is a block diagram illustrating examples of sub-networks provided at different network functional layers of an exemplary P-CMSN, according to one embodiment.

FIG. 2 is a block diagram illustrating examples of sub-networks provided at three different network functional layers 30 of a P-CMSN, according to one embodiment. Each of the sub-networks is configured to make use of bandwidth provided at a physical layer (Layer 1) 50. The bandwidth at the physical layer 50 is provided by Layer 1 (L-1) network elements 54-1, 54-2, 54-3, 54-4, 54-5, 54-6, 54-7, and 54-*n* (collectively "L-1 network elements 54"), which are configured to form one or more Layer-1 sub-networks by forming links between each other. As shown in FIG. 2, the L-1 network elements 54 are capable of providing paths connecting different Layer-1 sub-network endpoints known to those skilled in the art, including L-1 client devices 58-1 and 58-*n* (collectively "L-1 client devices 58").

The physical layer 50 is configured to provide on-demand provisioning of optical transport bandwidth. The configuration of the physical layer 50, its devices, platforms, and logic, as well as how it supports bandwidth-on-demand provisioning for Layer-1 services, will be discussed below in detail.

The bandwidth-on-demand provisioning services of the physical layer 50 can be used to support services provided at higher network functional layers 30. For example, FIG. 2 shows a data link layer (Layer 2) 60 configured to utilize select L-1 network elements 54-1, 54-4, 54-5, and 54-*n* to form one or more sub-networks over which Layer-2 services may be transported. The L-1 network elements 54 are configured so that at least a portion of the bandwidth resources provided by the L-1 network elements 54 may be apportioned for use by Layer-2 services. In this manner, the bandwidth-on-demand services of Layer 1 support Layer-2 services by providing bandwidth in real time for transport of the Layer-2 services.

As shown in FIG. 2, the L-1 network elements 54 may be utilized at Layer 2 to form one or more paths connecting Layer-2 (L-2) network elements 64-1 and 64-n (collectively "L-2 network elements 64). The L-2 network elements 64 may include any known network element capable of operating at Layer 2, including but not limited to switching devices such as VLAN, LAN, and/or Ethernet switches. Further, the L-2 network elements 64 may include known client devices configured to provide and/or utilize Layer-2 services. A particular example of a Layer-2 service, a wide area virtual local area network (W-VLAN) service, will be further described below.

Similar to the discussion above concerning the use of physical layer 50 services to support Layer-2 services, the bandwidth-on-demand provisioning services of the physical layer 50 can be used to support services provided by the network layer (Layer 3) 70 (e.g., Layer-3 virtual private network (VPN) services). As shown in FIG. 2, the network layer 70 can make use of select L-1 network elements 54-1, 54-2, 54-5, 54-6, and 54-n to form one or more sub-networks over which Layer-3 services may be transported. The L-1 network elements 54 are configured such that at least a portion of the bandwidth resources provided by the L-1 network elements 54 may be apportioned for use by Layer-3 services. In this manner, the bandwidth services of Layer 1 support Layer-3 services by providing bandwidth provisioning in real time for transport of the Layer-3 services.

As shown in FIG. 2, the L-1 network elements 54 may be employed at Layer 3 to form one or more paths interconnecting Layer-3 (L-3) network elements 74-1 and 74-n (collectively "L-3 network elements 74). The L-3 network elements 74 may include any known network element capable of operating at Layer 3, including but not limited to routing devices such as IP/MPLS routers. Further, the L-3 network elements 74 may comprise known client devices configured to provide and/or utilize Layer-3 services.

By configuring the data link layer 60 and/or the network layer 70 with policy-based management instructions for interfacing with the physical layer 50, Layer-2 and Layer-3 services are able to utilize the bandwidth-on-demand provisioning capabilities provided by the physical layer 50. This works to alleviate QoS concerns for Layer-2 and Layer-3 services by controlling available bandwidth in real time to prevent or otherwise manage network congestions. Further, on-demand provisioning supportive of Layer-2 and Layer-3 services enables flexible classes of service configured to selectively request bandwidth-on-demand provisioning services based on predefined policies. Before discussing embodiments illustrative of policy-based bandwidth-on-demand provisioning for Layer-2 and Layer-3 services, an in-depth discussion of the platforms, devices, and logic that enable bandwidth-on-demand provisioning at the physical layer 50 is appropriate.

IV. Layer-1 Framework and Bandwidth-on-Demand Provisioning

The physical layer 50 is configured to provide efficient operation and long-term management of bandwidth-on-demand services. Management and control of on-demand bandwidth services at the physical layer 50 may be implemented over next-generation optical transport networks (NG-OTN), including known NG-OTNs. The bandwidth services provided at the physical layer 50 may be utilized by Layer-2 and Layer-3 services by configuring the management of the different layers to interact. With the ability to interact with Layer-1, Layer-2 and Layer-3 services may request bandwidth-on-demand provisioning services from Layer 1 to support the Layer-2 and Layer-3 services. Accordingly, Layer-1 services should be configured to receive and execute bandwidth-on-demand service requests from Layer-2 and Layer-3 services.

Bandwidth-on-demand services provided by the physical layer 50 can provide wide ranges of bandwidth, ranging from digital signal level 1 (DS1) to synchronous transport signal levels (STS-N) and above, including wavelength. Multiple modes are provided for initiating on-demand provisioning and management of bandwidth services at the physical layer 50. These modes may include, but are not limited to, initiation of services by end-user devices, end-user applications, layer-specific devices, layer-specific operation support subsystems, and carriers' support or management interfaces.

Architectures are provided that integrate next-generation technologies (e.g., next-generation operation support (NG-OSS), new-generation synchronous optical network (NG-SONET), and next-generation optical transport network (NG-OTN) technologies). These architectures of integrated technologies provide infrastructures for supporting flexible and robust on-demand provisioning for on-demand bandwidth services at the physical layer 50. These and other features provided at the physical layer 50 will now be discussed in more detail.

A. Layer-1 Bandwidth-on-Demand Subsystem

Figure 3:
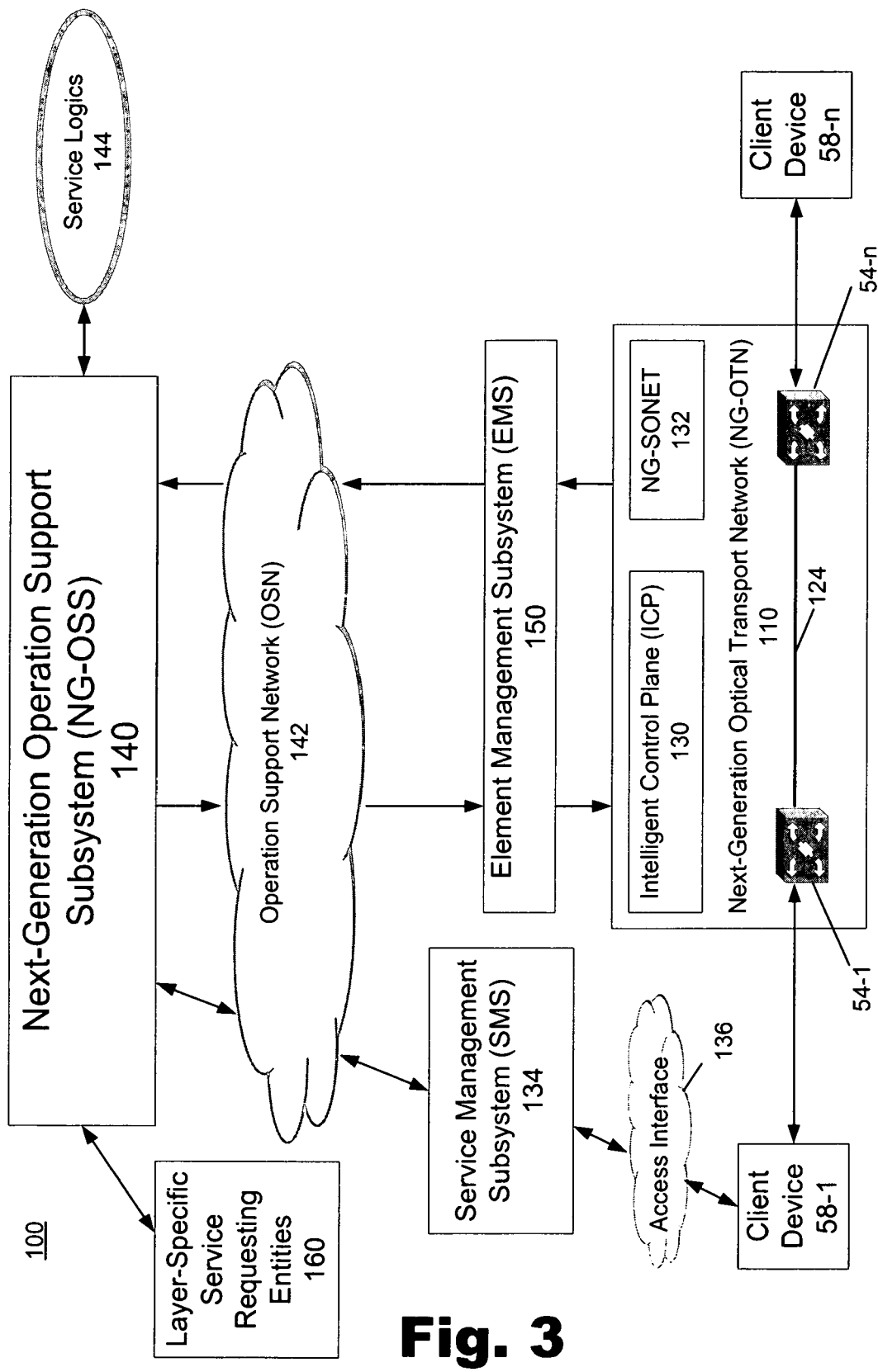
FIG. 3 illustrates a Layer-1 bandwidth-on-demand provisioning subsystem supportive of the sub-networks of FIG. 2, according to one embodiment.

FIG. 3 illustrates a Layer-1 bandwidth-on-demand provisioning subsystem 100 in accordance with one embodiment. As shown in FIG. 3, a next-generation optical transport network (NG-OTN) 110 is positioned to communicatively couple L-1 client devices 58-1 and 58-n (collectively "client devices 58") with one another via L-1 network elements (NE) 54 and transmission mediums 124 forming one of more communication paths between the L-1 client devices 58. The NG-OTN 110 includes an intelligent control plane 130 and new-generation synchronous network (NG-SONET) 132 technologies. The subsystem 100 further includes a service management subsystem (SMS) 134 communicatively coupled to the L-1 client device 58-1 via an access interface 136. The SMS 134 is connected with a Layer-1 next-generation operation support subsystem (NG-OSS) 140 via an operation support network (OSN) 142. The NG-OSS 140 can access and process service logics 144. The NG-OSS 140 is communicatively coupled to the NG-OTN 110 via the OSN 142 and an element management subsystem (EMS) 150.

Figure 4:
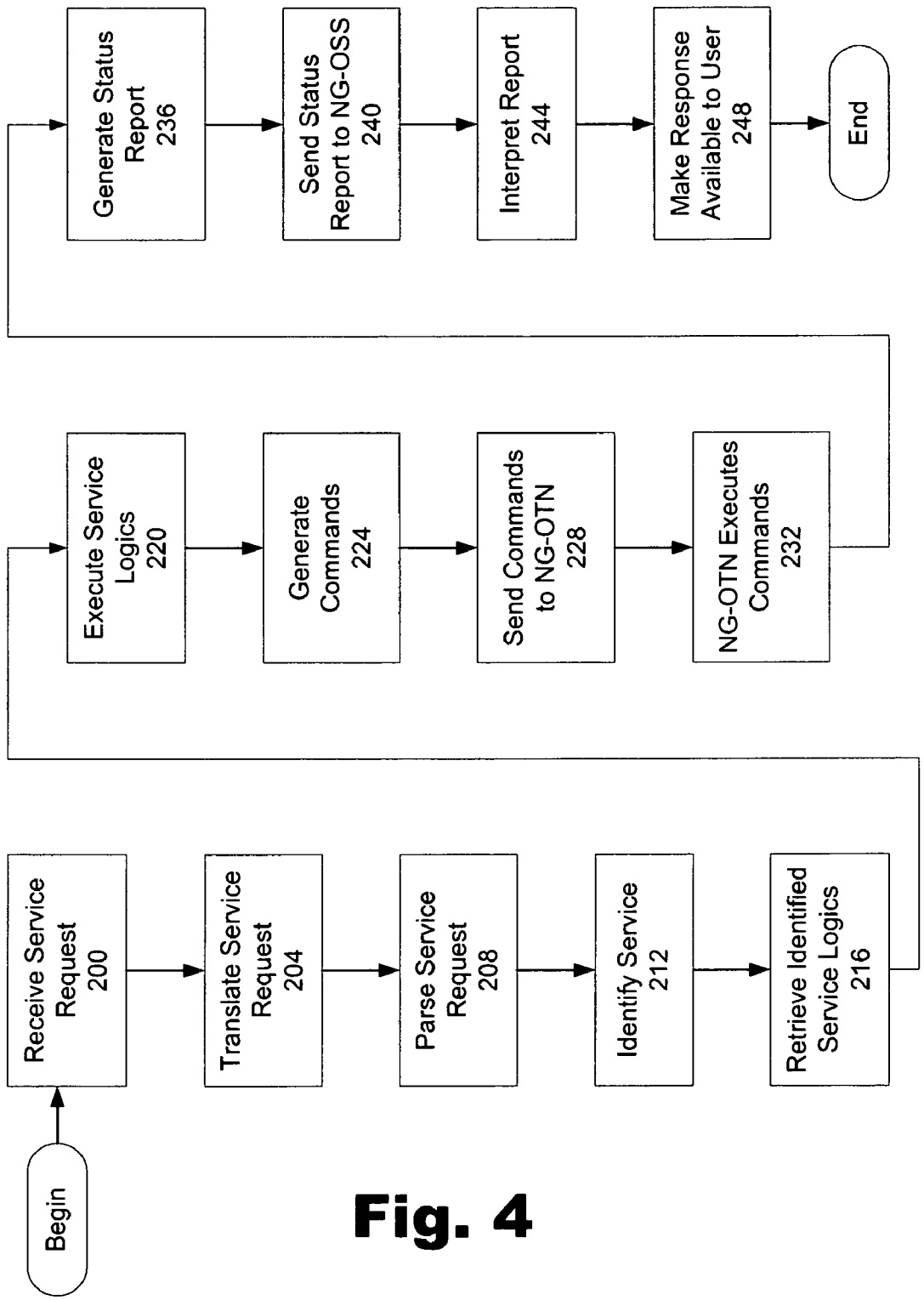
FIG. 4 is a flowchart illustrating an example of a method for on-demand provisioning of optical transport bandwidth with the subsystem of FIG. 3, according to one embodiment.

The subsystem 100 provides functionalities for managing telecommunications services on-demand. FIG. 4 is a flowchart diagram of an example of a method for managing (e.g., provisioning) bandwidth services on-demand with the subsystem 100 of FIG. 3. It is anticipated that the method shown in FIG. 4 can be practiced with additional steps, without some of the illustrated steps, or in a different order than that shown.

At step 200, the subsystem 100 receives a service request from the L-1 client device 58. The service management subsystem (SMS) 134 is configured to receive the service request from the L-1 client device 58 via the access interface 136.

At step 204, the SMS 134 translates and sends the service request to the NG-OSS 140 via the operation support network (OSN) 142. At step 208, the NG-OSS 140 parses the service request into a service database. At step 212, a service type is identified from the service request. At step 216, the NG-OSS 140 retrieves associated service logics 144. At step 220, the NG-OSS 140 executes the retrieved service logics 144, including generating commands from the service logics 144 at step 224. At step 228, the NG-OSS 140 sends the commands to the NG-OTN 110.

At step 232, the NG-OTN 110 executes the commands to perform or implement the requested service. For example, if the requested service is the provisioning of bandwidth services, the NG-OTN 110 can execute provisioning commands to provision the bandwidth services. At step 236, the EMS 150 generates a status report. At step 240, the EMS 150 sends the status report to the NG-OSS 140 via the operation support network (OSN) 142. The NG-OSS 140 interprets the status report at step 244 and makes a response available to the L-1 client device 58 through the SMS 134 at step 248.

The subsystem 100 of FIG. 3 and the method of FIG. 4 provide structure and functionality for provisioning and managing bandwidth-on-demand services at the physical layer 50. The elements shown in FIG. 3 and the functionalities listed in FIG. 4 will now be described in more detail.

1. L-1 Client Device

L-1 client devices 58 can include any device that requests or monitors Layer-1 services provided by a carrier. L-1 client devices 58 may be devices associated with customers or clients of service providers, including enterprise customers. The L-1 client device 58 can include any logic helpful for submitting service requests to the subsystem 100, monitoring service attributes, and/or connecting with other L-1 client devices 58 via the NG-OTN 110. For example, the L-1 client device 58 can include but is not limited to computing devices, interfaces, dial-up connections, telephones, modems, servers, routers, switches, network components, integrated access devices, application programs and servers, applications program interfaces (API's), etc.

L-1 client devices 58 can include devices for connecting to the network elements 54 of the NG-OTN 110 to utilize communications paths over the NG-OTN 110. For example, L-1 client devices 58 can include Ethernet devices, networks (e.g., local area networks), storage area network (SAN) equipment, computers, switches, ports, routers, network components, etc. capable of linking to communication paths of the NG-OTN 110. Through these devices, L-1 client devices 58 can communicate with other entities or persons via communication paths over the NG-OTN 110.

The L-1 client device 58 may submit a service request to the subsystem 100 through the access interface 136. The service request can be submitted by web form or any other electronic format. The L-1 client device 58 may include an application program capable of generating and transmitting service requests to the subsystem 100.

2. Layer-Specific Service Requesting Entities

Entities other than L-1 client devices 58-1 may submit service requests to the subsystem 100. As shown in FIG. 3, the NG-OSS 140 may receive service requests from other layer-specific service requesting entities 160. The layer-specific service requesting entities may include any device and/or logic capable of submitting a service request to the NG-OSS to request the BOD services provided by the subsystem 100. For example, the layer-specific service requesting entities may include other layer-specific operation support subsystems (OSSs), such as an OSS on Layer 1 or an OSS on Layer 3, examples of which will be described below. The layer-specific service requesting entities 160 may also receive notifications relating to the service requests from the NG-OSS 140. The layer-specific service requesting entities may communicate with the NG-OSS 140 using any suitable communication technologies known to those skilled in the art.

3. Access Interface

The access interface 136 can include any communicative connection(s) between the SMS 134 and the L-1 client device 58, including interfaces known to those skilled in the art. The access interface 136 may include any communicative network or electronic data interchange, including but not limited to a public network, an IP network (e.g., the Internet), a public-switched telephone network, a proprietary network, and/or a private network.

4. Service Management Subsystem (SMS)

The service management subsystem (SMS) 134 provides a subsystem 100 interface with L-1 client devices 58. Through this particular interface provided by the SMS 134, the subsystem 100 can provide functionality enabling the L-1 client devices 58 to submit service requests, submit changes to service requests after initial submission, receive timely order-processing status reports, monitor progress of order-processing, monitor resource usages and billing-related statistics of an active service, monitor service performance offered by service providers, and receive reports about services in preferred formats (e.g., electronic copy, email, hard copy, etc.).

Service requests can include L-1 client device 58 requests for a variety of subsystem 100 actions, including but not limited to setup, modification, and tear-down of bandwidth services. Service requests can request any other service provisioning or management function provided by the subsystem 100.

Figure 5:
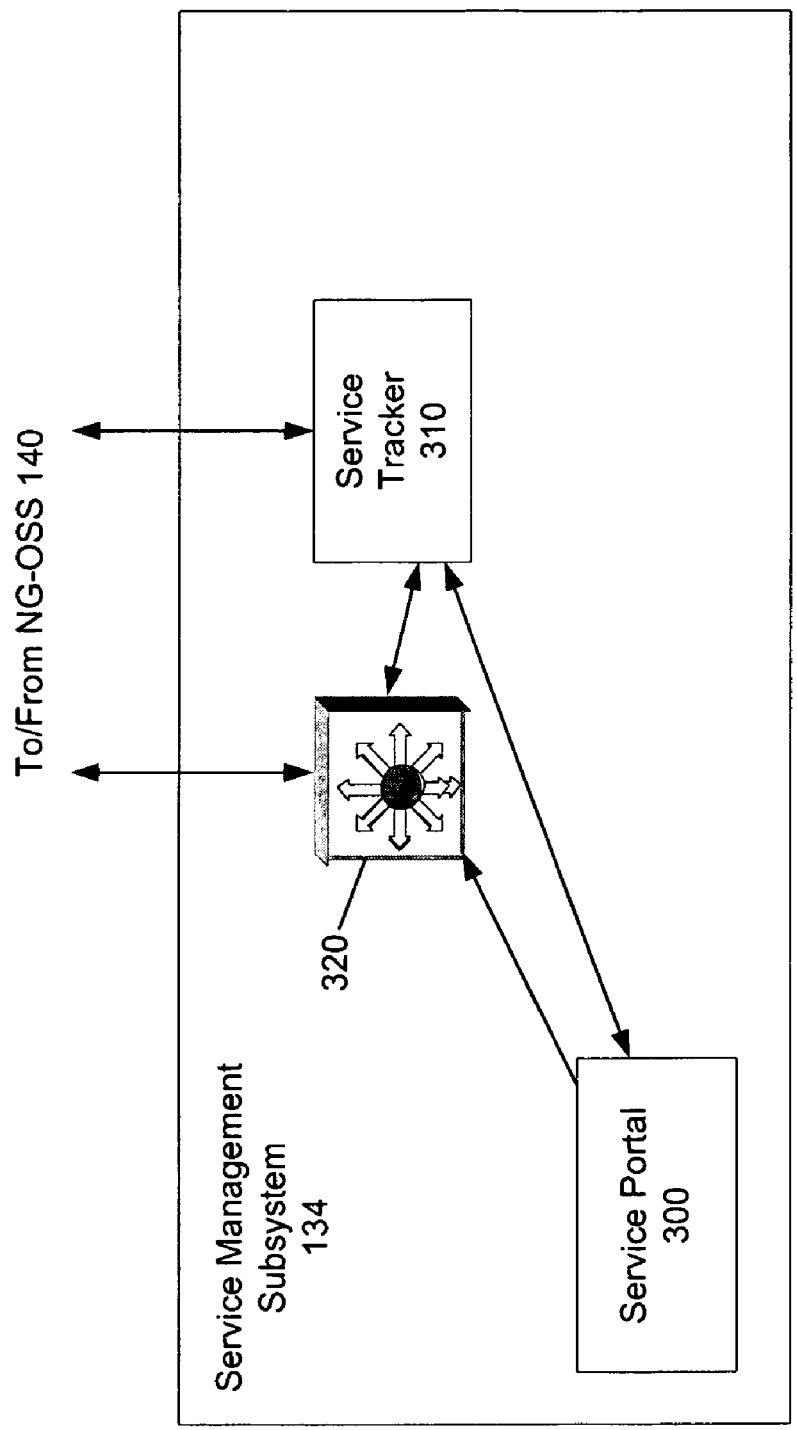
FIG. 5 is a block diagram of the service management subsystem (SMS) of FIG. 3, according to one embodiment.

FIG. 5 is a block diagram of the service management subsystem (SMS) 134 of FIG. 3. The SMS 134 may include a service portal 300, a service tracker 310, an order-intake server 320, and any other device, logic, and/or interface helpful for processing interactions between L-1 client devices 58 and the NG-OSS 140.

The service portal 300 can be configured to communicate with the L-1 client device 58 through the access interface 136. In particular, the service portal 300 is configured to receive service requests, status queries, and related information from the L-1 client device 58. The service portal 300 may also be configured to provide the L-1 client device 58 with status reports and responses to the service requests and status queries.

The service portal 300 can include but is not limited to a web portal, a voice portal, a graphical user interface (GUI), an electronic data interchange (EDI), any portal known to those skilled in the art, and any other interfaces, devices, and/or logic helpful for communicating with the L-1 client device 58. Accordingly, the service portal 300 can be configured to provide the L-1 client device 58 with capabilities for submitting service requests, receiving status reports, and monitoring services. In one embodiment, the service portal 300 includes a web portal provided by the Verizon Corporation of New York, N.Y. The portal may utilize extensible mark-up language (XML) as its modeling language.

In another embodiment, the service portal 300 includes a voice portal utilizing voice recognition technologies.

The SMS 134 is preferably configured to translate received service requests into a form that can be used by the NG-OSS 140. The service portal 300, the order-intake server 320, or a combination of devices, can be configured to translate the service requests into another language before sending the service requests to the NG-OSS 140. In one embodiment, the SMS 134 translates service requests into extensible mark-up language (XML) using an XML schema based on service features. Information sent from the NG-OSS 140 to the L-1 client device 58 can be translated in similar fashion.

The order-intake server 320 is configured to perform a number of functions to coordinate subsystem 100 processing and communications with the L-1 client device 58. The order-intake server 320 processes service requests that have been received via the service portal 300. In particular, the order-intake server 320 may validate a service request to ensure that it satisfies predefined rules defining a valid service request. In one embodiment, the order-intake server 320 verifies that service requests each include certain predefined parameters. The predefined parameters can include but are not limited to any number and combination of connection types, origin and destination points, origin point site and port identifications, destination point site and port identifications, path identifications, session identifications, bandwidth requirements (e.g., maximum bandwidth, minimum bandwidth, bandwidth settings, or changes to current bandwidth), service schedules (e.g., a schedule table), periods to be modified, protection class, restoration settings, request identifier (e.g., path setup, modification, or teardown), selected service, service type, and service classes. The order-intake server 320 then sends valid service requests to the NG-OSS 140 for further processing.

The service tracker 310 tracks the statuses of services and service requests. The service tracker 310 obtains tracking information from the NG-OSS 140 via a bi-directional communication interface (e.g., the OSN 142) between the SMS 134 and the NG-OSS 140. Because the state of services is tracked at the SMS 134, the subsystem 100 is able to provide L-1 client devices 58 with timely service and service request status information. The tracked state of the services allows L-1 client devices 58 to monitor attributes associated with the services.

The service tracker 310 may also be configured to prepare information, e.g., status reports, to be sent to the service portal 300 for access by the L-1 client device 58. With the reports, the subsystem 100 is able to provide the L-1 client device 58 with indications of success or failure of a service request, as well as reasons as to why a requested action failed. For example, status reports can include but are not limited to indications of setup success or failure, modification success or failure, teardown success or failure, error, unknown service session or path, and a transition to a new scheduled period. To aid the preparation of status reports, the service tracker 310 may receive or access information from the NG-OSS 140 and prepare the information for transmittal to the L-1 client device 58 via the service portal 300.

While the service portal 300, the order intake server 320, and the service tracker 310 are shown as separate entities in FIG. 5, those skilled in the art will understand that different configurations can be implemented to obtain the same or similar features of the portal 300, server 320, and service tracker 310. For example, these entities can be combined into a single entity capable of performing the same functionalities.

5. Operation Support Network (OSN)

To enable timely tracking of service statuses, the subsystem 100 may include a reliable communication channel between the SMS 134 and the NG-OSS 140. As shown in FIG. 3, the subsystem 100 may include the operation support network (OSN) 142, which functions as a communication link between various subsystem 100 elements. In particular, the OSN 142 provides a reliable and robust bi-directional communications interface between the SMS 134 and the NG-OSS 140. The OSN 142 enables the SMS 134 to receive and maintain status information for services as discussed above.

The OSN 142 can include any communications interface that enables the SMS 134 to track the statuses of services and service requests. In one embodiment, the OSN 142 includes a private network. However, other known networks may be used to establish adequate communications links between the various subsystem 100 elements, namely the SMS 134 and the NG-OSS 140.

The OSN 142 allows elements of the subsystem 100 to be connected independently of the location of the elements. In one embodiment, the OSN 142 connects subsystem 100 elements that are distributed over a service carrier's footprint. This provides the subsystem 100 with scalability. In particular, multiple SMSs 134 may be distributed strategically over the footprint of the service carrier to leverage market penetrations.

The OSN 142 can provide a communications interface between the NG-OSS 140 and the NG-OTN 110. As shown in FIG. 3, communications between the NG-OSS 140 and the NG-OTN 110 can go through the OSN 142 and the EMS 150. Alternatively, the EMS 150 may be omitted for certain communication protocols (e.g., Transaction Language 1 (TL1) protocol). The OSN 142 can include any communications interface capable of communicatively connecting the NG-OSS 140 and the NG-OTN 110, either directly or through intermediary interfaces (e.g., EMSs 150 or other network management subsystems (NMS).

6. Next-Generation Operation Support Subsystem (NG-OSS)

The NG-OSS 140 comprises a new generation of operation support systems (OSS) having functionalities designed to leverage and manage the capabilities and intelligence of the NG-OTN 110, which will be discussed below. The NG-OSS 140 includes the capabilities of conventional OSSs as well as additional features. In particular, the NG-OSS 140 can be configured with functionalities for configuring and managing networks (e.g., NG-OTN 110) that perform auto-discovery and self-inventory, path calculations subject to traffic engineering constraints, dynamic path setup and tear-down initiated by either carrier or user devices, dynamic bandwidth modifications on existing services, and a variety of service protection and restoration schemes offered by the intelligent control plane 130 of the NG-OTN 110.

Even more specifically, the NG-OSS 140 is preferably configured to manage the intelligent control plane 130 functions and NG-SONET 132 capabilities of the NG-OTN 110 described below. The NG-OSS 140 is able to provide end-to-end path functions; including fault, configuration, accounting, performance, and security (FCAPS functions). The NG-OSS 140 may be configured to perform myriad other functions, including any of the functions described in either "NGOSS Requirements Technical Specification," TeleManagement Forum (TMF), TMF 052, July 2001 or "Multi-Technology Network Management Solution Set—NML-EML Interface V.2.0," TeleManagement Forum (TMF), TMF 814, July 2001, both of which are hereby incorporated by reference in their entirety.

The NG-OSS 140 is configured to interface with the NG-OTN 110. A variety of interfaces may be employed to connect the NG-OSS 140 with the NG-OTN 110, including but not limited to the operation support network (OSN) 142, the element management subsystem (EMS) 150, a network management subsystem (NMS), and any standards-based interfaces for connecting with the NG-OTN 110. In one embodiment, the interface between the NG-OTN 110 and the NG-OSS 140 supports a TMF-814 standards interface to the EMS 150, which communicates with the NG-OTN 110. In another embodiment, the interface comprises a Transaction Language 1 (TL1) interface to the network elements (NE) 54. With a TL1 interface in place, the subsystem 100 may operate without the EMS 150. It is anticipated that other interfaces employing different standards or protocols (e.g., revised TMF-814, Common Object Request Broker Architecture (CORBA), extensible mark-up language (XML), or Simple Network Management Protocol (SNMP)) can be implemented in the subsystem 100 to operably connect the NG-OSS 140 with the NG-OTN 110.

Figure 6A:
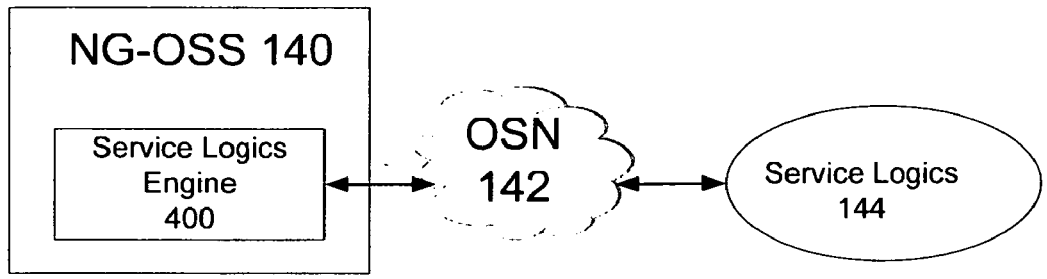
FIG. 6A is a block diagram of the next-generation operation support subsystem (NG-OSS) and service logics of FIG. 3, according to one embodiment.

The NG-OSS 140 is configured to implement and utilize service logics 144 to create commands for controlling the NG-OTN 110. FIG. 6A is a block diagram illustrating the relationship between the NG-OSS 140 and the service logics 144 according to the embodiment shown in FIG. 3. In this configuration, the NG-OSS 140 includes a service logics engine 400 configured to communicate with the service logics 144 via the operation support network (OSN) 142.

Figure 6B:
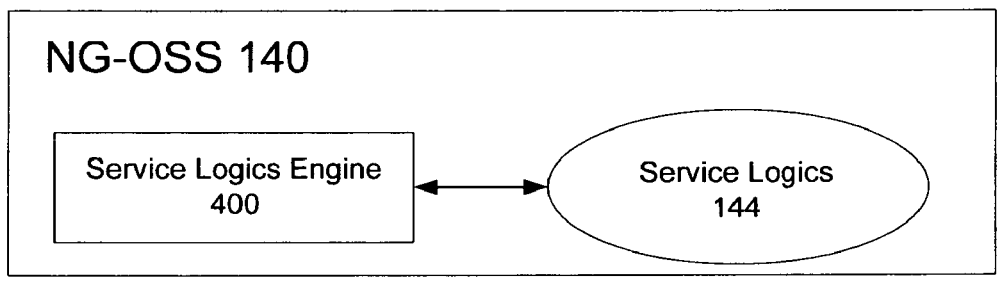
FIG. 6B is a block diagram of the next-generation operation support subsystem (NG-OSS), according to another embodiment.
Figure 6C:
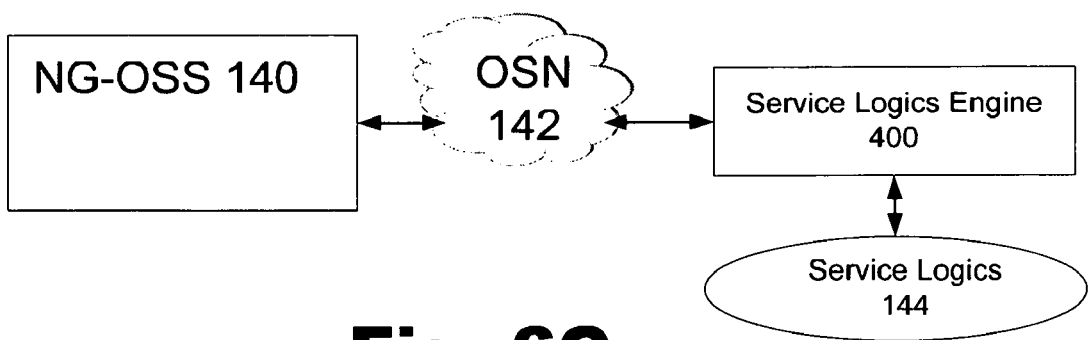
FIG. 6C is a block diagram of the next-generation operation support subsystem (NG-OSS), service logics, and service logics module, according to yet another embodiment.

The NG-OSS 140 can use other configurations to access the service logics 144. FIG. 6B illustrates a configuration in which the service logics 144 and service logics engine 400 are integrated within the NG-OSS 140. FIG. 6C shows another configuration in which the service logics 144 and the service logics engine 400 communicate with the NG-OSS 140 via the OSN 142. Other network and/or interface configurations can be used in place of or in addition to the OSN 142. Thus, the service logics 144 can be built into the NG-OSS 140 or implemented on a separate platform in communication with the NG-OSS 140.

The service logics 144 define services provided by the subsystem 100. In particular, the service logics 144 define procedures for managing bandwidth-on-demand services at the NG-OTN 110 level. The service logics 144 can be implemented as computer processes (e.g., software processes) or other procedures stored in computer-readable mediums that are able to be processed by computing platforms. Different service logics 144 can define different on-demand services. Two examples of Layer-1 bandwidth-on-demand services and their respective service logics 144 will be discussed further below.

The service logics engine 400 should be configured to manage and execute the service logics 144. In particular, the service logics engine 400 can be configured to provide for entry, removal, modification, and execution of service logics 144. This provides the L-1 client device 58 and the carrier with functionalities for configuring different service logics 144 to define desired on-demand services or classes of on-demand services.

The service logics 144, when executed, generate commands capable of being executed by the NG-OTN 110 to process or implement service requests. For example, for a particular service request submitted by the L-1 client device 58 or by some other requesting entity (e.g., an OSS specific to a higher layer as discussed below), the NG-OSS 140 uses parameters from the service request to identify and access an associated service logic 144. The parameters from the service request are fed into the accessed service logic 144, and the service logic engine 400 executes the accessed service logic 144 with the inserted parameters to generate a sequence of commands, which are transmitted to the NG-OTN 110 for execution.

In one embodiment, the commands generated by execution of the service logics 144 comprise Transaction Language 1 (TL1) protocol commands, which are executable by components and processes of the NG-OTN 110. TL1 protocol commands are known to those skilled in the art. For example, "LambdaUnite MSS—Operations System Engineering Guide", provided by Lucent Technologies of Murray Hill, N.J., which is hereby incorporated by reference in its entirety, discloses TL1 protocol commands useful for controlling and instructing the NG-OTN 110. Example TL1 commands include edit/change ("ED_x"), enter ("ENT_x"), retrieve ("RTRV x"), and delete ("DLT_x"). The service logics engine 400 is configured to execute the service logics 144 with parameters from a relevant service request to generate TL1 commands that can be executed by the NG-OTN 110 to satisfy the service request.

The commands generated from the service logics 144 can be transmitted to the NG-OTN 110 in any of the ways discussed above, including to the network element (NE) 54 through the OSN 142 in accordance with TL1 format, or to the element management subsystem (EMS) 150 through the OSN 142 in TMF-814 or other format. Upon receiving the sequence of commands, the NG-OTN 110 is able to execute the sequence of commands to attempt to carry out the service request.

The service logics 144 can be configured to interpret TL1 protocol messages that are received by the NG-OSS 140 from the NG-OTN 110 (e.g., via the OSN 142) during the service logics 144 execution. The NG-OSS 140 maintains the call state for every service request, and is configured to interpret TL1 messages that are received from the NG-OTN 110. The NG-OSS 140 correlates the received TL1 messages with call states and translates the TL1 messages into a format that can be provided either directly or indirectly to the L-1 client device 58 or other service-requesting entity (e.g., an OSS specific to a higher layer). The TL1 messages can be any TL1 messages known in that art, including but not limited to TL1 responses to execution of the TL1 commands, TL1 alarms, and TL1 status notifications. The status reports generated based on the TL1 messages may include any of the responses discussed above.

7. Next-Generation Optical Transport Network (NG-OTN)

The NG-OTN 110 can comprise a transport/data plane that includes network elements (NE) 54 helpful for provisioning and activating communications paths between L-1 client devices 58. Preferably, the L-1 network elements 54 comprise next-generation network elements. For example, the L-1 network elements 54 can include but are not limited to multi-service provisioning protocol (MSPP), next-generation add and drop multiplexer (NG-ADM), reconfigurable optical add/drop multiplexer (ROADM), optical cross-connect (OXC), wavelength cross-connect (WXC), coarse wavelength division multiplexing (CWDM), and dense wavelength division multiplexing (DWDM) platforms that are equipped to support functions of the intelligent control plane (ICP) 130.

Network elements 54, including MSPP, OXC, and NG-ADM platforms can be equipped with NG-SONET capabilities. These network elements 54 can support bandwidth-on-demand services. Other network elements 54, including ROADM, WXC, DWDM, and CWDM platforms, can support wavelength-on-demand services.

In one embodiment, the NG-01N 110 includes a conventional SONET synchronized digital hierarchy (SONET/SDH) transport network modified with additional functionality. The NG-OTN 110 includes the ICP 130 and/or the NG-SONET 132, which help provide the additional functionalities. The ICP 130 can be implemented over any of the network element 54 platforms listed above.

The ICP 130 can be configured to enable the NG-OTN 110 to operate in a self-running and/or fully automated mode. The ICP 130 is able to provide functions for automatically discovering and self-inventorying network topology, resources, and connection maps. The ICP 130 can also be configured to perform dynamic end-to-end path calculations subject to engineering constraints, as well as dynamic end-to-end path setup and teardown in a single step and/or single-ended fashion. The ICP 130 may support a variety of protection and restoration schemes.

The functions of the ICP 130 technology have been implemented using several different modified optical transport network platforms, such as Lucent Technologies' Lambda Unite and next-generation network elements. As will be appreciated by those skilled in the art, the ICP 130 functions and technologies can be implemented using known industry standards that have been defined, are currently being defined, and will be defined in the future. With the functions described above, the ICP 130 can provide improved network efficiency, enhanced network resiliency, and new revenue opportunities.

The ICP 130 can be configured to operate on several interface platforms, including but not limited to internal node-to-node interfaces (I-NNI), external network-to-network interfaces (E-NNI), and user network interfaces (UNI).

NG-SONET 132 can provide features of conventional SONET technologies, as well as additional features. NG-SONET 132 is able to enhance conventional SONET with any of the following features: service adaptation via generic framing protocol (GFP); virtual concatenation (VCAT), split routing (SR); and link capacity adjustment scheme (LCAS). GFP provides standardized mapping mechanisms to adapt higher-layer (e.g., Layer 2 and above) client signals for transport over NG-SONET 132 or NG-OTN 110. VCAT provides for maximization of bandwidth utilization by flexible channel sizing over a NG-SONET 132 network via inverse multiplexing of SONET payload into multiple component signal components. For example, with VCAT, NG-SONET 132 provides for inverse multiplexing of the SONET payloads into multiple components of level-1 synchronous transport signals (STS-1) for high-order VCAT or into multiple components of VT1.5 signals for low-order VCAT. Alternatively, other signal protocols may be used for multiple components of the VCAT function. Split routing (SR) allows the VCAT component paths to be routed disjointedly to achieve a high degree of route diversity to meet service availability requirements. LCAS provides a mechanism for dynamically adjusting the bandwidth of any VCAT path by adding or removing component paths in VCAT groups. With these functions, the subsystem 100 can provide L-1 client devices 58 with enhanced network capabilities, including the ability to modify bandwidth of an active service without any service disruption.

The features discussed above are implemented at end points of conventional SONET connections. Therefore, NG-SONET technologies can be implemented over existing SONET core networks, thereby allowing service providers to leverage existing SONET infrastructures. Known standards, such as those disclosed in ITU-T Recommendations G.707, G.7041, and G.7042, which are hereby incorporated by reference in their entirety, can be used to implement NG-SONET capabilities over existing SONET/SDH infrastructures. Products of various OTN vendors implementing these NG-SONET standards may be used in the subsystem 100. The NG-SONET capabilities can include any feature known to those skilled in the art.

Figure 7:
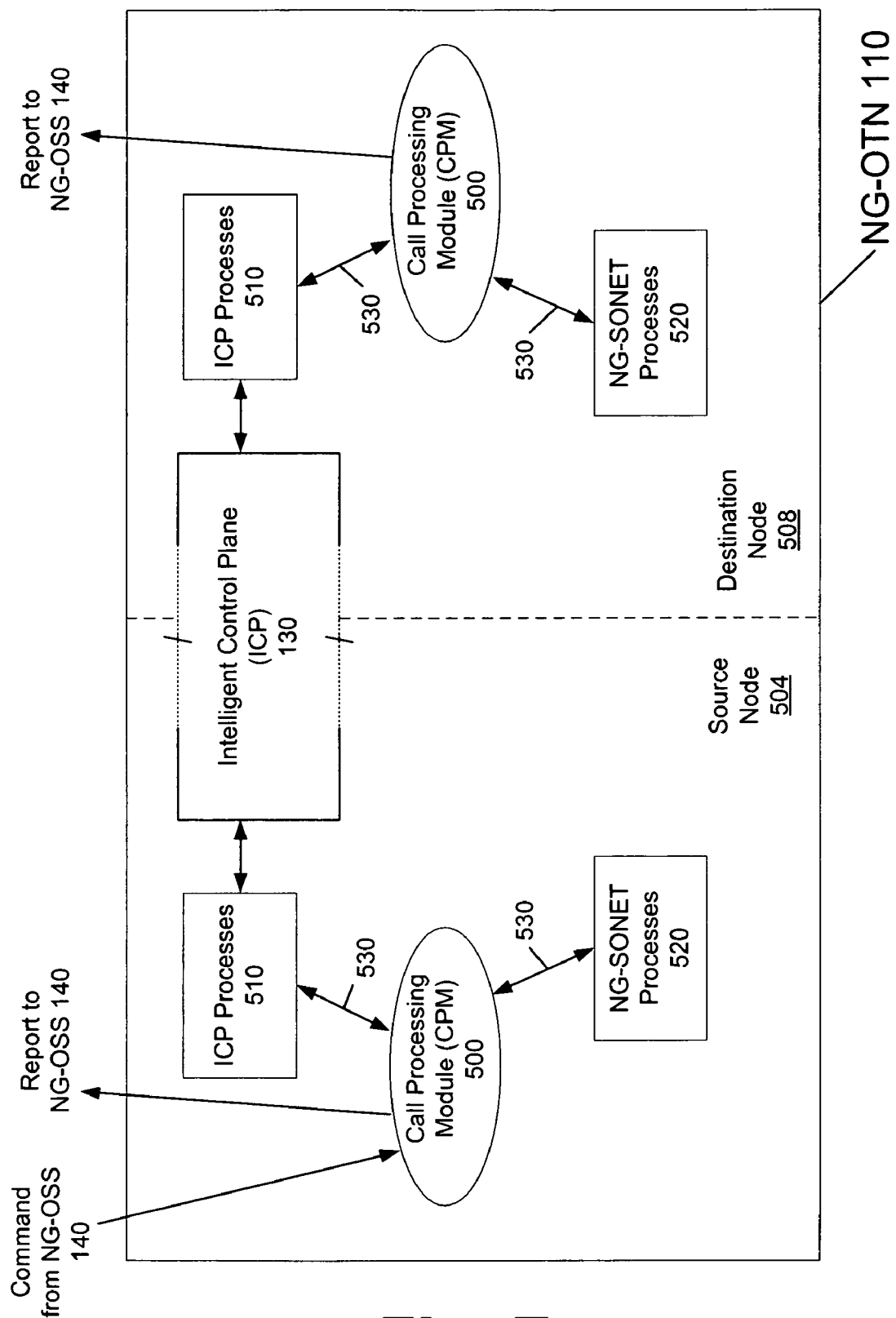
FIG. 7 is a block diagram of the next-generation optical transport network (NG-OTN) of FIG. 3, according to one embodiment.

The ICP 130 and NG-SONET 132 features are integrated to work together at the end nodes that provide ingress or egress points for SONET (e.g., SONET/SDH) network paths. FIG. 7 shows the NG-OTN 110 having call processing modules (CPM) 500. The CPMs 500 are located at the end nodes (source node 504 and destination node 508) and are configured to integrate the ICP 130 and NG-SONET 132 functions. Each CPM 500 is connected with ICP processes 510 and NG-SONET processes 520 by links 530. Preferably, the links 530 comprise real-time interfaces. The ICP processes 510 include routing and signaling processes of the ICP 130. The NG-SONET processes 520 include the VCAT, LCAS, and SR functions of the NG-SONET 132 as described above.

The CPM 500 is configured to execute processes (e.g., software processes) that coordinate the provisioning and management of on-demand services. The CPM 500 communicates with the NG-OSS 140, the ICP processes 510, and the NG-SONET processes 520 to perform this coordination. As shown in FIG. 7, the CPM 500 at a source node 504 identified in a service command may receive commands from the NG-OSS 140 and/or send reports to the NG-OSS 140. For example, the CPM 500 may receive a path-setup command and notify the NG-OSS 140 whether the path-setup command was successfully completed.

When the CPM 500 at the source node 504 receives service commands (e.g., a sequence of path-setup or management commands), it directs the execution of the commands by various network and hardware components of the NG-OTN 110 to establish the requested path. In one embodiment, the service commands received from the NG-OSS 140 are in TL1 protocol. The CPM 500 coordinates with the ICP processes 510 and the NG-SONET processes 520 to facilitate the execution of the commands at the source node 504. The ICP 130 processes the commands to establish a path up to the destination node 508, where ICP processes 510 at the destination node 508 receive the path command from the ICP 130 and setup the last leg of the path to the destination node 508. The CPM 500 at the destination node 508 coordinates the completion of the path setup. If NG-SONET technologies are requested, the CPM 500 coordinates with the NG-SONET processes 520 to invoke the requested NG-SONET technology. The CPM 500 may be configured to send reports and other data to the NG-OSS 140 to indicate whether the requested path was successfully provisioned or managed (e.g., setup or torn down). This process is described in more detail with reference to FIGS. 8A-8D.

Figure 8A:
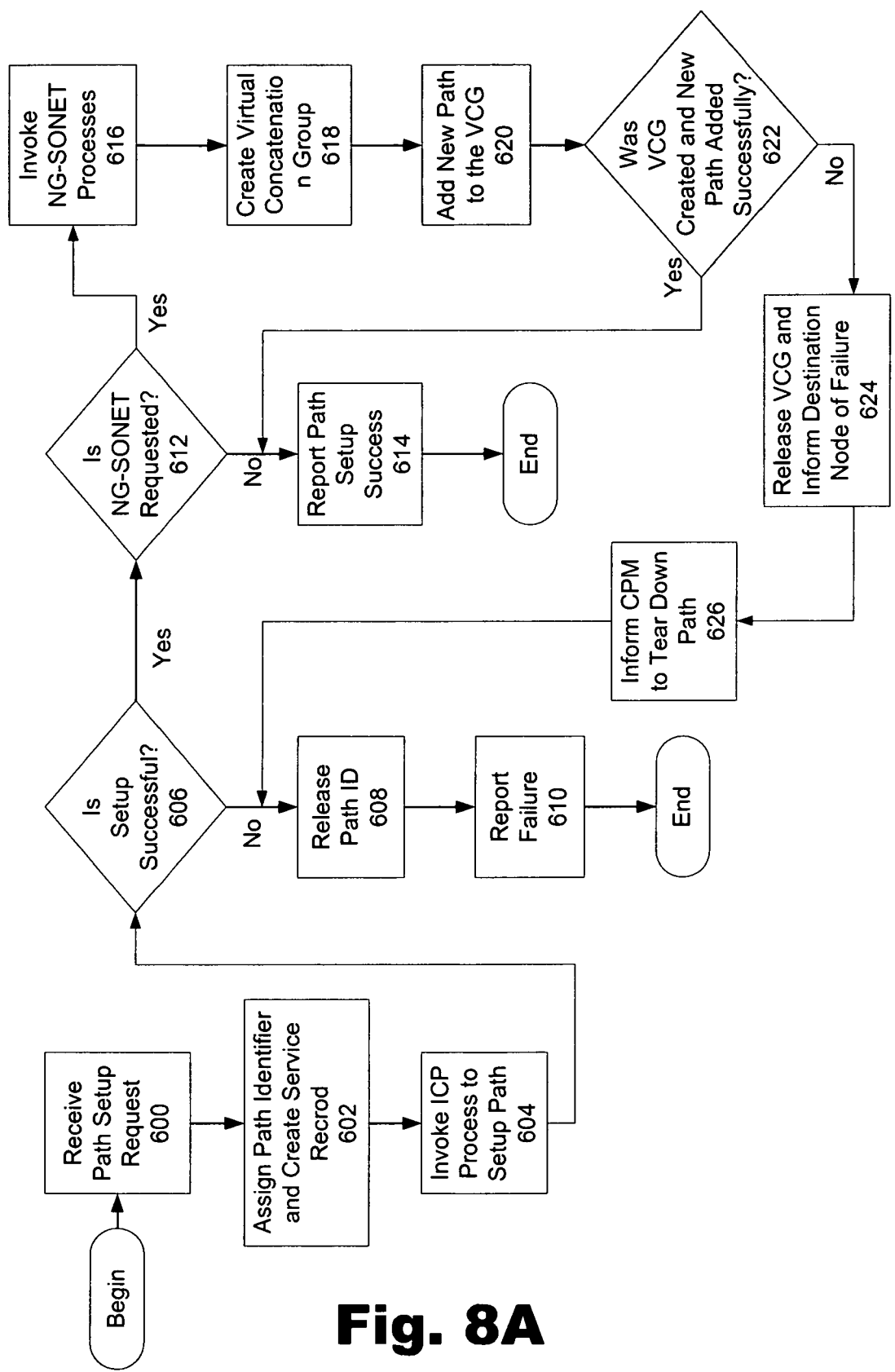
FIG. 8A is a flowchart illustrating an example of a method of path setup at a source node of the next-generation optical transport network (NG-OTN) of FIG. 7.

FIG. 8A is a flowchart illustrating an example of a method of path setup at a source node 504 of the NG-OTN 110 of FIG. 7. At step 600, the CPM 500 at the source node 504 receives a command from the NG-OSS 140 indicating a path setup request. The path command should include parameters specifying origin and destination points, bandwidth requirements, service class, action identifier, and whether NG-SONET functions are desired for the path command. Any other information helpful for provisioning the path may also be included with the path command.

At step 602, the CPM 500 assigns a path identifier and creates a service record for that request. At step 604, the CPM 500 invokes the ICP processes 510 to initiate path setup via ICP 130 signaling. At step 606, the CPM 500 coordinates with the ICP processes 510 to determine whether path setup was successful. If it is determined that path setup was unsuccessful, processing continues at step 608, at which step the CPM 500 releases the path identification. At step 610, the CPM 500 reports the failed path setup to the NG-OSS 140. The failure report may include a cause code or other indication of a reason for failure.

On the other hand, if it is determined at step 606 that the path setup was successful, processing continues at step 612, at which step the CPM 500 determines whether NG-SONET functions are requested for the path setup. In one embodiment, this determination is made by checking parameter(s) submitted with the path command.

If it is determined at step 612 that NG-SONET is not requested, processing continues at step 614. At step 614, the CPM 500 reports to the NG-OSS 140 that the path was setup successfully.

On the other hand, if it is determined at step 612 that NG-SONET is requested, processing continues at step 616, at which step the CPM 500 invokes the NG-SONET processes 520 to perform VCAT and/or LCAS signaling. At step 618, the NG-SONET processes 520 create a virtual concatenation group (VCG). At step 620, a new path is added to the VCG. At step 622, it is determined whether the VCG was created and the new path was added successfully. If it is determined at step 622 that the VCG was not created successfully, processing moves to step 624. At step 624, the VCG is released and the destination node is informed of the failure. At step 626, the CPM 500 is notified to tear down the path. The CPM 500 releases the path identification at step 608 and reports the failed path setup to the NG-OSS 140 at step 610.

On the other hand, if it is determined at step 622 that the VCGs were created successfully, processing move to step 614, at which step the CPM 500 reports a successful path setup to the NG-OSS 140 as discussed above. Similar methods to that shown in FIG. 8A can provide for processing other types of service requests, e.g., modification and/or teardown of an active connection.

Figure 8B:
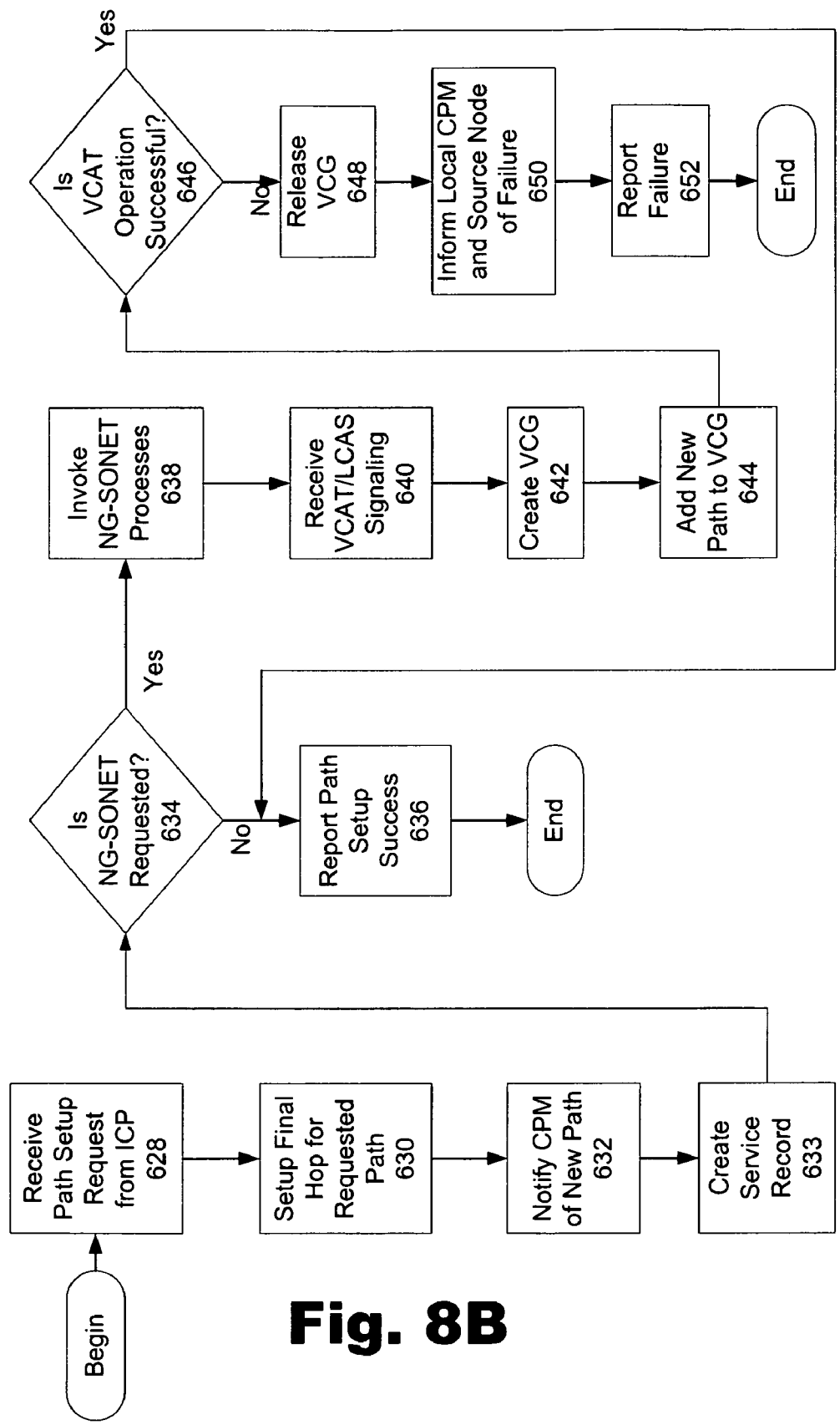
FIG. 8B is a flowchart illustrating an example of a method of path setup at an end node of the next-generation optical transport network (NG-OTN) of FIG. 7.

FIG. 8B is a flowchart illustrating an example of a method of path setup at a destination node 508 of the NG-OTN 110 of FIG. 7. At step 628, the ICP processes 510 at the end node receive a command from the ICP 130 indicating a path setup command. At step 630, the ICP processes 510 establish a final link for the requested path, thereby completing the path from the source node 504 to the destination node 508. At step 632, the ICP processes 510 notify the CPM 500 at the destination node 508 of the new path and the new path's attributes. At step 633, the CPM 500 at the destination node 508 creates a service record for the service request. At step 634, the CPM 500 at the destination node 508 determines whether an NG-SONET function was requested. If it is determined that NG-SONET functionality was not requested, processing continues at step 636, at which step, the CPM 500 reports to the NG-OSS 140 that the path was setup successfully.

On the other hand, if it is determined at step 634 that NG-SONET functionality was requested in the path management request, processing continues at step 638, at which step the CPM 500 invokes the NG-SONET processes 520 to wait for VCAT and/or LCAS signaling from the source node 504. At step 640, the NG-SONET processes 520 at the destination node 508 receive the VCAT and/or LCAS signaling from the source node 504. At step 642, the NG-SONET processes 520 create a virtual concatenation group (VCG). At step 644, a new path is added to the VCG.

At step 646, it is determined whether the VCAT operation was successful. If it is determined that the VCAT operation was not successful, processing moves to step 648. At step 648, the VCG is released. At step 650, the local CPM 500 and the source node 504 are informed of the failure. At step 652, the CPM 500 reports the failed path setup to the NG-OSS 140. The failure report may include a cause code or other indication of a reason for failure of the path setup. For example, the report may indicate that the VCAT operation failed for a specific identified reason.

On the other hand, if it is determined at step 646 that the VCAT operation was successful, processing moves to step 636, at which step the CPM 500 reports to the NG-OSS 140 that the path was setup successfully. Similar methods to that shown in FIG. 8B can provide for processing other types of service requests, e.g., modification of an active connection.

Figure 8C:
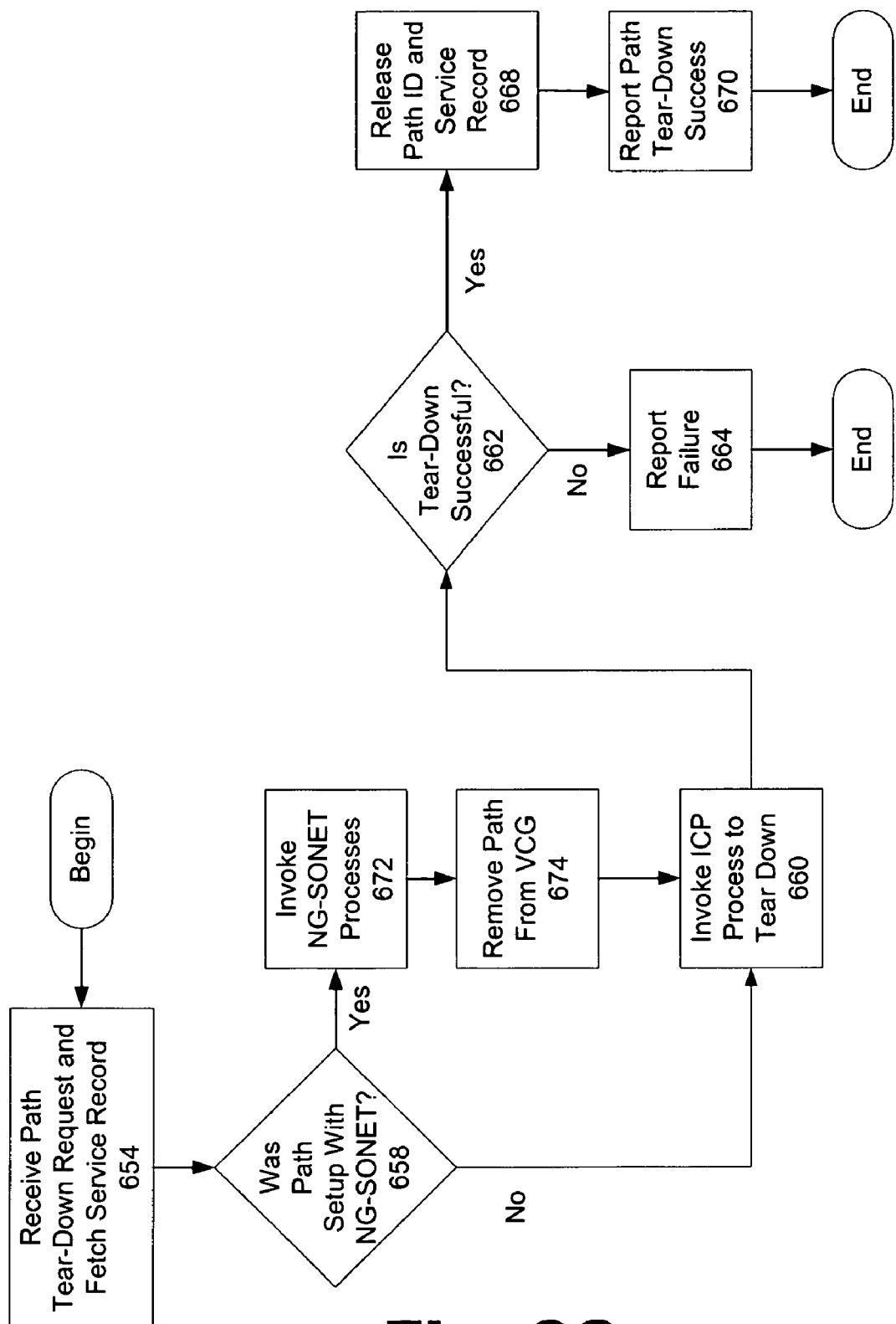
FIG. 8C is a flowchart illustrating an example of a method of path tear-down at a source node of the next-generation optical transport network (NG-OTN) of FIG. 7.

FIG. 8C is a flowchart illustrating an example of a method of path tear-down at a source node 504 of the NG-OTN 110 of FIG. 7. At step 654, the CPM 500 at the source node 504 receives a command from the NG-OSS 140 indicating a path tear-down request. The path command should include the path identifier. The CPM 500 uses the path identifier to fetch the service record, which service record contains information associated with the path, including parameters specifying origin and destination points, bandwidth requirements, service class, path and/or service identifiers, action identifier, and whether NG-SONET functions provisioned for the path command. Any other information helpful for provisioning the path may also be included with the path command.

At step 658, the CPM 500 determines whether the identified path was setup with NG-SONET processes 520. In one embodiment, this determination is made by checking parameter(s) obtained from the service record.

If it is determined at step 658 that the path is not an NG-SONET path, processing continues at step 660. At step 660, the CPM 500 invokes the ICP processes 510 to initiate path tear-down via ICP 130 signaling. Processing then moves to step 662, at which step the CPM 500 coordinates with the ICP processes 510 to determine whether path tear-down was successful. If it is determined that path tear-down was unsuccessful, processing continues at step 664, at which step the CPM 500 reports the failed path tear-down to the NG-OSS 140. The failure report may include a cause code or other indication of a reason for failure.

On the other hand, if it is determined at step 662 that the tear-down was successful, processing moves to step 668. At step 668, the path identifier and the service record are released. Processing then moves to step 670, at which step, the CPM 500 reports to the NG-OSS 140 that the path was torn down successfully.

Back at step 658, if it is determined at step 658 that the path is an NG-SONET path, processing continues at step 672, at which step the CPM 500 invokes the NG-SONET processes 520 to perform VCAT and/or LCAS signaling with the destination node over the path. At step 674, the path is removed from its virtual concatenation group (VCG). Processing then moves to step 660, which is performed as discussed above. Processing continues on through the steps 662 and 664 or steps 662, 668, and 670 as described above. Similar methods to that shown in FIG. 8C can provide for processing other types of service requests, e.g., bandwidth modifications.

Figure 8D:
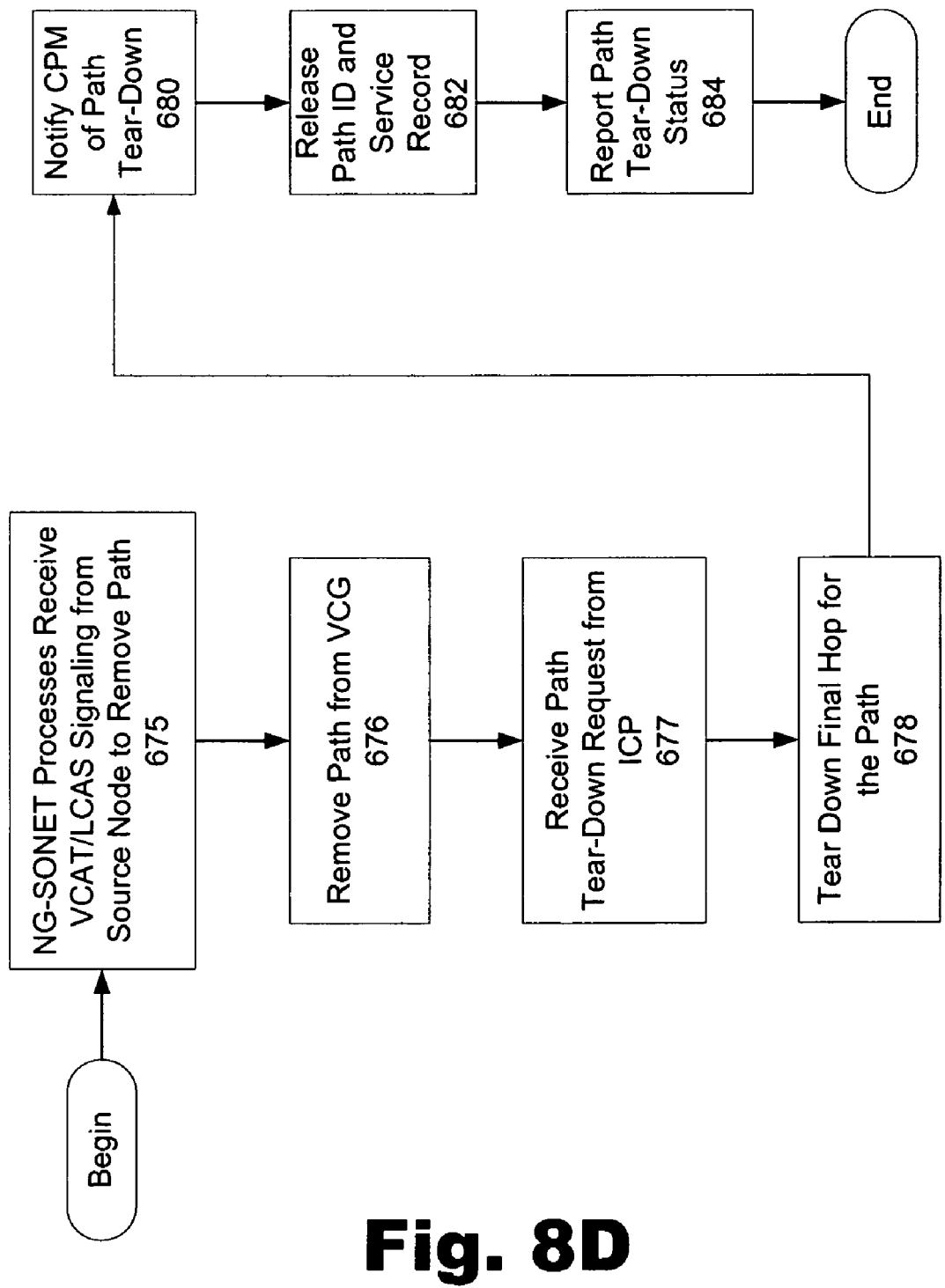
FIG. 8D is a flowchart illustrating an example of a method of path tear-down at an end node of the next-generation optical transport network (NG-OTN) of FIG. 7.

FIG. 8D is a flowchart illustrating an example of a method of path tear-down at a destination node 508 of the NG-OTN 110 of FIG. 7. At step 675, the NG-SONET processes 520 receive VCAT/LCAS signaling from the source node 504 to remove the identified path. At step 676, the path is removed from its VCG. At step 677, the ICP processes 510 at the end node receive a command from the ICP 130 indicating a path tear-down command. At step 678, the ICP processes 510 tear down a final link for the identified path. At step 680, the ICP processes 510 notify the CPM 500 at the destination node 508 of the path tear-down. At step 682, the path identifier and the service are released. Processing then continues at step 684, at which step the destination node 508 reports the status of the path tear-down to the NG-OSS 140.

B. Layer-1 Bandwidth-on-Demand Provisioning Model

With the above-discussed infrastructures and methods in place, the subsystem 100 provides a model for the development, implementation, provisioning, and management of bandwidth-on-demand (BOD) services over next-generation optical networks. BOD services preferably provide subscribers with flexibility, cost-savings, and efficiency in the provisioning and management of telecommunications services. BOD services can provide self-running (e.g., self-activation, self-configuration, self-adapting, self-healing, etc.) services that are customizable and controllable by subscribers, as well as services that are integrated and operated across multiple domains and carriers.

BOD services can further provide multiple provisioning-related features, including but not limited to: on-demand provisioning of a wide range of bandwidths, including wavelength; multiple modes of call initiations; and real-time on-demand bandwidth modifications on any active connection without any service disruption.

C. Examples of Layer-1 Bandwidth-on-Demand Services

Examples of bandwidth-on-demand (BOD) services and methods for managing (e.g., provisioning) the BOD services are described below. However, the subsystem 100 is in no way limited to supporting only the illustrated services and can support a wide range of other BOD-type services based on the on-demand bandwidth provisioning model. Further, in the examples described below, L-1 client devices 58 are described as the sources of service requests. However, this is merely by way of example, and it will be understood that the service requests may originate from other sources, including the layer-specific service requesting entities 160 described above.

As discussed above, different service logics 144 can be configured and implemented in the subsystem 100 to provide different BOD services. Accordingly, the below description of exemplary BOD services includes a description of an example of a process flow for identifying appropriate service logics 144 based on parameters in service requests. Further, the flow of service logics 144 for certain service requests within the exemplary BOD services are described below.

Figure 9:
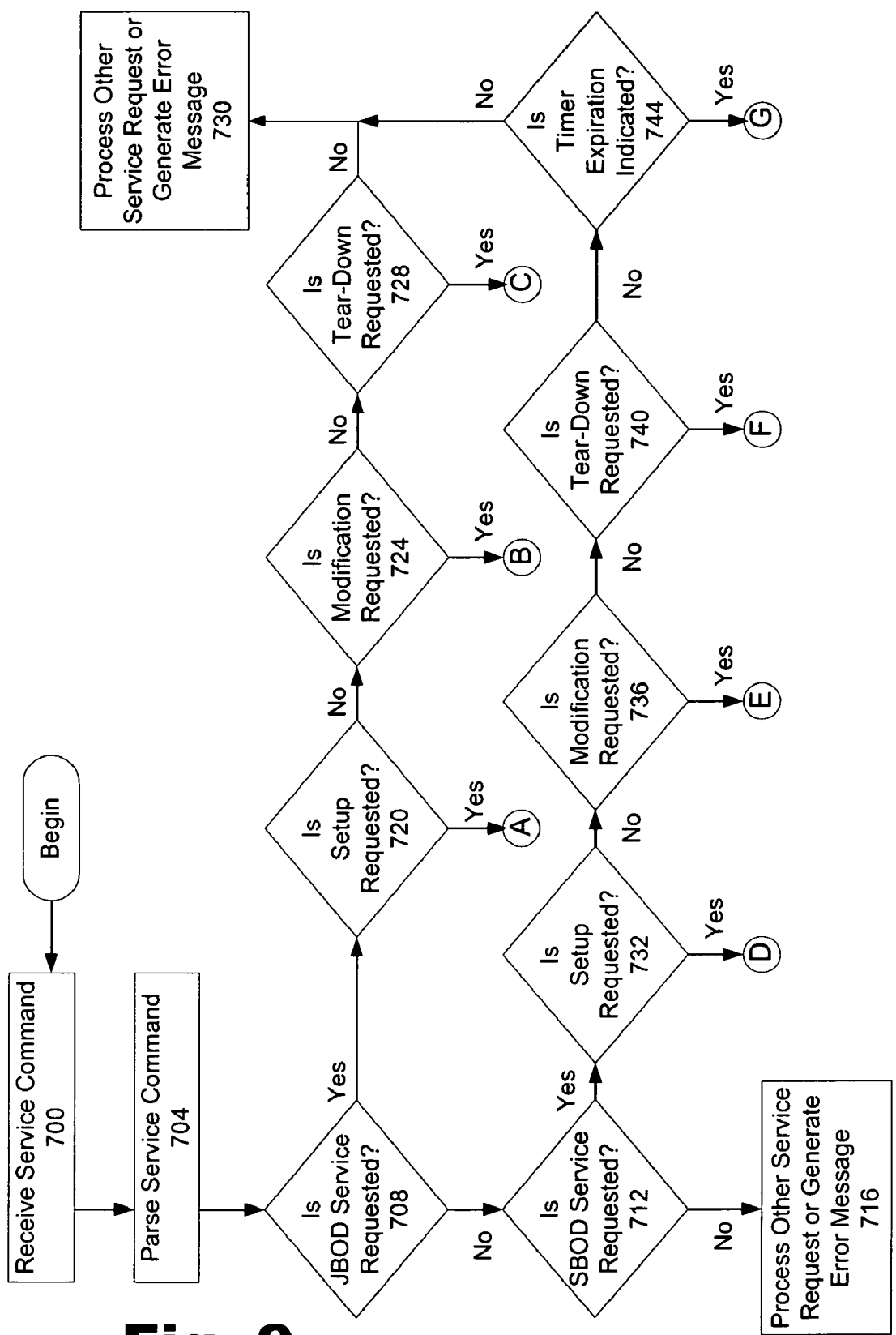
FIG. 9 is a flowchart illustrating an example of a method of identifying service logics for certain bandwidth-on-demand services, according to one embodiment.

FIG. 9 is a flowchart illustrating an example of a method of identifying specific service logics 144 for just-in-time bandwidth-on-demand (JBOD) and scheduled bandwidth-on-demand (SBOD) services, according to one embodiment. Provisioning and management functions associated with these two service classes will be described in more detail with reference to FIGS. 10A-10C and 11A-11D.

At step 700 of FIG. 9, the NG-OSS 140 receives a service command. The service command can include requests from L-1 client devices 58 (via the SMS 134) as discussed above or a timer notification generated by the subsystem 100, which will be described below. As discussed below, service commands may be received from an operation support subsystem (OSS) specific to a higher networking layer (e.g., Layer-2 or Layer-3 OSSs). The service command can include any of the parameters discussed above, including parameters identifying the service class requested (e.g., JBOD, SBOD, or other service), the type of action requested (e.g., setup, modify, or tear-down path commands), the source site and port identifications, the destination site and port identifications, bandwidth settings or adjustments, bandwidth schedules, session and path identifications, protection settings, restoration settings, period identification, etc.

At step 704, the NG-OSS 140 parses the service command. In particular, the NG-OSS 140 extracts parameters from the service command. The parameters can be inserted into another format for further processing.

At step 708, it is determined whether JBOD service is requested. This can be determined from a service class parameter setting. If it is determined at step 708 that JBOD service is not requested, processing moves to step 712. At step 712, it is determined whether SBOD service is requested. This can be determined from a service class parameter setting. If it is determined at step 712 that SBOD service is not requested, processing moves to step 716. At step 716, a service command specifying another service class can be processed. This may include processing services that are known to those skilled in the art. If a recognizable service class is not specified by the service command, then an error message is generated at step 716. The error message may be made available to the L-1 client device 58.

On the other hand, if it is determined at step 708 that JBOD service is requested, processing moves to step 720. At step 720, it is determined whether a setup path action is requested. This determination can be based on a parameter of the service command specifying a requested service action. If it is determined at step 720 that a setup path action is requested, processing continues at A, which will be discussed below in relation to FIG. 10A. On the other hand, if it is determined at step 720 that a setup path action is not requested, processing continues at step 724.

At step 724, it is determined whether a service modification action is requested. This determination can be based on a parameter of the service command specifying a requested service action. If it is determined at step 724 that a service modification action is requested, processing continues at B, which will be discussed below in relation to FIG. 10B. On the other hand, if it is determined at step 724 that a service modification action is not requested, processing continues at step 728.

At step 728, it is determined whether a path tear-down action is requested. This determination can be based on a parameter of the service command specifying a requested service action. If it is determined at step 728 that a path tear-down action is requested, processing continues at C, which will be discussed below in relation to FIG. 10C. On the other hand, if it is determined at step 728 that a path tear-down action is not requested, processing continues at step 730.

At step 730, a service command specifying another service action can be processed if another action recognizable and executable by the service logics 144 is specified in the service command. If a recognizable service action is not specified by the service command, then an error message is generated at step 730. The error message may be made available to the L-1 client device 58.

Returning to step 712, if is determined at this step that SBOD service is requested, processing moves to step 732. At step 732, it is determined whether a setup schedule action is requested. This determination can be based on a parameter of the service command specifying a requested service action. If it is determined at step 732 that a setup schedule action is requested, processing continues at D, which will be discussed below in relation to FIG. 11A. On the other hand, if it is determined at step 732 that a setup schedule action is not requested, processing continues at step 736.

At step 736, it is determined whether a schedule modification action is requested. This determination can be based on a parameter of the service command specifying a requested service action. If it is determined at step 736 that a service modification action is requested, processing continues at E, which will be discussed below in relation to FIG. 11B. On the other hand, if it is determined at step 736 that a schedule modification action is not requested, processing continues at step 740.

At step 740, it is determined whether a tear-down action is requested. This determination can be based on a parameter of the service command specifying a requested service action. If it is determined at step 740 that a tear-down action is requested, processing continues at F, which will be discussed below in relation to FIG. 11C. On the other hand, if it is determined at step 740 that a path tear-down action is not requested, processing continues at step 744.

At step 744, it is determined whether a scheduled timer expiration is indicated. This determination can be based on a parameter of the service command specifying a requested service action. The period transition can be indicated by a service command generated in response to a timer expiration notification. If it is determined at step 744 that a scheduled period transition is requested, processing continues at G, which will be discussed below in relation to FIG. 11D. On the other hand, if it is determined at step 744 that a scheduled period transition is not requested, processing continues at step 730, which is discussed above.

Once the service class and service action have been identified from a service command, appropriate service logics 144 are identified and executed to generate command sequences that are executable by the NG-OTN 110 to perform requested service actions. JBOD and SBOD service classes, as well as process flows of service logics 144 for certain examples of JBOD and SBOD service actions will now be discussed in more detail.

1. Just-in-Time Bandwidth-on-Demand (JBOD)

Just-in-time bandwidth-on-demand (JBOD) (also referred to as on-demand provisioning) services enable L-1 client devices 58 to request (e.g., by dial-up) transport services (e.g., broadband and wideband) of desired bandwidth, whenever and wherever it is desired. In some embodiments, the subsystem 100 can provision and activate the requested JBOD service within seconds or minutes of receiving the request. The technologies of the NG-OSS 140 and the NG-OTN 110 work together to provide quick reaction times for provisioning and managing JBOD services according to L-1 client device 58 requests. The JBOD services can include other service and provisioning features disclosed above (e.g., providing a range of bandwidths).

Figure 10A:
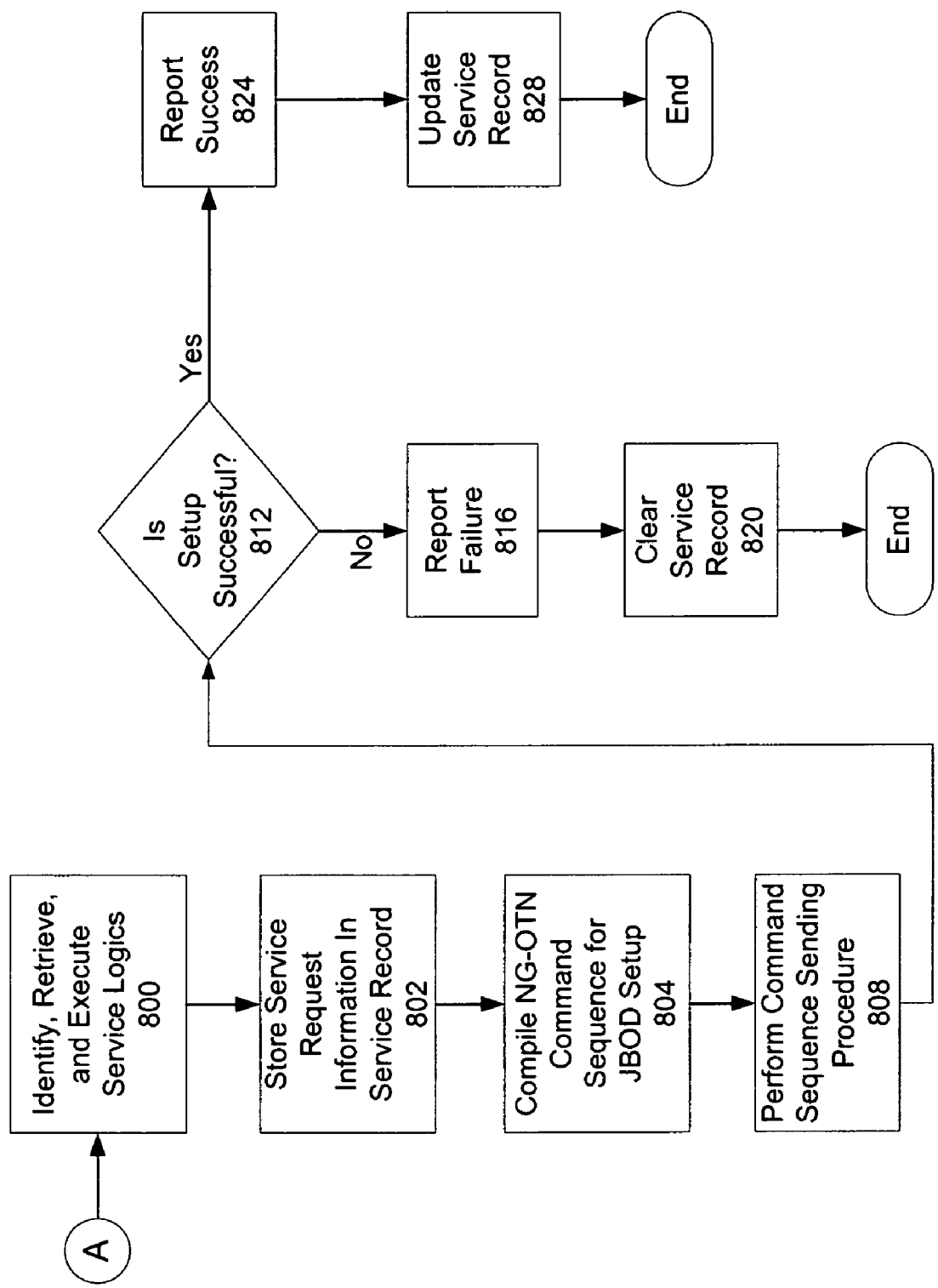
FIG. 10A is a flowchart showing one example of the flow of service logics for a setup request for just-in-time bandwidth-on-demand (JBOD) service.
Figure 10B:
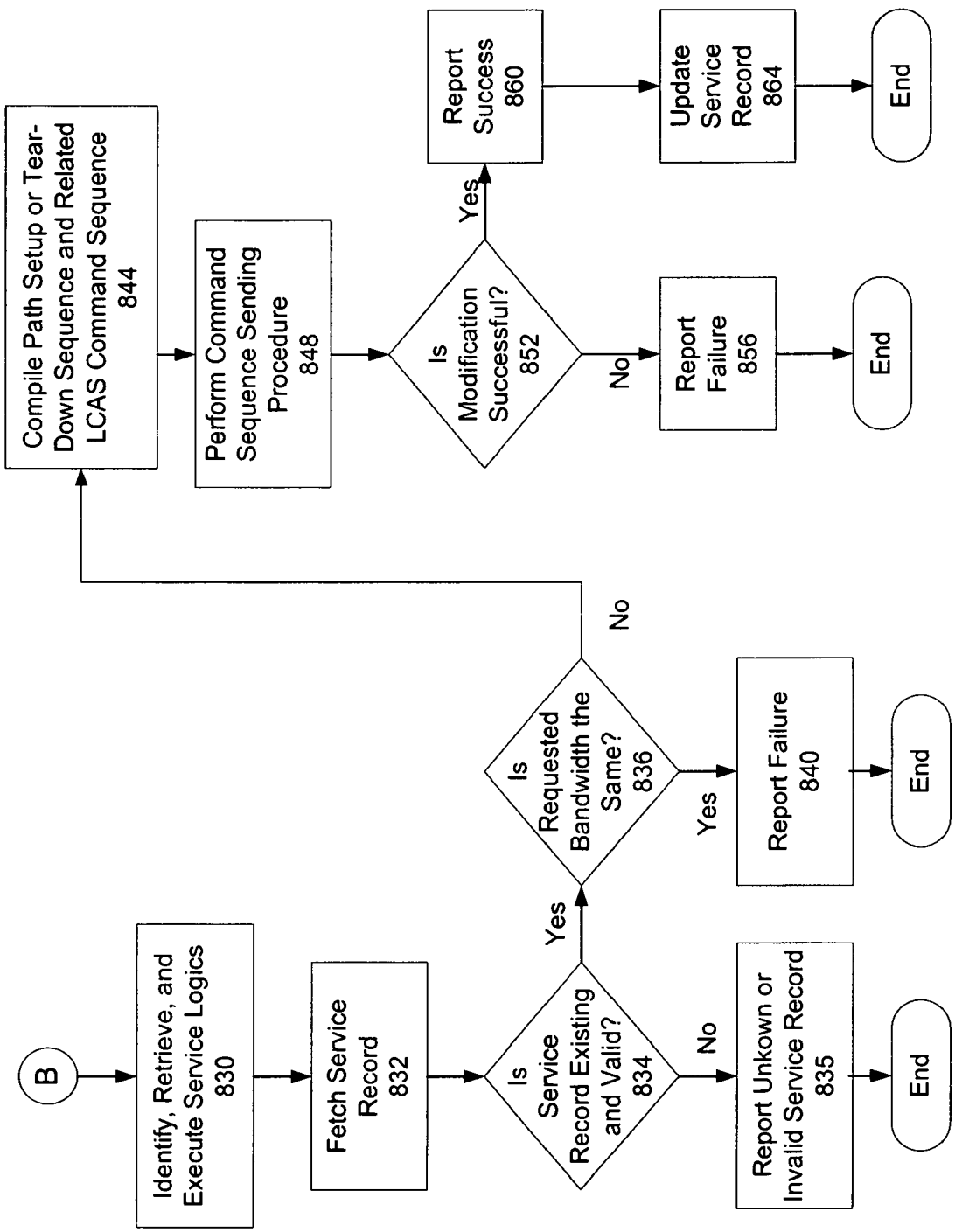
FIG. 10B is a flowchart showing one example of the flow of service logics for a modification request for a just-in-time bandwidth-on-demand (JBOD) service.
Figure 10C:
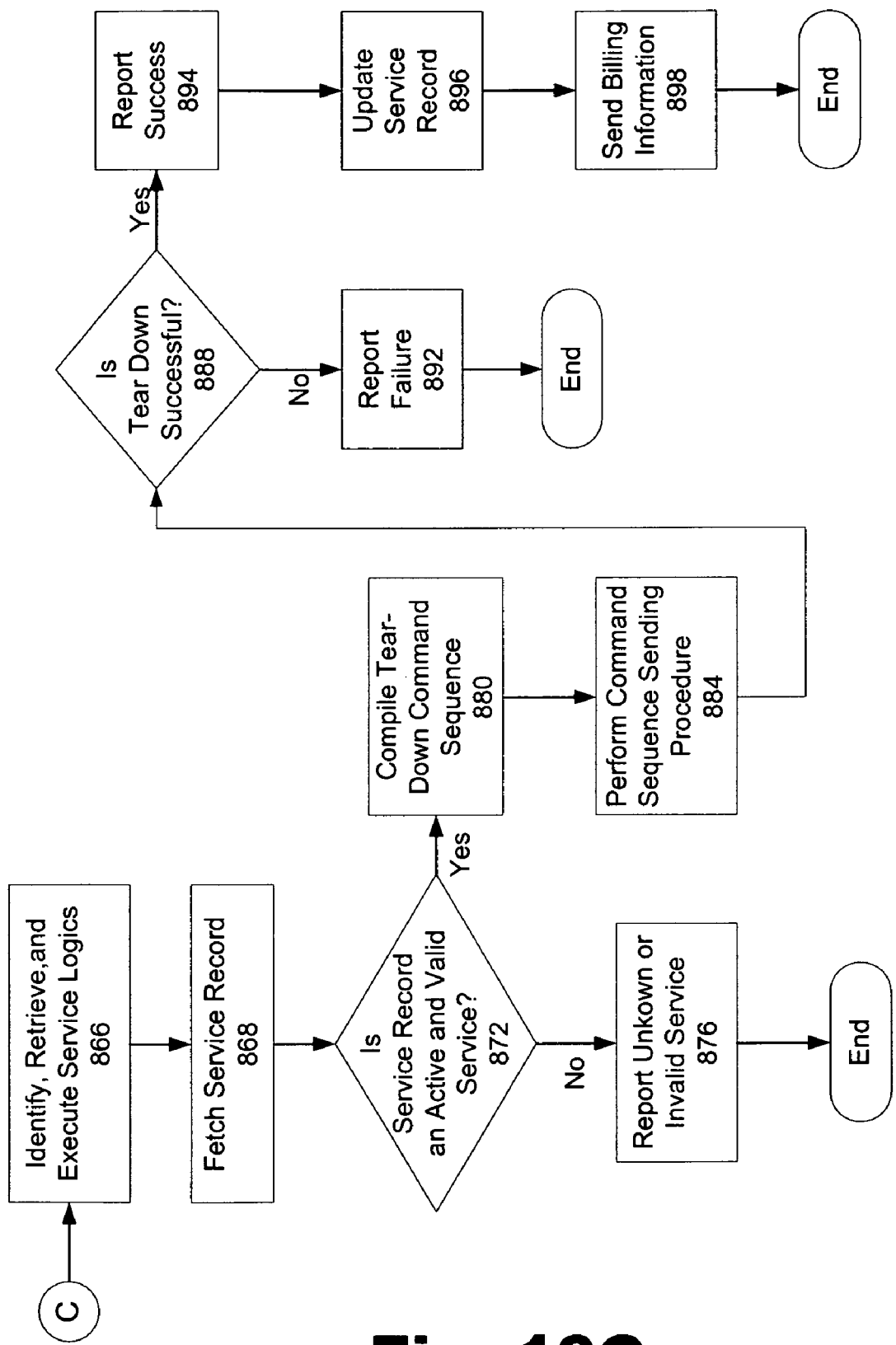
FIG. 10C is a flowchart showing one example of the flow of service logics for a tear-down request for a just-in-time bandwidth-on-demand (JBOD) service.

FIGS. 10A-10C are flowcharts showing examples of the flow of the service logics 144 defining JBOD services for three different JBOD service requests a setup request, a modification request, and a tear-down request. Prior to the beginning of the processes shown in FIGS. 10A-10C, the NG-OSS 140 initiates communications with network elements 54 of the NG-OTN 110. In some embodiments, these communications comprise Transaction Language 1 (TL1) communications. Once communications have been initiated with the NG-OTN 110, the NG-OSS 140 waits for notifications, including notifications of service requests from the SMS 134 and/or notifications of service commands (e.g., a timer notification or alarm) from the NG-OTN 110.

a. JBOD Setup Process Flow

When it is determined in the process of FIG. 9 that a service command indicates a JBOD path-setup request, the process shown in FIG. 10A begins at point A. At step 800, the NG-OSS 140 identifies, retrieves, and executes the appropriate service logics 144 for a JBOD path-setup command. Steps 802-828 describe the execution of the retrieved service logics 144. At step 802, NG-OSS 140 stores information associated with the service command, including request parameters, in a local service record (also referred to as a "local call record").

At step 804, the service logics module 400 compiles a sequence of commands for JBOD setup to be sent to an originating network element 54 of the NG-OTN 110 for execution. Step 804 includes executing the retrieved service logics 144 with the parameters in the local service record to generate a sequence of commands that can be executed by the NG-OTN 110. In one embodiment, execution of the retrieved service logics 144 generates TL1 commands that when executed by the elements of the NG-OTN 110 (e.g., the CPM 500, network elements 54, NG-SONET 132, and ICP 130) will cause the NG-OTN 110 to setup a JBOD path according to the features of JBOD services described above. Appropriate TL1 commands for setting up an active connection on Lucent platforms can be referenced at "LambdaUnite MSS—Operations System Engineering Guide", provided by Lucent Technologies of Murray Hill, N.J., which has been incorporated by reference in its entirety.

At step 808, the NG-OSS 140 performs a command sequence sending procedure for sending the command sequence to the NG-OTN 110. In one embodiment, the command sequence is a sequence of Transaction Language 1 (TL1) commands and the command procedure is a TL1 command sequence procedure that is performed as follows. The procedure sends the first TL1 command from the sequence and then polls for a result code with a timed wait of some predetermined period. If the NG-OSS 140 receives a negative acknowledgement from the NG-OTN 110 or times out, the procedure causes restoration TL1 commands to be issued to restore the network element 54 of the NG-OTN 110 to its initial condition. A failure code is generated. On the other hand, if a positive acknowledgment is received and no time-out occurs, the command sequence procedure repeats if the end of the command sequence has not yet been reached. Once the end of the sequence of commands is reached, processing continues at step 812.

At step 812, it is determined whether the setup was successful. This can be determined from output generated by the command sequence procedure. If it is determined at step 812 that setup was not successful, processing continues and step 816, at which step the NG-OSS 140 reports the failure and failure code to the L-1 client device 58. At 820, the service record is cleared. The NG-OSS 140 then waits for another service request.

On the other hand, if it is determined at step 812 that setup was successful; the success is reported to the L-1 client device 58 along with a new path identification at step 824. At step 828, the service record and related databases are updated to reflect the successful setup. The NG-OSS 140 then waits for another service request.

b. JBOD Modification Process Flow

When it is determined in the process of FIG. 9 that a service command indicates a JBOD modification request, the process shown in FIG. 10B begins at point B. At step 830, the NG-OSS 140 identifies, retrieves, and executes the appropriate service logics 144 for a JBOD modification command. Steps 832-864 describe the execution of the retrieved service logics 144. At step 832, the NG-OSS 140 fetches the particular service record identified by the service command. At step 834, it is determined if the fetched service record is active and valid. If it is determined at step 834 that the service record is not active and valid, processing moves to step 835. At step 835, the unknown or invalid service record is reported.

On the other hand, if is determined at step 834 that the fetched service record is valid and active, process continues at step 836. At step 836, the NG-OSS 140 determines whether the requested bandwidth modification setting is the same as the current bandwidth setting of the identified service request. This determination can be made by comparing the current bandwidth setting identified by the service record with the parameter of the service commands specifying the new bandwidth request. If it is determined at step 836 that the bandwidth settings are the same, processing continues at step 840, at which step a modification failure is reported. The NG-OSS 140 can make the modification failure available to the L-1 client device 58. The NG-OSS 140 then waits for another service request.

On the other hand, if it is determined at step 836 that the bandwidth settings are not the same, processing continues at step 844. At step 844, the service logics module 400 compiles a command sequence to execute link capacity adjustments schemes (LCAS) for the requested bandwidth using NG-SONET technologies in the NG-OTN 110. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for modifying an active connection on Lucent platforms can be referenced at "LambdaUnite MSS—

Operations System Engineering Guide", provided by Lucent Technologies of Murray Hill, N.J., which has been incorporated by reference in its entirety. At step 848, the NG-OSS 140 performs a command sequence procedure for sending the command sequence to the NG-OTN 110. The command sequence procedure may be the same command procedure described above in relation to FIG. 10A.

At step 852, it is determined whether the modification was successful. This can be determined from output generated by the command sequence procedure or by other messages received from the NG-OTN 110. If it is determined at step 852 that modification was not successful, processing continues at step 856, at which step the NG-OSS 140 reports the failure and failure code to the L-1 client device 58. The NG-OSS 140 then waits for another service request.

On the other hand, if it is determined at step 852 that modification was successful, the success is reported to the L-1 client device 58. Success can be determined from messages received from the NG-OTN 110. At step 864, the service record and related databases are updated to reflect the successful modification. The NG-OSS 140 then waits for another service request.

c. JBOD Tear-Down Process Flow

When it is determined in the process of FIG. 9 that a service command indicates a JBOD tear-down request, the process shown in FIG. 10C begins at point C. At step 866, the NG-OSS 140 identifies, retrieves, and executes the appropriate service logics 144 for a JBOD tear-down command. Steps 868-898 describe the execution of the retrieved service logics 144. At step 868, the NG-OSS 140 fetches the particular service record identified by parameters of the service command. At step 872, the NG-OSS 140 determines whether the identified service record indicates an active and valid service (e.g., an active call). If it is determined at step 872 that the service record is not an active service, processing continues at step 876, at which step an "unknown service" or "invalid service" error is reported to the L-1 client device 58. The NG-OSS 140 then waits for another service request.

On the other hand, if it is determined at step 872 that the service record is an active service, processing continues at step 880. At step 880, the service logics module 400 compiles a tear-down command sequence to be executed by the NG-OTN 110 to tear down the service. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for tearing down an active connection on Lucent platforms can be referenced at "LambdaUnite MSS—Operations System Engineering Guide", provided by Lucent Technologies of Murray Hill, N.J., which has been incorporated by reference in its entirety. At step 884, the NG-OSS 140 performs a command sequence procedure for sending the command sequence to the NG-OTN 110. The command sequence procedure may be the same command procedure described above in relation to FIG. 10A.

At step 888, it is determined whether the tear down was successful. This can be determined from output generated by the command sequence procedure and/or by messages received from the NG-OTN 110. If it is determined at step 888 that tear down was not successful, processing continues and step 892, at which step the NG-OSS 140 reports the failure and failure code to the L-1 client device 58. The NG-OSS 140 may also generate a trouble ticket to trace the problem. The NG-OSS 140 then waits for another service request.

On the other hand, if it is determined at step 888 that tear down was successful, the success is reported to the L-1 client device 58 at step 894. At step 896, the service record and related databases are updated to reflect the successful tear down. At step 898, billing information may be sent to accounting. The NG-OSS 140 then waits for another service request.

While examples have been discussed for setup, modification, and tear-down commands, the service logics 144 defining JBOD services can be configured to process many other JBOD service related commands or requests. Further, those skilled in the art will recognize that JBOD command sequences to be executed by the NG-OTN 110 can utilize protocols other than TL1. For example, the NG-OSS 140 may be configured with service logics 144 designed to generate CORBA (e.g., using a TMF-814 based information model), XML, and SNMP protocols.

2. Scheduled Bandwidth on-Demand (SBOD)

Scheduled bandwidth-on-demand (SBOD) services enable L-1 client devices 58 to submit bandwidth schedules along with service requests to take advantage of predictable or repetitive patterns of bandwidth usage. SBOD services provide L-1 client devices 58 with the ability to schedule bandwidth and other provisioning services in advance. Using SBOD services, the service provider is able to provide subscribers with bandwidth according to the submitted schedules. In one embodiment, all scheduled bandwidth changes are generally completed within a few minutes of the scheduled time. SBOD services provide subscribers, especially enterprise subscribers, with the ability to tailor service bandwidths to actual usage patterns, thereby providing subscribers with control of their operation efficiency and communications costs. Subscribers can decrease costs of communications services, especially during non-peak periods. SBOD services can further include other service and provisioning features disclosed above.

FIGS. 11A-11D are flowcharts showing examples of the flow of the service logics 144 defining SBOD services for four different SBOD service requests a schedule setup request, a modification request, a tear-down request, and a timer notification. Prior to the beginning of the processes shown in FIGS. 11A-11D, the NG-OSS 140 initiates communications with network elements 54 of the NG-OTN 110. In some embodiments, these communications comprise Transaction Language (TL1) communications. Once communications have been initiated with the NG-OTN 110, the NG-OSS 140 launches a timer thread for keeping time to recognize beginning and end times of bandwidth periods. The NG-OSS 140 then waits for notifications, including notifications of service requests from the SMS 134, timer notifications, and/or notifications of service commands (e.g., a timer notification or alarm) from the NG-OTN 110.

SBOD service logics 144 may be configured to monitor for alarm notifications related to the communications lines to the NG-OTN 110. For example, service logics 144 defining SBOD can check for TL1 alarm notifications. If a TL1 alarm is received, the NG-OSS 140 acknowledges and logs the alarm. The subsystem 100 can also notify network or system operators of the alarm.

a. SBOD Setup Process Flow

Figure 11A:
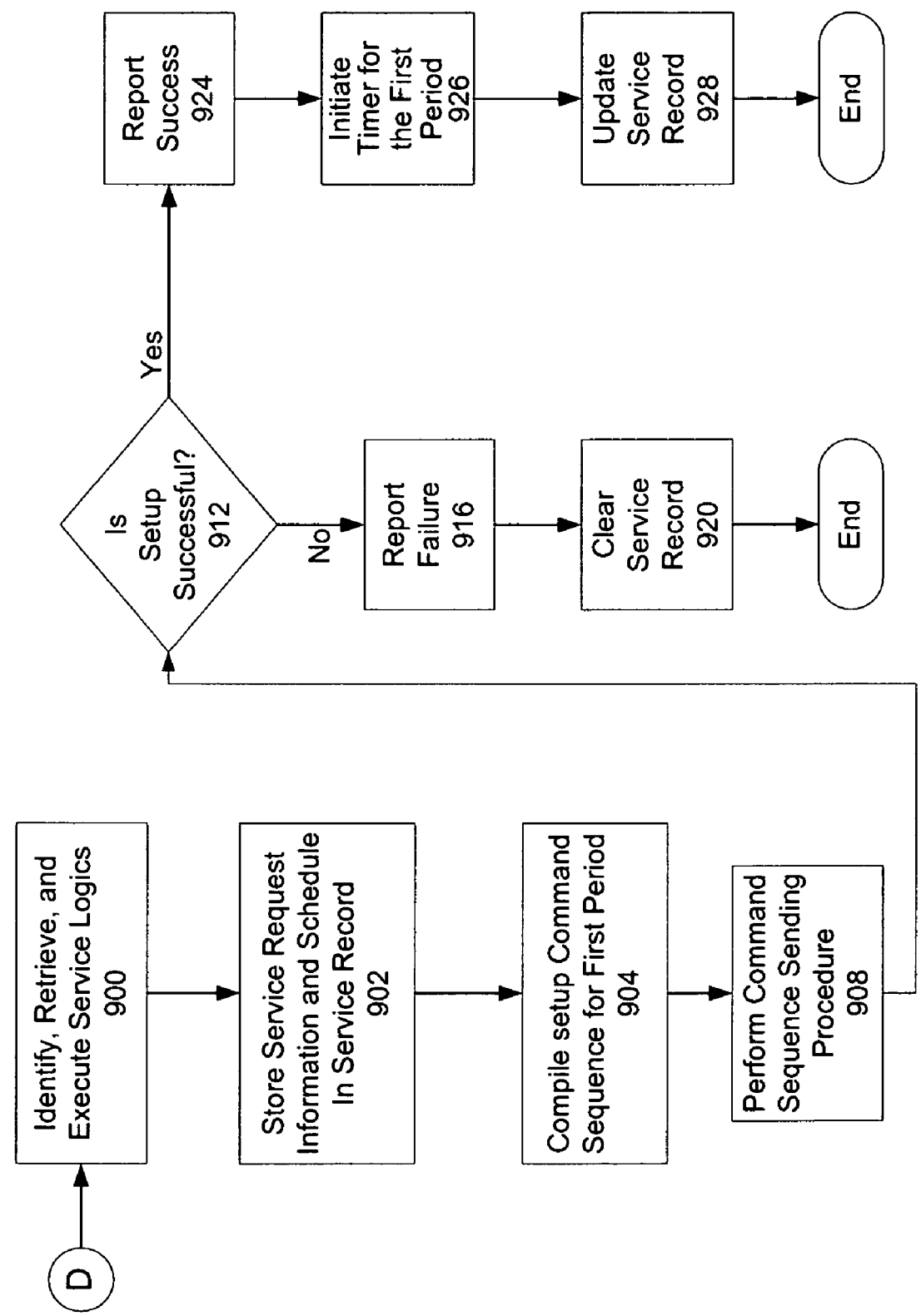
FIG. 11A is a flowchart showing one example of the flow of service logics for a setup request for a scheduled bandwidth-on-demand (SBOD) service.

When it is determined in the process of FIG. 9 that a service command indicates a SBOD schedule-setup request, the process shown in FIG. 11A begins at point D. At step 900, the NG-OSS 140 identifies, retrieves, and executes the appropriate service logics 144 for a SBOD schedule-setup command. Steps 902-928 describe the execution of the retrieved service logics 144. At 902, NG-OSS 140 stores information associated with the service command, including bandwidth schedules and other command parameters, in a local service record (also referred to as a "local call record"). At 904, the service logics module 400 compiles a sequence of commands for the first period identified in a bandwidth schedule to be sent to an originating network element 54 of the NG-OTN 110 for execution. The sequence of commands can include port identification, classes of service (CoS), and/or quality of service (QoS) parameters to be sent to the proper network elements 54 for the first period of time specified in the submitted schedule. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for setting up a service path on Lucent platforms according to the schedule can be referenced at "LambdaUnite MSS—Operations System Engineering Guide", provided by Lucent Technologies of Murray Hill, N.J., which has been incorporated by reference in its entirety.

At step 908, the NG-OSS 140 performs a command sequence procedure for sending the command sequence to the NG-OTN 110. The command sequence procedure may be the same command procedure described above in relation to FIG. 10A.

At step 912, it is determined whether the setup was successful. This can be determined from output generated by the command sequence procedure and/or from messages received from the NG-OTN 110, which messages the NG-OSS 140 is configured to interpret. If it is determined at step 912 that setup was not successful, processing continues at step 916, at which step the NG-OSS 140 reports the failure and failure code to the L-1 client device 58. At step 920, the service record is cleared. The NG-OSS 140 then waits for another notification.

On the other hand, if it is determined at step 912 that setup was successful, the success is reported to the L-1 client device 58. A new path identification is also reported at step 924 if a path is established for the first service period specified in the service schedule. At step 926, a timer for the first period of the scheduled service is initiated. At step 928, the service record and related databases are updated to reflect the successful setup. The NG-OSS 140 then waits for another notification.

b. SBOD Modification Process Flow

Figure 11B:
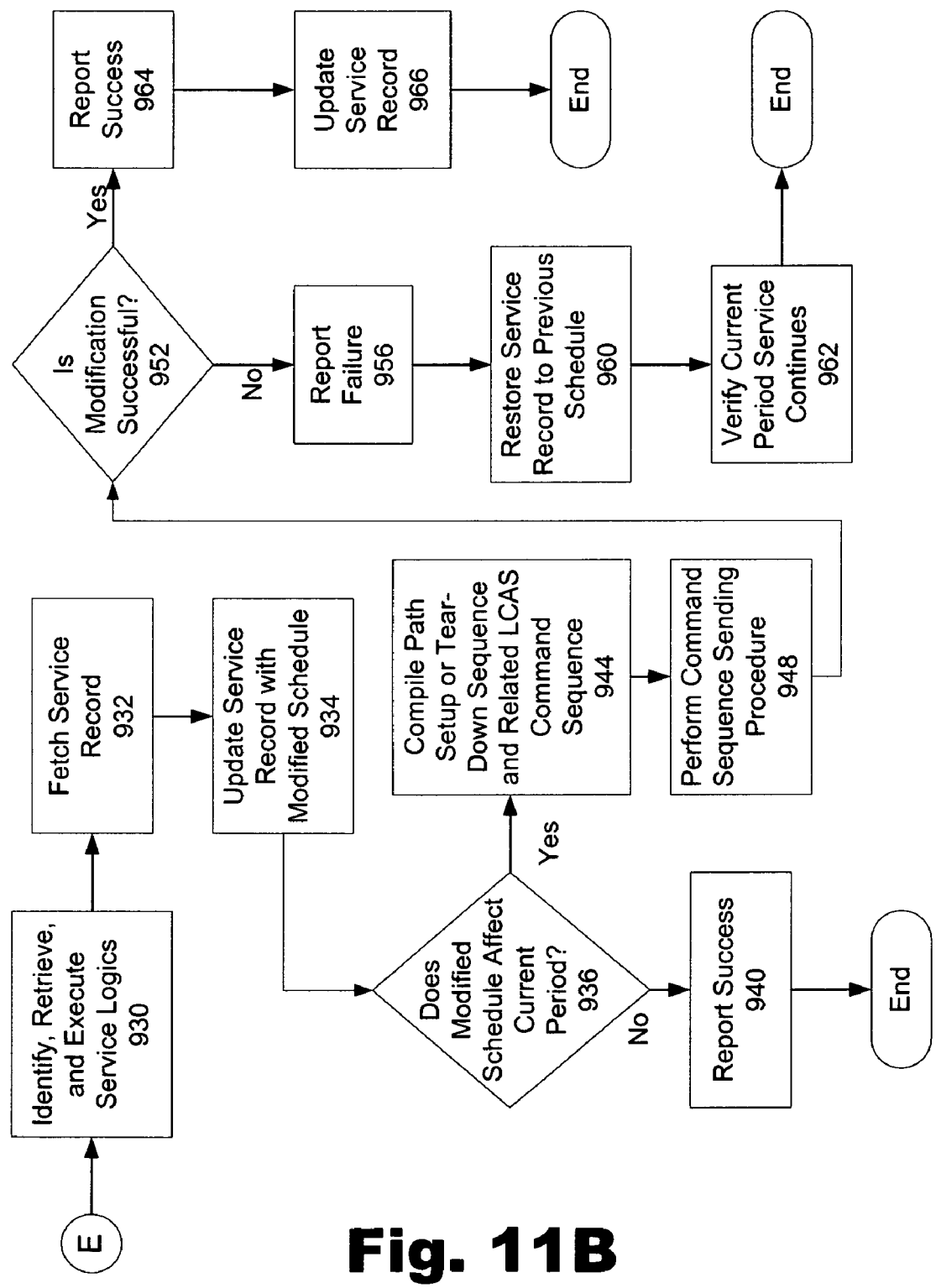
FIG. 11B is a flowchart showing one example of the flow of service logics or a modification request for a scheduled bandwidth-on-demand (SBOD) service.

When it is determined in the process of FIG. 9 that a service command indicates a SBOD schedule modification, the process shown in FIG. 11B begins at point E. At step 930, the NG-OSS 140 identifies, retrieves, and executes the appropriate service logics 144 for a SBOD schedule-setup command. Steps 932-966 describe the execution of the retrieved service logics 144. At step 932, the NG-OSS 140 fetches the particular service record identified by the modification command. At step 934, the identified service record is updated with a modified or new schedule according to parameters provided with the modification command. At step 936, the NG-OSS 140 determines whether the modified schedule will affect the current time period. If it is determined at step 936 that service provided during the current time period will not be affected by the new schedule, processing continues at step 940, at which step a modification success is reported along with a path identification. The NG-OSS 140 then waits for another service request.

On the other hand, if it is determined at step 936 that modified schedule will affect service provided during the current time period, processing continues at step 944. At step 944, the service logics module 400 compiles a command sequence to execute link capacity adjustments schemes (LCAS) for the remainder of the current period using NG-SONET technologies in the NG-OTN 110. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for modifying a service path (e.g., bandwidth of a path) on Lucent platforms according a service schedule can be referenced at "LambdaUnite MSS—Operations System Engineering Guide", provided by Lucent Technologies of Murray Hill, N.J., which has been incorporated by reference in its entirety.

At step 948, the NG-OSS 140 performs a command sequence procedure for sending the command sequence to the NG-OTN 110. The command sequence procedure may be the same command procedure described above in relation to FIG. 10A.

At step 952, it is determined whether the modification was successful. This can be determined from output generated by the command sequence procedure and/or from messages received from the NG-OTN 110, which the NG-OSS 140 is configured to interpret. If it is determined at step 952 that modification was not successful, processing continues at step 956, at which step the NG-OSS 140 reports the failure and failure code to the L-1 client device 58. At step 960, the service record is restored to the previous schedule. At step 962, the NG-OSS 140 verifies that service for the current period continues. The NG-OSS 140 then waits for another notification.

On the other hand, if it is determined at step 952 that modification was successful, the success is reported to the L-1 client device 58 along with the path identification at step 964. At step 966, the service record and related databases are updated to reflect successful transition to the new period. The NG-OSS 140 then waits for another notification.

c. SBOD Tear-Down Process Flow

Figure 11C:
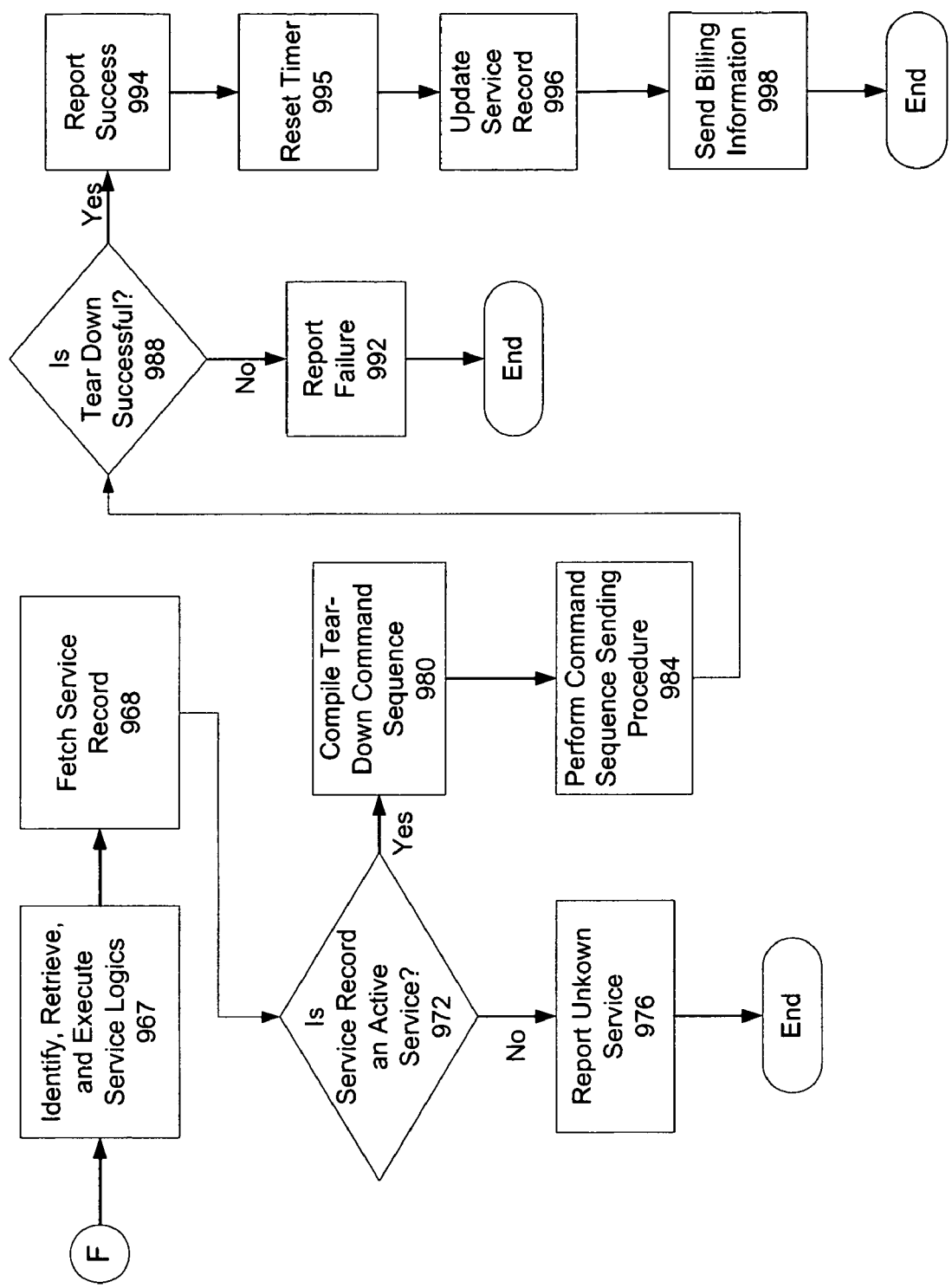
FIG. 11C is a flowchart showing one example of the flow of service logics for a tear-down request for a scheduled bandwidth-on-demand (SBOD) service.

When it is determined in the process of FIG. 9 that a service command indicates a SBOD tear-down action, the process shown in FIG. 11C begins at point F. At step 967, the NG-OSS 140 identifies, retrieves, and executes the appropriate service logics 144 for a SBOD tear-down command. Steps 968-998 describe the execution of the retrieved service logics 144. At step 968, the NG-OSS 140 fetches the particular service record identified by the service request. At step 972, the NG-OSS 140 determines whether the identified service record indicates an active service (e.g., an active call). If it is determined at step 972 that the service record is not an active service, processing continues at step 976, at which step an "unknown service" error is reported to the L-1 client device 58. The NG-OSS 140 then waits for another notification.

On the other hand, if it is determined at step 972 that the service record is an active service, processing continues at step 980. At step 980, the service logics module 400 compiles a tear-down command sequence to execute be executed by the NG-OTN 110 to tear down the VCAT path for the service. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for tearing down a service schedule and/or a service path (e.g., bandwidth of a path) on Lucent platforms according a service schedule can be referenced at "LambdaUnite MSS—Operations System Engineering Guide", provided by Lucent Technologies of Murray Hill, N.J., which has been incorporated by reference in its entirety.

At step 984, the NG-OSS 140 performs a command sequence procedure for sending the command sequence to the NG-OTN 110. The command sequence procedure may be the same command procedure described above in relation to FIG. 10A.

At step 988, it is determined whether the tear down was successful. This can be determined from output generated by the command sequence procedure and/or message received from the NG-OTN 110, which can be interpreted by the NG-OSS 140. If it is determined at step 988 that tear down was not successful, processing continues at step 992, at which step the NG-OSS 140 reports the failure and failure code to the L-1 client device 58. The NG-OSS 140 may also generate a trouble ticket to trace the problem. The NG-OSS 140 then waits for another service request.

On the other hand, if it is determined at step 988 that tear down was successful, the success is reported to the L-1 client device 58 at step 994. At step 995, the timer is reset. At step 996, the service record and related databases are updated to reflect the successful tear down. At step 998, billing information may be sent to accounting. The NG-OSS 140 then waits for another notification.

d. SBOD Timer Notification Process Flow

Figure 11D:
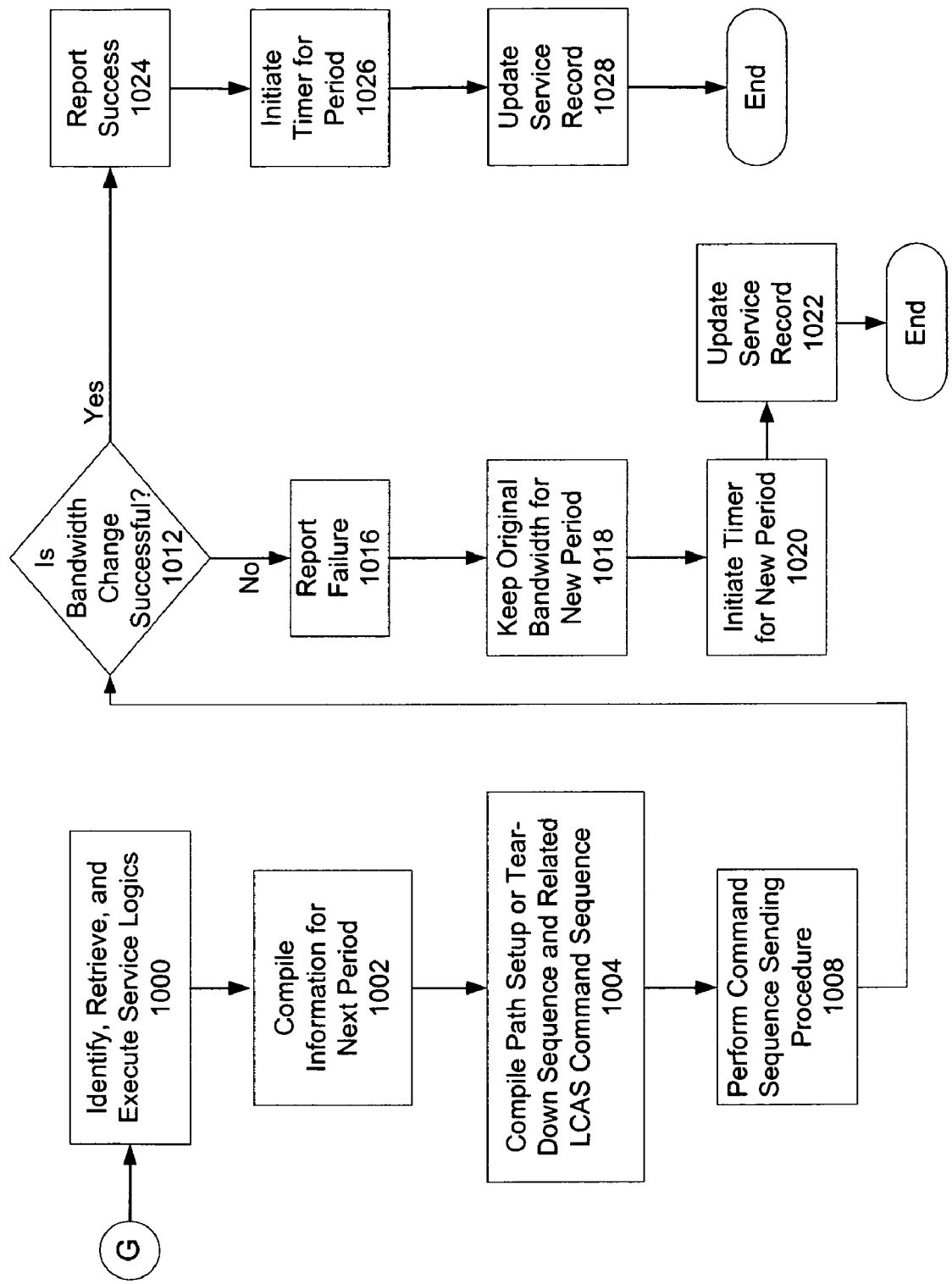
FIG. 11D is a flowchart showing one example of the flow of service logics for a timer expiration notification for a scheduled bandwidth-on-demand (SBOD) service.

When it is determined in the process of FIG. 9 that a service command indicates a SBOD period transition (timer expiration notification) action, the process shown in FIG. 11D begins at point G. At step 1000, the NG-OSS 140 identifies, retrieves, and executes the appropriate service logics 144 for a SBOD period transition command. Steps 1002-1028 describe the execution of the retrieved service logics 144. At step 1002, NG-OSS 140 compiles information associated with the next period and calculates the bandwidth change scheduled for the new period. This information can be accessed from the service record, command parameters, and/or service logics 144. At step 1004, the service logics module 400 compiles a sequence of LCAS commands to be sent to an originating network element 54 of the NG-OTN 110 for execution. The sequence of commands can include port identification, classes of service (CoS), required bandwidth change, and/or quality of service (QoS) parameters to be sent to the proper network elements 54 for the new period of time specified in the service schedule. In one embodiment, the service logics module 400 is configured to generate a TL1 command sequence based on the retrieved service logics 144 and the parameters specified in the service command. Settings identified in the service record can also be used to compile the TL1 command sequence. Appropriate TL1 commands for modifying a service on Lucent platforms to transition to a new service schedule period can be referenced at "LambdaUnite MSS—Operations System Engineering Guide", provided by Lucent Technologies of Murray Hill, N.J., which has been incorporated by reference in its entirety.

At step 1008, the NG-OSS 140 performs a command sequence procedure for sending the command sequence to the NG-OTN 110. The command sequence procedure may be the same command procedure described above in relation to FIG. 10A.

At step 1012, it is determined whether the bandwidth change was successful. This can be determined from output generated by the command sequence procedure and/or from messages received from the NG-OTN 110. If it is determined at step 1012 that setup was not successful, processing continues at step 1016, at which step the NG-OSS 140 reports the failure and failure code to the L-1 client device 58. At step 1018, the subsystem 100 maintains the current bandwidth for the new period. At step 1020, the timer for the new period is initiated. At step 1022, the service record and related databases are updated to reflect failed transition to the new period. The NG-OSS 140 then waits for another notification.

On the other hand, if it is determined at step 1012 that setup was successful, the success is reported to the L-1 client device 58 along with a new period message and number at step 1024. At step 1026, a timer for the new period is initiated. At step 1028, the service record and related databases are updated to reflect successful transition to the new period. The NG-OSS 140 then waits for another notification.

While examples have been discussed for setup, modification, tear-down, and timer notifications, the service logics 144 defining SBOD services can be configured to process many other SBOD service related commands or requests. Those skilled in the art will recognize that SBOD command sequences to be executed by the NG-OTN 110 can utilize protocols other than TL1. For example, the NG-OSS 140 may be configured with service logics 144 designed to generate CORBA, XML, and SNMP protocols.

The embodiments described above provide bandwidth-on-demand services at Layer 1 and functions for managing and provisioning those services. In particular, the subsystem 100 provides infrastructure for implementing and managing Layer-1 bandwidth-on-demand services that provide flexible, cost efficient, and adjustable communications services to subscribers.

V. Layer-2 and Layer-3 Bandwidth-on-Demand Services

The bandwidth-on-demand (BOD) services provided at the physical layer 50 (Layer 1) as described above are not limited in application to Layer 1 services. Higher-layer networking services (e.g., Layer 2 and/or Layer 3 services) are also able to utilize the above-described BOD provisioning services provided at Layer 1, as discussed below. The present systems and methods provide service logics and bandwidth provisioning policies configured to intelligently manage BOD provisioning to maintain desired QoS levels for services at the network functional layers 30, as discussed below.

VI. Policy-Based Intelligent Provisioning (PBIP) System

Figure 12:
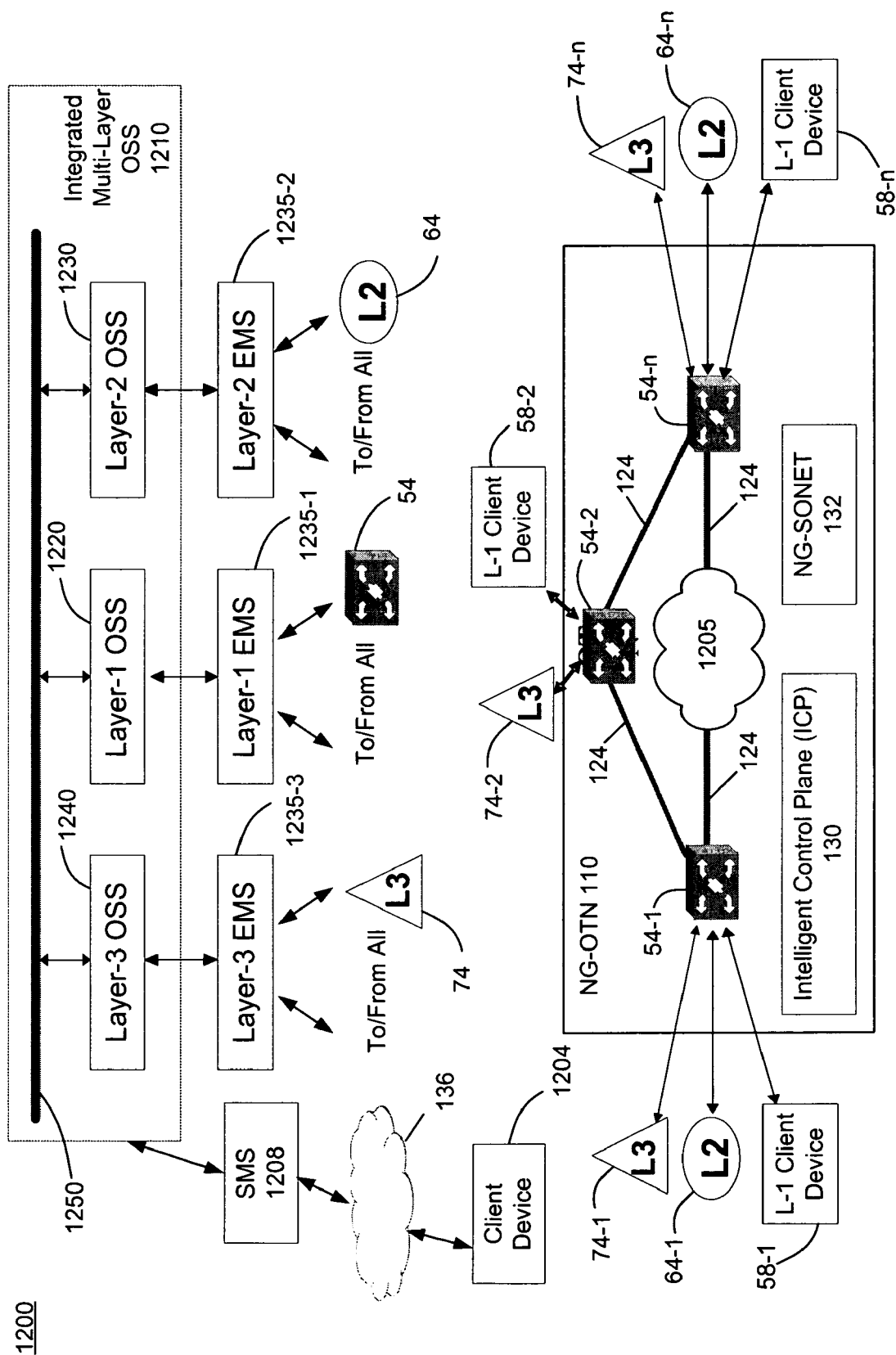
FIG. 12 is a block diagram of a policy-based intelligent provisioning (PBIP) system, according to one embodiment.

FIG. 12 is a block diagram of a policy-based intelligent provisioning (PBIP) system 1200 configured to provide on-demand bandwidth provisioning for Layer 1, Layer 2, and/or Layer 3 services, according to one embodiment. As shown in FIG. 12, the system 1200 includes the Layer-1 transport layer provided by the NG-OTN 110. Accordingly, the system 1200 supports the Layer-1 BOD services discussed above with respect to the subsystem 100. In addition, Layer-2 network elements 64 and Layer-3 network elements 74 may access bandwidth provided by the Layer-1 network elements 54 to utilize the Layer-1 BOD services. This allows Layer-2 and Layer-3 services to establish sub-networks over the NG-OTN 110 for the transport of Layer-2 and Layer-3 service data. The Layer-2 and Layer-3 sub-networks may be configured as discussed below to request and use the BOD provisioning services provided by the physical layer 50. Any known interface may be used to support communications between L-1 network elements 54 and the L-2 network elements 64 and L-3 network elements 74 for accessing and apportioning bandwidth. In FIG. 12, a cloud 1205 is shown in the NG-OTN 110 to emphasize the scalability of paths over the NG-OTN 110.

A. Client Device

As shown in FIG. 12, a client device 1204 is in communication with a service management subsystem 1206 via the access interface 136. The client device 1204 may include any of the devices and functionalities described above in relation to the L-1 client devices 58. In addition, the client device 1204 may be configured with logic for requesting, monitoring, and otherwise managing Layer-2 and/or Layer-3 services. Accordingly, subscribers may use the client device 1204 to submit service requests, view service status reports, monitor progress of order processing, monitor resource usages, and any other function related to managing any of the services provided by the system 1200. Further, the client device 1204 may be configured to include the same functionalities provided by the network elements of Layer 1, Layer 2, and/or Layer 3. While FIG. 12 shows only one client device 1204, multiple client devices 1204 may be used to interact with the system 1200.

B. Service Management Subsystem (SMS)

The service management subsystem (SMS) 1208 is configured to provide a system 1200 communications interface with the client device 1204. The SMS 1208 may include any of the devices and functionalities described above in relation to the SMS 134. In addition, the SMS 1208 is configured to process information related to multiple different layer services (e.g., Layer-1, Layer-2, and/or Layer-3 services). In particular, the SMS 1208 is able to format data into proper formats to facilitate communications between the client device 1204 and any layer-specific operation support subsystem (OSS) of the system 1200. For example, the SMS 1208 may receive a service request initiated at the client device 1204. The SMS 1208 is able to format the service request and any parameters accompanying the service request into a format suitable for processing by an OSS of the system 1200.

The SMS 1208 then sends the service request (which now may be referred to as a service command) to the particular layer-specific OSS suited to process the particular service command. In reverse fashion, the SMS 1208 is configured to format and pass information from an OSS of the system 1200 to the client device 1204.

C. Integrated Multi-Layer OSS

The system 1200 includes an integrated multi-layer OSS 1210 (or simply the "multi-layer OSS 1210") capable of managing the intelligent provisioning of the system 1200. As shown in FIG. 12, the multi-layer OSS 1210 includes layer-specific OSSs, including a Layer-1 OSS 1220, Layer-2 OSS 1230, and Layer-3 OSS 1240 for managing Layer-1, Layer-2, and Layer-3 services and network elements, respectively.

As will be appreciated by those skilled in the art, the OSS on each layer may have access to all network elements on its layer through respective element management subsystem (EMSs) 1235-1, 1235-2, and 1235-3 (collectively the "EMSs 1235). The EMSs 1235 are layer-specific. The Layer-1 EMS 1235-1 may be configured to function as described above in relation to the EMS 150. In similar fashion, the Layer-2 and Layer 3 EMSs 1235-2 and 1235-3 may be configured to support communications between L-2 network elements 64 and L-3 network elements 74, respectively. In alternative embodiments, the layer-specific OSSs may have direct access to their respective network elements without going through the EMSs 1235, as discussed above in relation to the OSN 142.

The layer-specific OSSs of the system 1200 are in communication with each other. As shown in FIG. 12 for example, the system 1200 includes an OSS interface 1250 that provides a connection between the layer-specific OSSs. The OSS interface 1250 may comprise any known communication technology or technologies known to those skilled in the art that are capable of providing reliable bi-directional communications between the layer-specific OSSs. For example, the OSS interface 1250 may comprise an information bus capable of supporting reliable bi-directional communications. In one embodiment, the OSS interface 1250 includes an information bus capable of supporting TeleManagement Forum's Multi-Technology Operation System Interface (MTOSI) standards. Although not shown in FIG. 12, the OSS interface 1250 may be implemented over the OSN 142.

By configuring the layer-specific OSSs 1220, 1230, and 1240 of the system 1200 to communicate with one another, services at a particular layer are able to utilize services at another layer. For example, as discussed below in more detail, the Layer-3 OSS 1240 and/or the Layer-2 OSS 1230 may send information (e.g., service requests) to the Layer-1 OSS 1220 to utilize Layer-1 services.

Figure 13A:
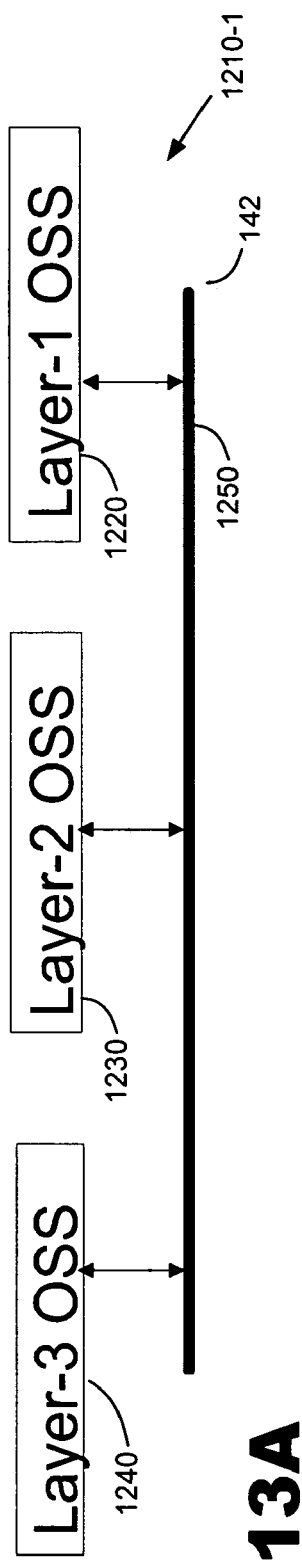
FIG. 13A is a block diagram of the integrated multi-layer OSS of FIG. 12, according to one embodiment.
Figure 13B:
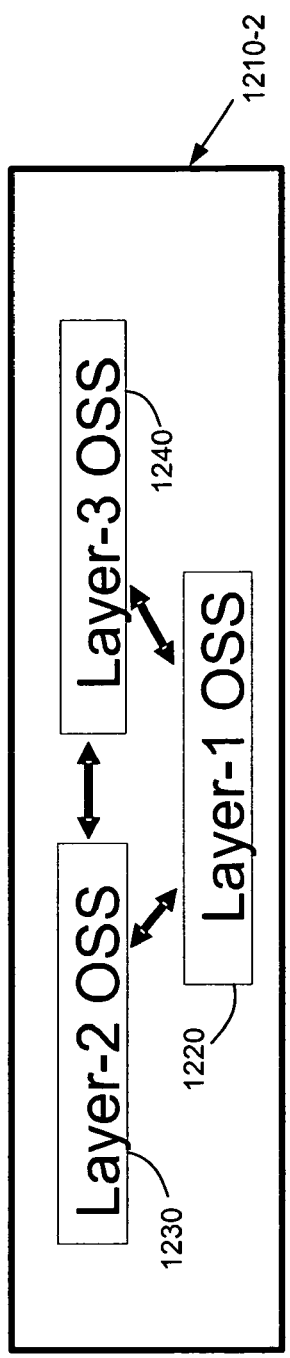
FIG. 13B is a block diagram of the integrated multi-layer OSS of FIG. 12, according to another embodiment.
Figure 13C:
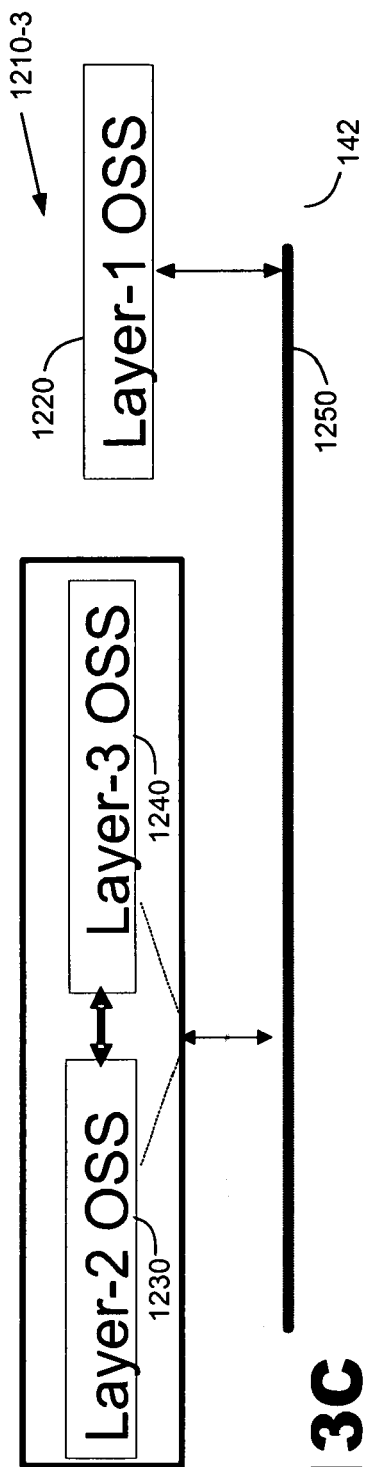
FIG. 13C is a block diagram of the integrated multi-layer OSS of FIG. 12, according to yet another embodiment.

While FIG. 12 illustrates a particular configuration of the layer-specific OSSs 1220, 1230, and 1240 connected by the OSS interface 1250, many other configurations may be used to establish communication between layer-specific OSSs. For example, FIGS. 13A-13C illustrate different configurations of the layer-specific OSSs in the integrated multi-layer OSS 1210. FIG. 13A is a block diagram of the multi-layer OSS 1210 of FIG. 12, according to one embodiment. In FIG. 13A, a multi-layer OSS 1210-1 includes the layer-specific OSSs arranged are separate entities in a fully-distributed configuration and connected by the OSS interface 1250 in the form of an information bus. As shown in the Figure, the information bus may be implemented over the operation support network (OSN) 142.

FIG. 13B is a block diagram of the integrated OSS of FIG. 12, according to another embodiment. In FIG. 13B, a multi-layer OSS 1210-2 includes the layer-specific OSSs fully integrated into the same platform. In this embodiment, communications between the layer-specific OSSs can be supported by any known platform-specific communication mechanism.

FIG. 13C is a block diagram of the integrated OSS of FIG. 12, according to yet another embodiment. The embodiment shown in FIG. 13C is an example of one of many possible embodiments of an integrated multi-service OSS 1210-3 that is based on a combination of distributed and integrated configurations of the layer-specific OSSs. In the integrated multi-service OSS 1210-3 of FIG. 13C, the Layer-2 OSS 1230 and the Layer-3 OSS 1240 are integrated into the same platform. That platform is in communication with distributed Layer-1 OSS 1220 through the OSS interface 1250. Many possible combinations of distributed and integrated approaches may be implemented in the system 1200 to provide application-specific benefits.

Regardless of the configuration of the integrated multi-service OSS 1210, connectivity is established between the layer-specific OSSs. More specifically, any module (discussed below) of a particular layer-specific OSS may communicate with any module of another layer-specific OSS. This will become more apparent from the following description of the layer-specific OSSs shown in FIG. 14.

Figure 14:
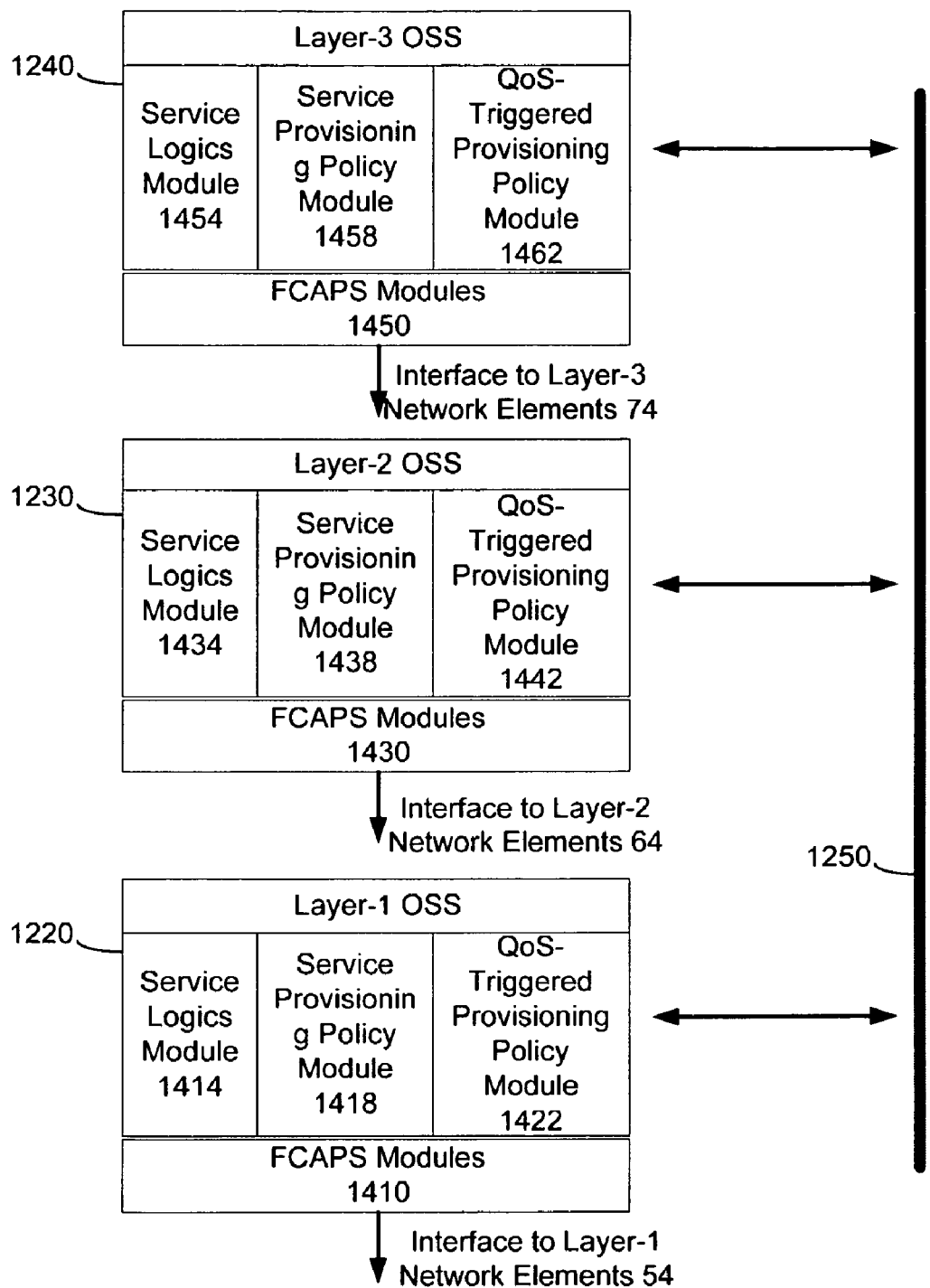
FIG. 14 is a more detailed block diagram of the layer-specific OSSs of the integrated multi-layer OSS of FIG. 12, according to one embodiment.

FIG. 14 is a more detailed block diagram of the layer-specific OSSs of the integrated multi-service OSS 1210 of FIG. 12. As shown in FIG. 14, each of the layer-specific OSSs includes modules providing specific functions for providing services on its layer or for supporting services on other layers. The modules may include instructions (e.g., in the form of software processes or other computer-readable and executable heuristics) that can be executed by computing platforms to carry out the services defined by the instructions. The modules of each of the layer-specific OSSs will now be described in greater detail.

1. Layer-1 OSS

Layer-1 OSS 1220 includes FCAPS modules 1410 configured to provide FCAPS management functions for Layer 1 services and L-1 network elements 54. Layer-1 FCAPS management functions are known to those skilled in the art and include fault, configuration, accounting, performance, and security management functions. The FCAPS modules 1410 provide an interface between higher-level modules of the Layer-1 OSS 1220 and the L-1 network elements 54. The higher-level modules of the Layer-1 OSS 1220 (discussed below) are configured to manage the FCAPS functions to support all Layer-1 services that are supported by the physical layer 50, including Ethernet private line, bandwidth-on-demand, SAN extension services, and Layer-1 virtual private networks (VPNs), as discussed above.

Layer-1 OSS 1220 further includes a service logics module 1414, a service provisioning policy module 1418, and a QoS-triggered provisioning policy module 1422. The service logics module 1414 may be configured to perform any of the functions described above in relation to the service logics 144 and service logics module 400. In particular, the service logics module 1414 may be configured with the service logics 144 for carrying out the Layer-1 on-demand bandwidth provisioning services described above. In addition, the service logics module 1414 may include instructions that provide the on-demand bandwidth services of Layer 1 to support Layer 2 and/or Layer 3 services. For example, the service logics module 1414 may include instructions configured to support reception of service requests from other layer-specific OSSs and execution of those service requests as described above in relation to the subsystem 100. The service logics module 1414 may also be configured to provide status information related bandwidth-on-demand provisioning services to other layer-specific OSSs. As mentioned above, the information exchanged between the layer-specific OSSs may be transmitted over the OSS interface 1250, as shown in FIG. 14.

The instructions in the service logics module 1414 may be configured to consult the service provisioning policy module 1418 and/or the QoS-triggered provisioning policy module 1422 to determine whether bandwidth will be provisioned. The policy modules 1418 and 1422 include predefined policies designed to determine whether provisioning actions will be initiated by the Layer-1 OSS 1220, based on predefined service policies.

The service provisioning policy module 1418 includes predefined instructions for determining whether bandwidth provisioning actions will be taken to support Layer-1 service requirements. For example, the service provisioning policy module 1418 may include information representative of service level agreements (SLAs), which may dictate the amount of bandwidth that should be provisioned to adequately support the service levels defined by the SLAs. Examples of service provisioning policies are discussed below with reference to a particular example of a service provided by the system 1200.

The QoS-triggered provisioning policy module 1422 (or simply the "QoS policy server") includes predefined QoS policies that define specific levels of QoS that should be maintained for services provided at Layer 1. In particular, the QoS policies may identify QoS events that trigger bandwidth provisioning actions, which actions may be executed to help maintain desired levels of QoS for provided Layer-1 services. While any QoS parameter may be used to define a QoS event in the QoS policies, several examples of QoS events involve link utilization rates, queue length statistics, packet loss rates, and many other end-user perceived performance measurements.

With respect to a link utilization QoS event, link utilization thresholds may be defined to identify QoS events for specific Layer-1 links (i.e., Layer-1 spans) of the transport network (e.g., NG-OTN 110). For example, a QoS event will occur when a monitored link utilization rate exceeds a maximum utilization threshold or when the monitored link utilization rate is below a minimum utilization threshold.

A link utilization QoS event may also include a pre-defined time period to factor in the persistence of a monitored link utilization rate. The time period is designed to filter out short-term peaks and lows of monitored link utilization rates. In this manner, a QoS event may occur when a monitored link utilization rate exceeds or is below a predetermined threshold for at least the pre-defined time period. In one embodiment, the pre-defined time period is set to approximately one hour. However, any time period may be used, depending on the service being monitored.

Similar to QoS events based on link utilization, the QoS policies of the QoS policy module 1442 may include QoS events that are based on queue length statistics. If it is determined that a monitored queue length exceeds a maximum queue threshold or is below a minimum queue threshold for at least a predefined time period, a QoS event has occurred that will trigger a bandwidth provisioning action. The particular bandwidth provisioning action to be taken may be based on whether the monitored queue length has exceeded the maximum threshold or is below the minimum threshold.

Similarly, a QoS event may be identified by a packet loss rate. If a monitored packet loss rate over at least a predefined time window exceeds a packet loss threshold, a QoS event has occurred that will trigger a provisioning of additional bandwidth to alleviate congestion on the monitored link.

The FCAPS modules 1410 are capable of monitoring the above-described, as well as other, QoS parameters. In particular, the performance module of the FCAPS modules 1410 is able to actively monitor QoS parameters of Layer-1 services on links of the transport network (NG-OTN 110). The monitoring of QoS may be performed on a per-service basis. The performance module is configured to consult the QoS policy module 1422 to determine whether a QoS event has occurred. By comparing monitored QoS parameters with pre-defined criteria for QoS events, the FCAPS modules 1410 and the QoS policy module 1422 are able to work together to determine whether to add, remove, or not change bandwidth provisioned for layer-1 services.

If the QoS policies of the QoS policy module 1422 indicate that a QoS event has occurred, the Layer-1 OSS 1220 is configured to initiate a bandwidth-on-demand provisioning command to provision optical transport bandwidth as discussed above with reference to the subsystem 100. The service and QoS provisioning policies allow the system 1200 to provision an optimal amount of bandwidth for a service. For example, sufficient bandwidth is provisioned to maintained desired QoS levels, and excessive bandwidth is not over-provisioned when service policies are configured to initiate bandwidth removal when resources are being under-utilized.

The policies of the policy modules 1418 and 1422 may be defined by operators or subscribers of the system 1200. The SMS 1208 and client device 1204 may be used as an interface' by which subscribers may define the policies. Alternatively, any known OSS-related user-interface may be used.

2. Layer-2 OSS

Similar to the Layer-1 OSS 1220, the Layer-2 OSS 1230 includes FCAPS modules 1430 configured to provide FCAPS management functions for Layer-2 services and L-2 network elements 64. Layer-2 FCAPS management functions are known to those skilled in the art and include fault, configuration, accounting, performance, and security management functions. The FCAPS modules 1430 provide an interface between higher-level modules of the Layer-2 OSS 1230 and the L-2 network elements 64. The higher-level modules of the Layer-2 OSS 1230 (discussed below) are configured to manage the FCAPS functions to support all Layer-2 services that are supported by the Layer-2 network, including Ethernet LAN, VLAN, Transparent LAN Service (TLS), and Layer-2 VPNs, as discussed herein.

Layer-2 OSS 1230 further includes a service logics module 1434, a service provisioning policy module 1438, and a QoS-triggered provisioning policy module 1442. The service logics module 1434 may be configured with instructions (e.g., software processes) for carrying out Layer-2 services. In addition, the service logics module 1434 may include instructions that support the utilization of the on-demand bandwidth services of Layer 1 to support the Layer-2 services. For example, the service logics module 1434 may include instructions configured to support reception of service requests from the SMS 1208 and execution of those service requests. When it is determined that the service requests will utilize the bandwidth-on-demand provisioning of Layer 1, the service logics module 1434 may include instructions configured to send a service request to the Layer-1 OSS 1220 to request those services. The service logics module 1434 may further include instructions configured to wait for and act in accordance with responsive information received from the Layer-1 OSS 1220. An embodiment of a particular Layer-2 service and its service logics will be described in detail below.

The instructions in the service logics module 1434 may be configured to instruct the module 1434 to consult the service provisioning policy module 1438 and/or the QoS policy module 1442 to determine whether bandwidth provisioning actions should be taken to support Layer-2 service requirements. For example, the service provisioning policy module 1438 may include information representative of Layer-2 service level agreements (SLAs), which may dictate the amount of bandwidth that should be provisioned to adequately support the service levels (e.g., QoS levels) defined by the SLAs. Examples of service provisioning policies are described below with reference to a particular example of a Layer-2 service provided by the system 1200.

The QoS-triggered provisioning policy module 1442 (or simply the "QoS policy module 1442") includes predefined QoS policies that define specific levels of QoS parameters that should be maintained for services provided at Layer 2. In particular, the QoS policies identify QoS events that trigger bandwidth provisioning actions that may be executed to help maintain desired levels of QoS for provided Layer-2 services. While any QoS parameter may be used to define a QoS event in the QoS policies, several examples of QoS events involve link utilization rates, queue length statistics, packet loss rates, and many other end-user perceived performance measurement.

With respect to a link utilization QoS event, link utilization thresholds may be defined to identify QoS events for specific Layer-2 links (i.e., Layer-2 spans) of the transport network (NG-OTN 110). For example, a QoS event will occur when a monitored link utilization rate exceeds a maximum utilization threshold or when the monitored link utilization rate is below a minimum utilization threshold.

A link utilization QoS event may also include a pre-defined time period to factor in the persistence of a monitored link utilization rate. This acts to filter out short-term peaks and lows of link utilization. In this manner, a QoS event may occur when a monitored link utilization rate exceeds or is below a predetermined threshold for at least the pre-defined time period. In one embodiment, the pre-defined time period is set to approximately one hour. However, any time period may be used.

Similar to QoS events based on link utilization, the QoS policies may include QoS events that are based on queue length statistics. If it is determined that a monitored queue length exceeds a maximum queue threshold or is below a minimum queue threshold for at least a predefined time period, a QoS event has occurred that will trigger a bandwidth provisioning action. The particular bandwidth provisioning action to be taken may be based on whether the monitored queue length has exceeded the maximum threshold or is below the minimum threshold.

Similarly, a QoS event may be identified by a packet loss rate. If a monitored packet loss rate over at least a predefined time window exceeds a packet loss threshold, a QoS event has occurred that will trigger a provisioning of additional bandwidth to alleviate congestion on the monitored link.

The FCAPS modules 1430 are capable of monitoring the above-described, as well as other, QoS parameters. In particular, the performance module of the FCAPS modules 1430 is able to actively monitor QoS parameters of Layer-2 services on links of the transport network (NG-OTN 110). The monitoring of QoS may be performed on a per-service basis. The performance module is configured to consult the QoS policy module 1442 to determine whether a QoS event has occurred. By comparing monitored QoS parameters with pre-defined criteria for QoS events, the FCAPS modules 1430 and the QoS policy module 1442 are able to work together to determine whether to add, remove, or not change the amount of bandwidth being used to support Layer-2 services.

If the QoS policies of the QoS policy module 1442 indicate that a Layer-2 QoS event has occurred, the Layer-2 OSS 1230 is configured to initiate a bandwidth-on-demand provisioning request to be sent to the Layer-1 OSS 1220 to request on-demand provisioning of optical transport bandwidth, as discussed above with reference to the subsystem 100. The service and QoS provisioning policies of the Layer-2 OSS allow the system 1200 to provision an optimal amount of bandwidth for a Layer-2 service. For example, sufficient bandwidth is provisioned to maintained desired QoS levels for Layer-2 services, and excessive bandwidth is not over-provisioned when service policies are configured to initiate bandwidth removal responsive to resources being under-utilized.

Similar to the policies of the Layer-1 OSS 1220, the policies of the policy modules 1438 and 1442 of the Layer-2 OSS 1230 may be defined by operators or subscribers of the system 1200. The SMS 1208 and client device 1204 may be used as an interface by which subscribers or operators may define the policies. Alternatively, any known OSS-related user-interface may be used.

3. Layer-3 OSS

Similar to the Layer-2 OSS 1230, the Layer-3 OSS 1240 includes FCAPS modules 1450 configured to provide FCAPS management functions for Layer-3 services and L-3 network elements 74. Layer-3 FCAPS management functions are known to those skilled in the art and include fault, configuration, accounting, performance, and security management functions. The FCAPS modules 1450 provide an interface between higher-level modules of the Layer-3 OSS 1240 and the L-3 network elements 74. The higher-level modules of the Layer-3 OSS 1240 (discussed below) are configured to manage the FCAPS functions to support all Layer-3 services that are supported by the Layer-3 network, including voice-over-IP (VoIP) and Layer-3 virtual private networks (VPNs), as discussed above.

Layer-3 OSS 1240 further includes a service logics module 1454, a service provisioning policy module 1458, and a QoS-triggered provisioning policy module 1462. The service logics module 1454 may be configured with instructions (e.g., software processes) for carrying out Layer-3 services. In addition, the service logics module 1454 may include instructions that support the utilization of the on-demand bandwidth services of Layer 1 to support the Layer-3 services. For example, the service logics module 1454 may include instructions configured to support reception of Layer-3 service requests from the SMS 1208 and execution of those service requests. When it is determined that the service requests will utilize the bandwidth-on-demand provisioning of Layer 1, the service logics module 1454 may include instructions configured to send a service request to the Layer-1 OSS 1220 to request those services. The service logics module 1454 may further include instructions configured to wait for and act in accordance with responsive information received from the Layer-1 OSS 1220. An example of Layer-3 services requesting and using Layer-1 BOD services will be described below.

The instructions in the service logics module 1454 may be configured to consult the service provisioning policy module 1458 and/or the QoS-triggered provisioning policy module 1462 to determine whether bandwidth will be provisioned. The policy modules 1458 and 1462 include predefined policies designed to determine whether provisioning actions will be requested by the Layer-3 OSS 1220, based on predefined service policies. For example, the service provisioning policy module 1458 may include information representative of service level agreements (SLAs), which may dictate the amount of bandwidth that should be provisioned to adequately support the service levels (e.g., QoS levels) defined by the SLAs. Examples of service provisioning policies are described below with reference to a particular embodiment of a service provided by the system 1200.

The QoS-triggered provisioning policy module 1462 (or simply the "QoS policy module 1462") includes predefined QoS policies that define specific levels of QoS parameters that should be maintained for services provided at Layer 3. In particular, the QoS policies identify Layer-3 QoS events that trigger bandwidth provisioning actions that may be executed to help maintain desired levels of QoS for provided Layer-3 services. While any QoS parameter may be used to define a Layer-3 QoS event in the QoS policies, several examples of QoS events involve link utilization rates, queue length statistics, packet loss rates, and many other end-user perceived performance measurement.

With respect to a link utilization QoS event, link utilization thresholds may be defined to identify QoS events for specific Layer-3 links (i.e., Layer-3 spans) of the transport network (NG-OTN 110). For example, a QoS event will occur when a monitored link utilization rate exceeds a maximum utilization threshold or when the monitored link utilization rate is below a minimum utilization threshold.

A link utilization QoS event may also include a pre-defined time period to factor in the persistence of a monitored link utilization rate. This acts to filter out short-term peaks and lows of monitored link utilization rates. In this manner, a QoS event may occur when a monitored link utilization rate exceeds or is below a predetermined threshold for at least the pre-defined time period. In one embodiment, the pre-defined time period is set to approximately one hour. However, any time period may be used.

Similar to QoS events based on link utilization, the QoS policies may include QoS events that are based on queue length statistics. If it is determined that a monitored queue length exceeds a maximum queue threshold or is below a minimum queue threshold for at least a predefined time period, a QoS event has occurred that will trigger a bandwidth provisioning action. The particular bandwidth provisioning action to be taken may be based on whether the monitored queue length has exceeded the maximum threshold or is below the minimum threshold.

Similarly, a QoS event may be identified by a packet loss rate. If a monitored packet loss rate over at least a predefined time window exceeds a packet loss threshold, a QoS event has occurred that will trigger a provisioning of additional bandwidth to alleviate congestion on the monitored link.

The FCAPS modules 1450 are capable of monitoring the above-described, as well as other, QoS parameters. In particular, the performance module of the FCAPS modules 1450 is able to actively monitor QoS parameters of Layer-3 services on links of the transport network (NG-OTN 110). The monitoring of QoS may be performed on a per-service basis. The performance module is configured to consult the QoS policy module 1462 to determine whether a QoS event has occurred. By comparing monitored QoS parameters with predefined criteria for QoS events, the FCAPS modules 1450 and the QoS policy module 1462 are able to work together to determine whether to add, remove, or not change the amount of bandwidth being used to support Layer-3 services.

If the QoS policies of the QoS policy module 1462 indicate that a Layer-3 QoS event has occurred, the Layer-3 OSS 1240 is configured to initiate a bandwidth-on-demand provisioning request to be sent to the Layer-1 OSS 1220 to request on-demand provisioning of optical transport bandwidth, as discussed above with reference to the subsystem 100. The service and QoS provisioning policies of the Layer-3 OSS allow the system 1200 to provision an optimal amount of bandwidth for Layer-3 services. For example, sufficient bandwidth is provisioned to maintain desired QoS levels for Layer-3 services, and excessive bandwidth is not over-provisioned when service policies are configured to initiate bandwidth removal responsive to resources being under-utilized.

Similar to the policies of the Layer-1 OSS 1220, the policies of the policy modules 1458 and 1462 of the Layer-3 OSS 1240 may be defined by operators or subscribers of the system 1200. The SMS 1208 and client device 1204 may be used as an interface by which subscribers or operators may define the policies. Alternatively, any known OSS-related user-interface may be used.

Because the system 1200 provides interaction between the layer-specific OSSs, on-demand bandwidth provisioning and activation/deactivation may be initiated in several different ways and for different services at different layers. Service logics and policies may be defined for services at Layer 1, Layer 2, and/or Layer 3. New services are enabled by the interaction between the layer-specific OSSs because the BOD services at Layer 1 can be utilized by services at higher layers.

Initiation of service provisioning may occur by user network interface signaling from client network elements, end users through the SMS 1208, and requests from a layer-specific OSS on another layer. The Layer-2 OSS 1230 and Layer-3 OSS 1240 are able to send service provisioning requests to the Layer-1 OSS 1220. The Layer-1 OSS 1220 is able to process the requests and adjust bandwidth on-demand, as discussed above. In effect, the system 1200 provides Layer-2 and Layer-3 services with bandwidth on-demand functionalities, which functionalities may be utilized to support QoS, class of service (CoS), and over-subscription features of provided services.

D. Example of QoS-Triggered Bandwidth-on-Demand Provisioning

An example of the system 1200 provisioning additional bandwidth to support a Layer-3 service to avoid link congestion will now be discussed with reference to FIGS. 15A and 15B. FIG. 15A is a block diagram illustrating a meshed peering arrangement 1500 between several service providers (service providers 1510, 1520, and 1530), according to one embodiment. The expression "a meshed peering arrangement" will be understood by those skilled in the art.

To illustrate BOD provisioning capabilities of the system 1200, it may be assumed that an unexpected event triggers an influx of an unusually high volume of Layer-3 traffic entering the service provider 1520. The influx causes congestions inside the service provider 1520 network, and the congestions begin to spread toward the service provider 1510 over the link connecting points A and C (the "AC link"). The system 1200 in service provider 1510 is able to detect these occurrences and determine one or more appropriate responsive actions, as described below.

The Layer-3 OSS 1240 at the service provider 1510 detects any QoS events on the AC link that are caused by the congestion. For example, the performance module of the FCAPS modules 1450 of the Layer-3 OSS 1240 may detect a high rate of packet loss or a high utilization rate over the AC link. The Layer-3 OSS 1240 may determine that the high packet loss or utilization rate exceeds a predefined threshold as defined in the QoS policy module 1462. This determination indicates that a QoS event has occurred.

As a result of the service provider 1510 detecting a QoS event on the AC link, the Layer-3 OSS 1240 initiates a contingency plan to reroute traffic bound for the service provider 1520 over the AC link. For example, the traffic may be rerouted through the service provider 1530. To handle the rerouted traffic, the Layer-3 OSS 1240 sends a request to the Layer-1 OSS 1220 to request that additional bandwidth be provisioned along one or more paths to the service provider 1530. The Layer-1 OSS 1220 instructs the provisioning of the requested bandwidth as discussed above. As shown in FIG. 15B, additional bandwidth capacity is provisioned along the AB link (1550-1) and the BD link (1550-2) to provide a path with sufficient capacity to reroute the traffic through the service provider 1530.

The service provider 1530 is similarly able to request that additional bandwidth be provisioned to handle the increased traffic levels being received from the service provider 1510. The Layer-3 OSS 1240 of the service provider 1530 sends a request to the Layer-1 OSS 1220 to request that additional bandwidth be provisioned along one or more paths to the service provider 1520. Again, the Layer-1 OSS 1220 instructs the provisioning of the requested bandwidth as discussed above. FIG. 15B shows additional bandwidth capacities provided on the DE, DF, and EG links (identified as 1550-3, 1550-4, and 1550-5).

By provisioning bandwidth on demand along alternate paths, the system 1200 is able to maintain adequate QoS of services at the service provider 1510. In other words, the impact of the congestion at service provider 1520 is minimized for the service provider 1510.

The traffic bound for the service provider 1520 is still delivered to the service provider 1520, where the traffic may be dropped because of the congestion at the service provider 1520. However, QoS for the services at the service providers 1510 and 1530 is maintained by the timely provisioning of additional bandwidth to support rerouting traffic destined for the service provider 1520 through alternate paths.

As the unexpected influx of traffic to the service provider 1520 over the AC link subsides and returns to substantially normal levels, the Layer-3 OSSs 1240 in the service providers 1510 and 1530 may instruct the respective Layer-1 OSSs to remove the contingency bandwidth capacities that were formed. The contingency bandwidth may be removed as discussed above with reference to the subsystem 100.

Figure 16:
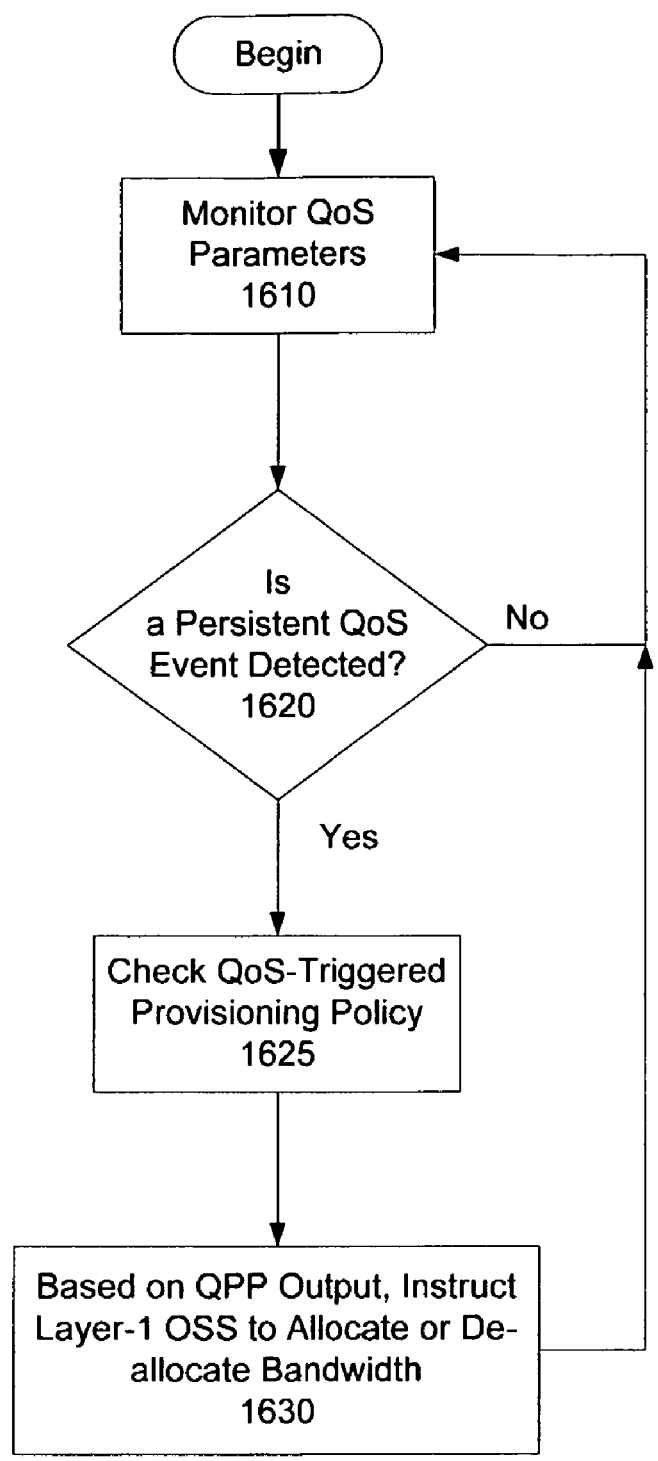
FIG. 16 is a flowchart illustrating a method of provisioning bandwidth based on QoS events, according to one embodiment.

FIG. 16 is a flowchart illustrating a method of managing bandwidth provisioning based on QoS events, according to one embodiment. At step 1610, QoS service parameters are monitored. As discussed above, the performance management functions of the layer-specific OSS's FCAPS modules may be used to monitor various QoS parameters associated with network links.

At step 1620, it is determined whether a persistent QoS event has occurred. A persistent QoS event may be predefined for one or more different QoS parameters, as discussed above. A time window may be defined and used to determine whether a QoS event has occurred for at least a predefined length of time, which defines whether the QoS event is persistent.

If it is determined at step 1620 that a persistent QoS event has not occurred, processing returns to step 1610 for continued monitoring of QoS parameters. On the other hand, if it is determined at step 1620 that a persistent QoS event has occurred, processing moves to step 1625. At step 1625, a QoS-triggered provisioning policy is consulted. The QoS provisioning policy is configured to generate output indicating a bandwidth provisioning action that should be taken based on predefined policies. Exemplary QoS provisioning polices will be described below.

Processing then moves to step 1630. At step 1630, the Layer-1 OSS 1220 is instructed either to allocate or to de-allocate bandwidth resources based on output from the QoS-triggered provisioning policies. If the QoS event indicates that addition bandwidth should be provided (e.g., when a QoS parameter such as packet loss exceeds a predetermined threshold), then the Layer-1 OSS 1220 is instructed to allocate additional bandwidth. Conversely, if the QoS event indicates an under-utilization of resources, the Layer-1 OSS 1220 is instructed to de-allocate bandwidth. The allocation and de-allocation of bandwidth is performed as described above with reference to the subsystem 100. The request sent to the Layer-1 OSS 1220 may be initiated by the Layer-2 OSS 1230 or the Layer-3 OSS 1240, depending on which service layer is being monitored in the method of FIG. 16.

VII. Layer-2 Wide Area VLAN (W-VLAN) Service Embodiment

The policy-based intelligent provisioning system 1200 enables the creation and implementation of new classes of services that can be provided to subscribers. An embodiment of a particular class of service will now be discussed to illustrate just one of many possible services that may be supported by the framework of the system 1200. Using the system 1200 of FIG. 12, a service provider is able to build a VLAN backbone sub-network over the NG-OTN 110. For example, select L-1 network elements 54-1, 54-4, 54-5, and 54-n may be configured to form a Layer-2 VLAN backbone sub-network, as shown in FIG. 2. The VLAN backbone sub-network provides Layer-2 VLANs that can span multiple sites separated by different geographic distances.

Figure 17A:
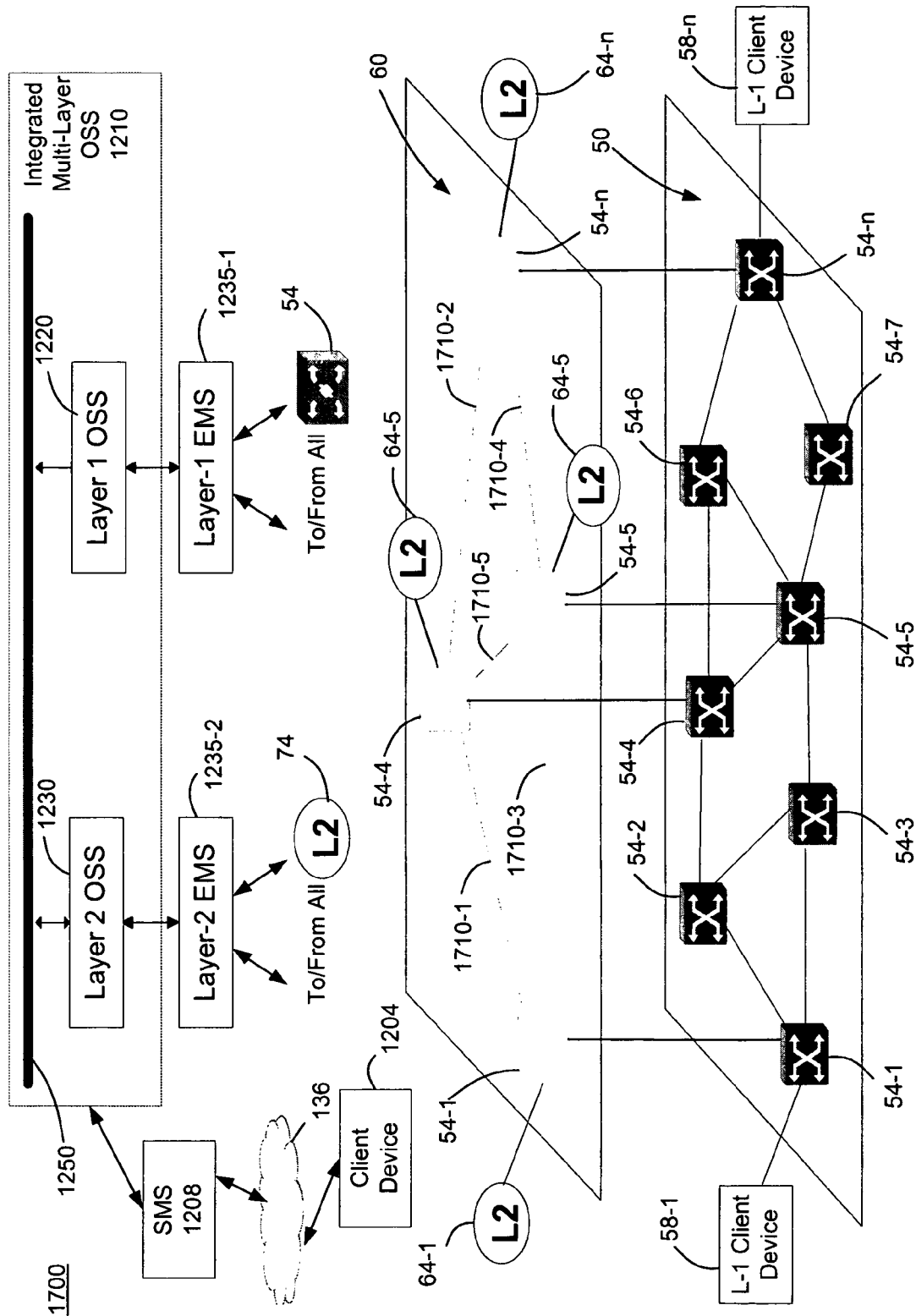
FIG. 17A is a block diagram of a system forming a VLAN backbone sub-network to support a particular wide area VLAN (W-VLAN) service over Layer 2 of an optical transport network, according to one embodiment.

FIG. 17A is a block diagram of a system 1700 configured to form a VLAN backbone sub-network to support a particular wide area VLAN (W-VLAN) service over Layer 2. In FIG. 17A, the system 1700 includes a VLAN backbone sub-network formed at Layer 2 as shown in FIG. 2. Select L-1 network elements 54-1, 54-4, 54-5, and 54-$n$ form one or more paths between L-2 network elements 64-1, 64-4, 64-5, and 64-$n$. Any two of the select L-1 network elements 54 used to form the Layer-2 VLAN sub-network may be connected by a Layer-2 span (also referred to as a Layer-2 link). In FIG. 17A, span 1710-1 connects L-1 network elements 54-1 and 54-4, span 1710-2 connects L-1 network elements 54-4 and 54-$n$, span 1710-3 connects L-1 network elements 54-1 and 54-5, span 1710-4 connects L-1 network elements 54-5 and 54-$n$, and span 1710-5 connects L-1 network elements 54-4 and 54-5. Spans of the Layer-2 sub-network shown in FIG. 17A are collectively referred to as the spans 1710. Spans of the Layer-2 sub-network may comprise one or more point-to-point VLANs that are configured to support certain attributes of traffic flow between the endpoints of the VLANs. For example, VLANs may have attributes such as maximum bandwidth supported, allocation of traffic priority levels, and any other parameters associated with link of the sub-network discussed herein.

One or more parameters are associated with each of the VLANS making up the spans 1710 of the VLAN sub-network shown in FIG. 17A. In one embodiment, a first parameter (STS1-CNT) indicates the current number of synchronous transfer signals No. 1 (STS1s) provided at the physical layer 50 (Layer 1) for use over the span 1710. As known to those skilled in the art, an STS1 usually provides somewhat less than approximately 50 Megabits per second (Mbps) of bandwidth because of overhead associated with the STS1. For example, approximately 48 Mbps may be available per STS1 to transmit payload traffic.

A second parameter (BW_HIGH) indicates the aggregated bandwidth for high priority traffic, and a third parameter (BW_LOW) indicates the aggregated bandwidth for low priority traffic. Services may offer both high-priority and low-priority traffic to subscribers. For example, subscribers may pay a higher rate for high-priority traffic, which may come with guaranteed bandwidth and QoS levels. Conversely, low-priority traffic may be offered at lower rates because QoS is not guaranteed. Further, lower-priority traffic may be over-subscribed, a known technique for maximizing revenues per the amount of resources allocated.

A fourth parameter (BW_TTL) indicates the total bandwidth demand for a span. BW_TTL is equal to the sum of BW_LOW plus BW_HIGH. BW_TTL, BW_LOW, and BW_HIGH may be used as counters for keeping track of the amount of bandwidth provided for services at a specific layer (e.g., Layer-2 services). A fifth parameter (BW_PRV) indicates the total bandwidth currently provided along the span 1710 and is calculated by multiplying the value of the STS1_CNT parameter with the amount of payload bandwidth provided by each STS (e.g., approximately 48 Mbps).

The parameters associated with the spans 1710 of the VLAN sub-network may be used to define service policies that can be implemented in the service policy module 1438 of the Layer-2 OSS 1230. As will be discussed below with reference to a specific embodiment of service policies, the predefined service policies may be consulted by the service logics module 1434 to determine whether a particular Layer-2 service will invoke provisioning actions at Layer-1 to add, modify, or reduce the amount of provisioned bandwidth for any particular span(s) 1710.

Using the VLAN backbone sub-network shown in FIG. 17A, a service provider is able to offer the W-VLAN service described herein, which service may include several features known to those skilled in the art, including support of an eight-level priority scheme defined by the IEEE 802.1p standard. The W-VLAN service may also support port-specific and/or client-specific VLANS, as well as traffic policing and shaping on access ports, which will be understood by those skilled in the art.

In addition, the W-VLAN service may provide support for over-subscription and class of service (CoS) policies. In particular, an over-subscription policy is supported for low priority VLAN traffic. The over-subscription policy may be configured to allow a certain amount of low-priority services (e.g., percentage of total low-priority services) to be oversubscribed to clients. For example, up to thirty percent of the low-priority traffic bandwidth provided for W-VLAN services may be over-subscribed in one embodiment. In other words, at least seventy percent of the required bandwidth for low-priority service is available to support low-priority services. Subscribers to over-subscribed low-priority W-VLAN services typically agree to allow the over-subscription in exchange for a lower fee being charged for the services. By supporting an over-subscription policy, the W-VLAN service improves the utilization of OTN core resources, thereby allowing more service requests to be accommodated per the amount of resources.

The W-VLAN service may support on-demand provisioning of VLAN service requests. In one embodiment for example, the W-VLAN service leverages Layer-1 just-in-time bandwidth provisioning capabilities, which were discussed above with reference to the subsystem 100. By supporting on-demand provisioning of VLAN services, the W-VLAN service is able to flexibly provide subscribers with a wide variety of different service features.

With both over-subscription and bandwidth-on-demand functions, the system 1700 is able to determine, based on predefined service policies, whether to invoke Layer 1 bandwidth-on-demand features to adjust the amount of bandwidth provisioned for any selected span in the Layer-2 VLAN sub-network, as discussed below.

To implement the W-VLAN service over the architecture of the system 1700, a service provider may configure the service logics module 1434 and the service provisioning policy module 1438 of the Layer-2 OSS 1230 to provide the above-described service features. The service logics module 1434 can be configured to define service provisioning procedures for W-VLAN, including intake of service requests, provisioning of services, and client notification of service-related information. The service provisioning policy module 1438 may be configured to define and implement an over-subscription policy that is callable by the W-VLAN service logics of the service logics module 1434.

The SMS 1208 may be configured to support data entry, status reporting, and event notifications for the W-VLAN service. The SMS 1208 may be equipped with service portals and related interfaces (e.g., GUI's) to enable clients to request W-VLAN services and to receive notifications regarding the status of the W-VLAN services.

To support the W-VLAN class of services, the service logics module 1414 of the Layer-1 OSS 1220 should be configured with the BOD service logics 144 described above with reference to the subsystem 100. For example, the service logics module 1414 may be configured with the just-in-time service logics described above to support just-in-time bandwidth addition, removal, or modification of optical transport bandwidth for use by the Layer-2 VLAN backbone. The on-demand provisioning at the physical layer 50 may be performed in response to a request from the Layer-2 OSS

1230. An embodiment of a W-VLAN service and its associated service logics and provisioning policies will now be described in further detail.

Figure 17B:
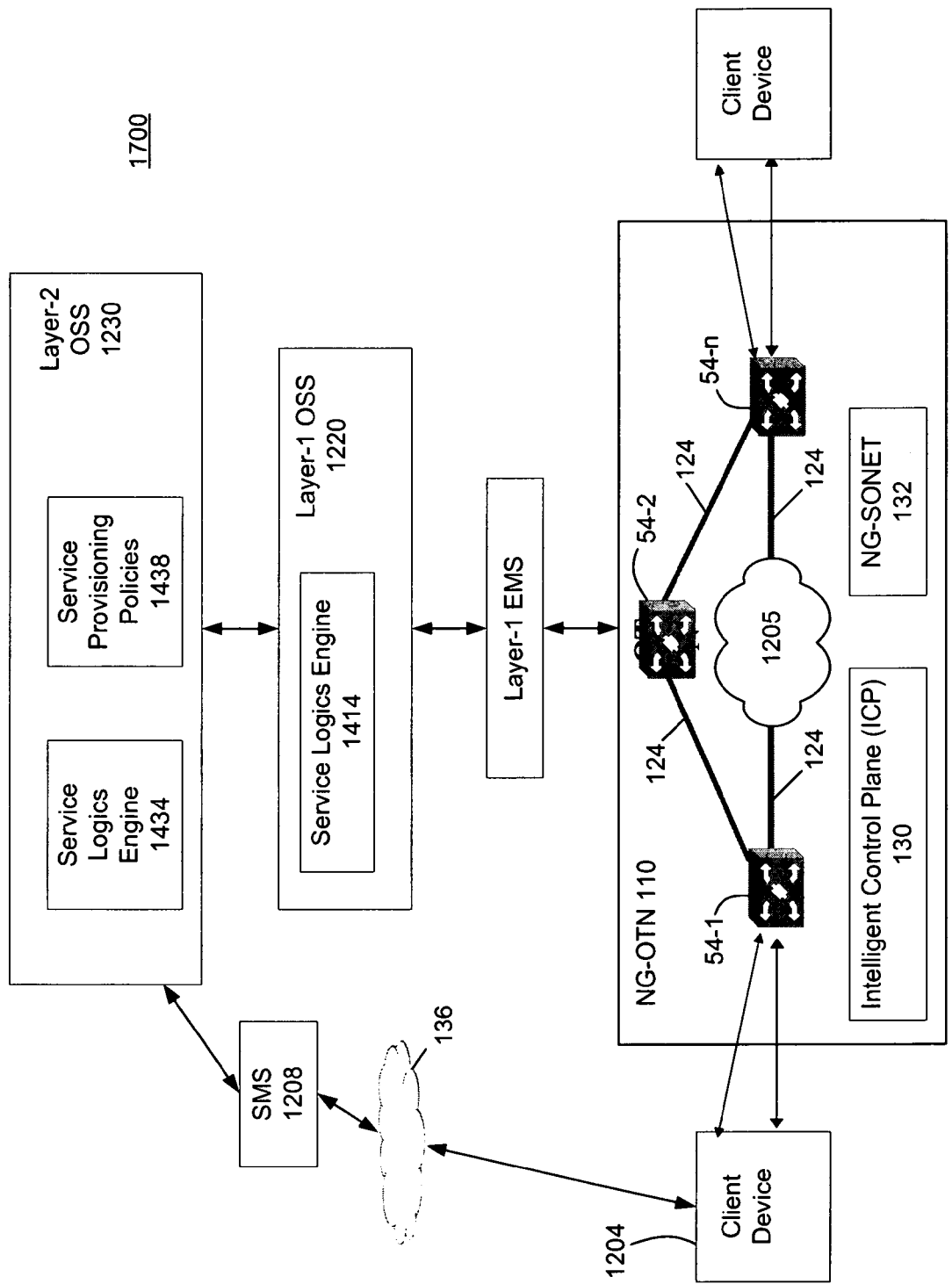
FIG. 17B is another block diagram of the system of FIG. 17A, according to one embodiment.

FIG. 17B is another block diagram of the system 1700 configured to support a Layer-2 wide area virtual LAN service (W-VLAN), according to one embodiment. In FIG. 17B, users are able to submit service requests through the client device 1204, which is configured to provide subscribers with access for submitting Layer-2 requests and receiving related notifications as described above.

The SMS 1208 is configured to handle Layer-2 requests and notifications as described above. When a subscriber submits a W-VLAN service request, the request is sent from the SMS 1208 to the Layer-2 OSS 1230. Service requests may include but are not limited to commands to add, delete, and modify the W-VLAN service. In particular, requests may request the adding, removing, and/or modifying of provisioned bandwidth for VLANs. Service requests should be accompanied by appropriate parameters useful for the execution of the service requests. For example, An "add VLAN" command may be accompanied by an identifier of the targeted service, an order number, an account number for accounting purposes, a transaction number, identifiers for each endpoint of the circuit path, the bandwidth requirements (e.g., maximum bandwidth capacity), and the priority level related to the request or the targeted service (e.g., high or low priority traffic). A "delete VLAN" command should be accompanied by a parameter identifying the VLAN to be deactivated. A "modify VLAN" command should be accompanied by a parameter identifying the VLAN to be modified, as well as a parameter identifying a new bandwidth value being requested.

When the Layer-2 OSS 1230 receives the service commands from the SMS 1208, the Layer-2 OSS 1230 identifies the appropriate service logics of the service logics module 1434 to be executed to process the service command. The appropriate service logics are then accessed and executed. The service logics may invoke or consult the service provisioning policies of the service provisioning policy module 1438.

In accordance with the service logics and provisioning policies, the Layer-2 OSS 1230 may send one or more requests to the Layer-1 OSS 1220 requesting allocation or de-allocation of bandwidth for one or more VLANs. An example of the L-2 OSS 1230 determining whether to invoke Layer-1 bandwidth provisioning will be discussed in detail below. When the Layer-1 OSS 1220 receives a service request from the L-2 OSS 1230, the Layer-1 OSS 1220 identifies the appropriate service logics to be executed by the service logics module 1414 for processing the request. The Layer-1 OSS 1220 then executes the request to allocate or de-allocate bandwidth resources to/from the VLAN sub-network per the request. This can be performed using the just-in-time bandwidth on-demand provisioning service logics described above. For example, any of the Transaction Language 1 (TL1) command sequences described above may be compiled by the service logics of the service logics module 1414 and sent to the NG-OTN 110 for execution to perform the requested VLAN addition, removal, and/or modification.

The NG-OTN 110 generates TL1 command responses and/or status reports, which are sent to the Layer-1 OSS 1220 as discussed above. The responses and reports are sent to the Layer-2 OSS 1230, which may send status notifications to the subscriber either directly or via the SMS 1208. Notifications may be provided in similar fashion to that described above for Layer-1 client services. Notifications may include but are not limited to indications of success or failure and accompanying information related to commands to add, modify, and/or delete VLANs.

Figure 18A:
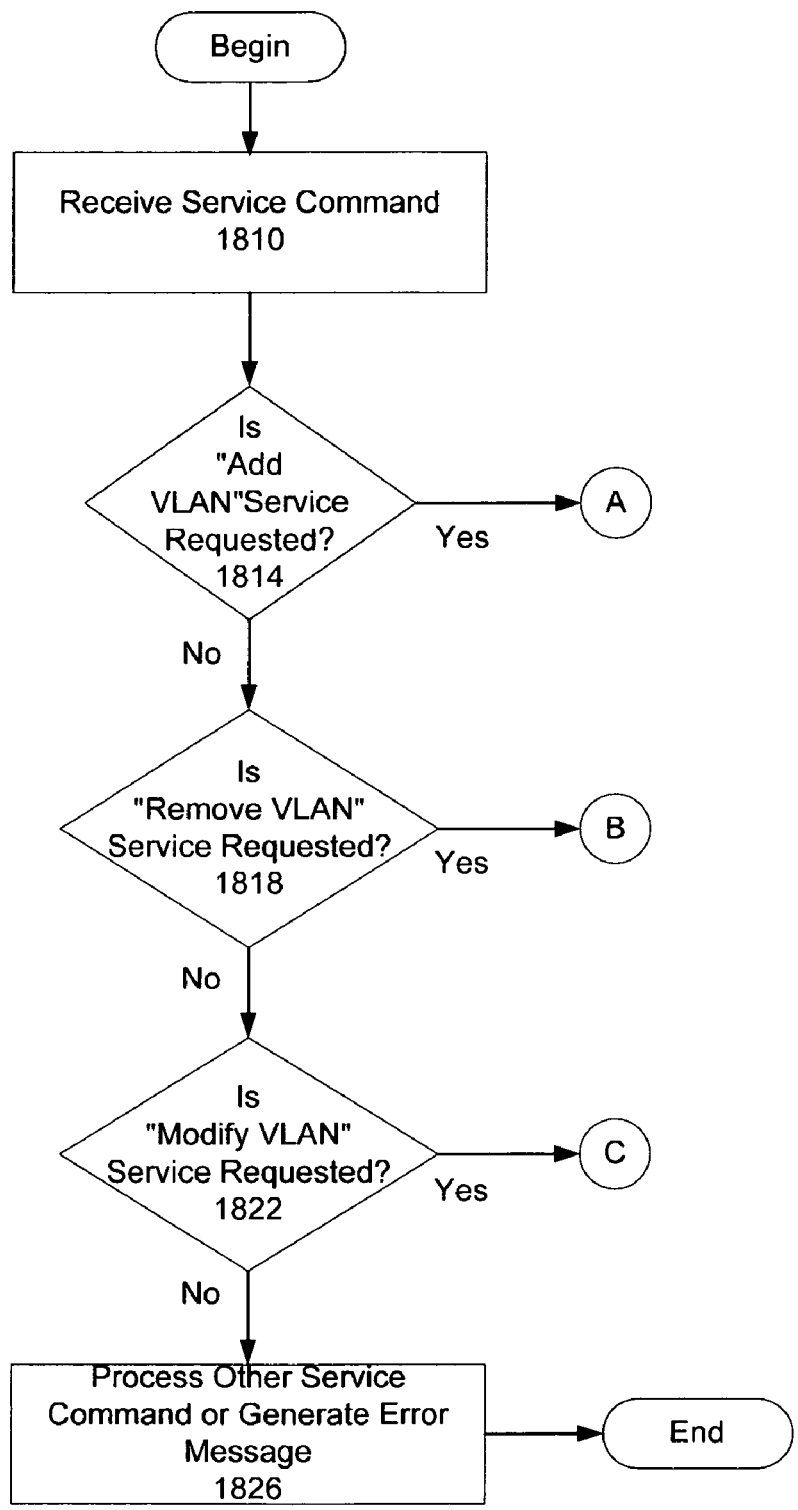
FIG. 18A is a flowchart illustrating a method of identifying service logics for the W-VLAN service of FIG. 17A and FIG. 17B, according to one embodiment.

FIGS. 18A-18D are flowcharts illustrating flows of Layer-2 service logics for adding, deleting, and modifying VLANs for a Layer-2 W-VLAN service, according to one embodiment. As shown in FIG. 18A, a service command is received at step 1810. The service command may be received by the Layer-2 OSS 1230 from the SMS 1208, directly from a subscriber, or from an OSS associated with another layer (e.g., Layer-3 OSS 1240).

Figure 18B:
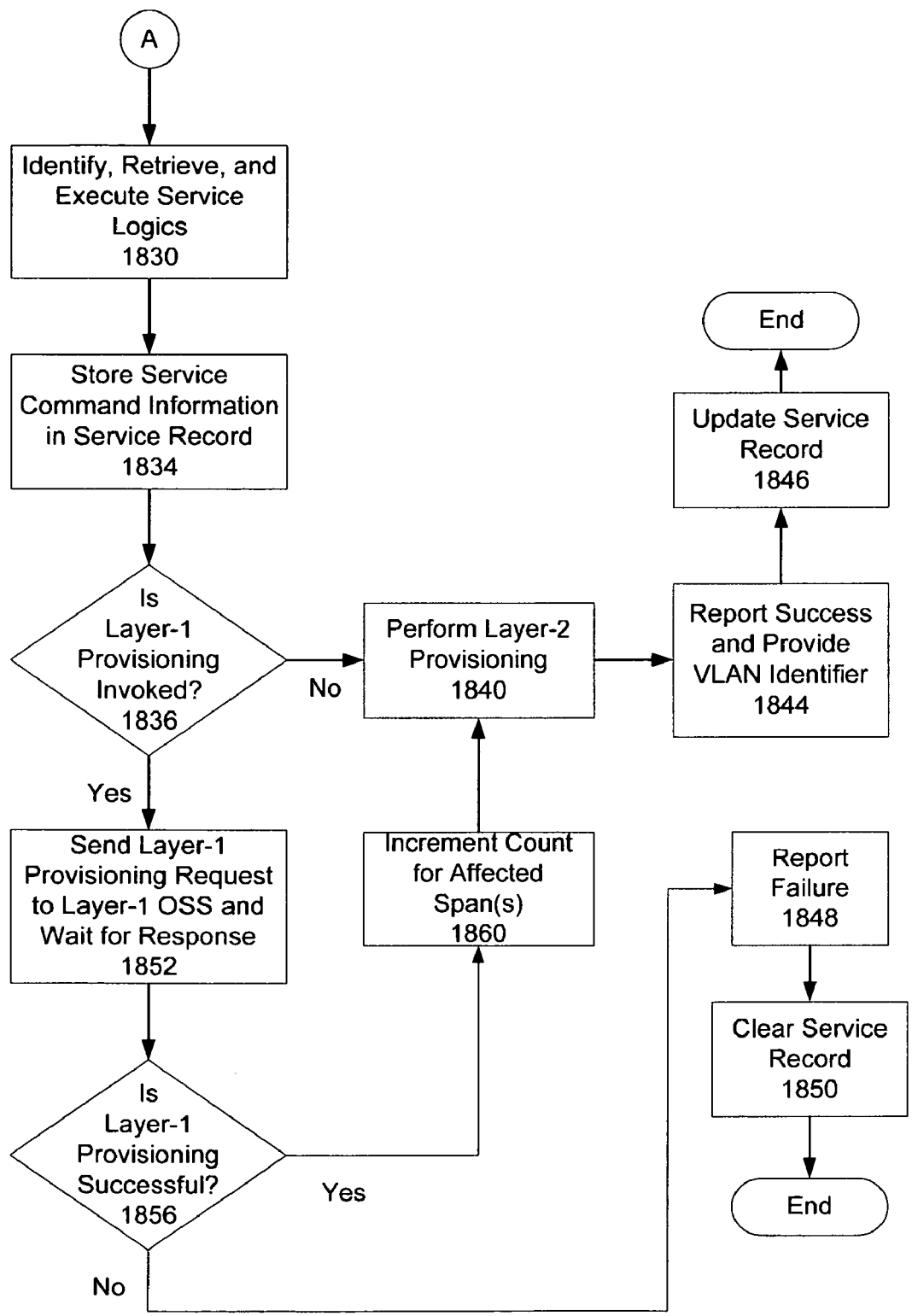
FIG. 18B is a flowchart illustrating steps for adding bandwidth for the W-VLAN service of FIGS. 17A and 17B, according to one embodiment.

It is next determined what type of service request is associated with the service command. At step 1814, it is determined whether the service command indicates an "add VLAN" service command. If it is determined at step 1814 that an "add VLAN" service is requested, processing moves to FIG. 18B as indicated by reference "A" in FIGS. 18A and 18B. FIG. 18B will be explained below.

Figure 18C:
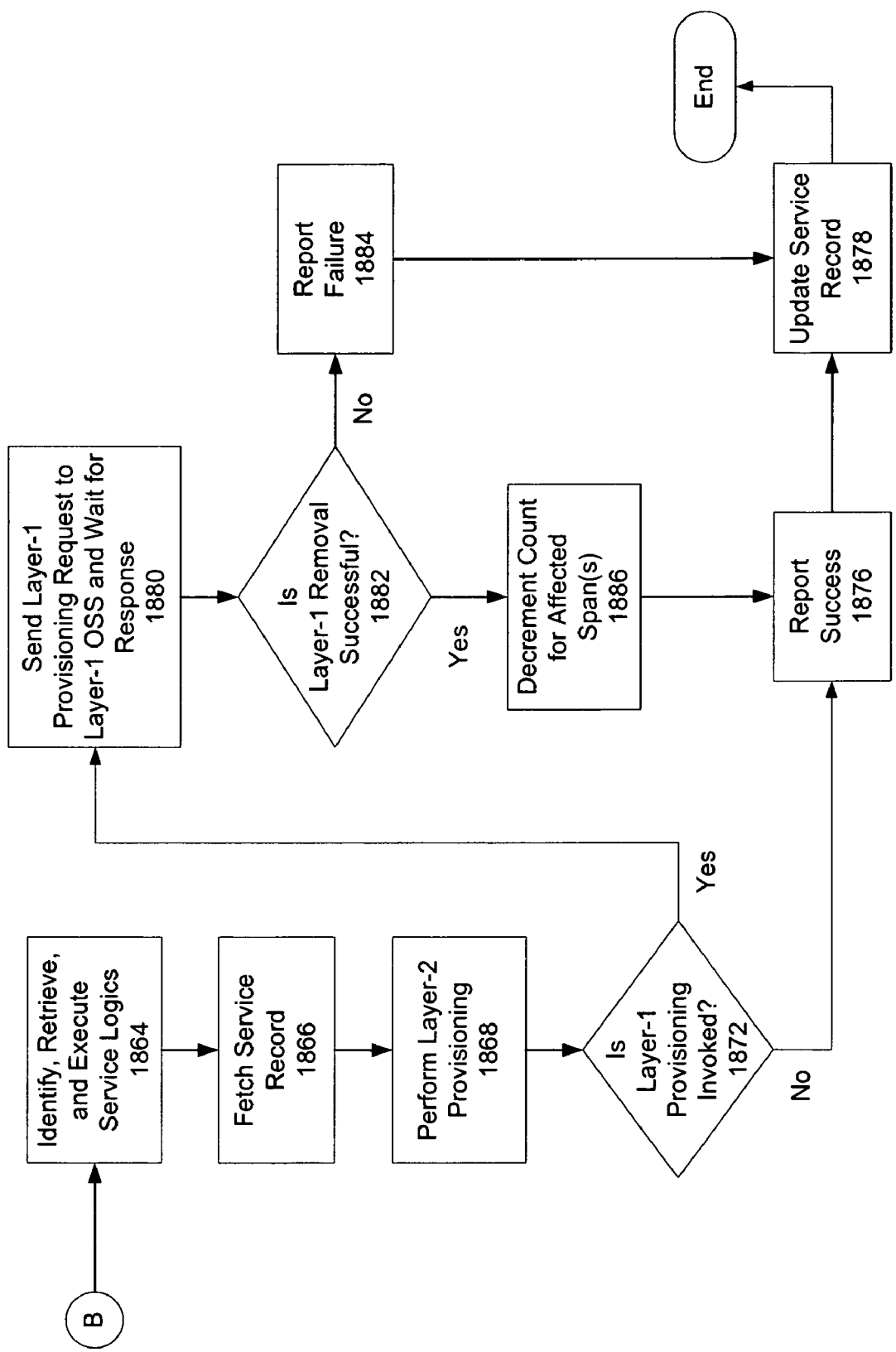
FIG. 18C is a flowchart illustrating steps for removing bandwidth for the W-VLAN service of FIGS. 17A and 17B, according to one embodiment.

On the other hand, if it is determined at step 1814 that the service command does not indicate an "add VLAN" service request, processing moves to step 1818. At step 1818, it is determined whether the service command indicates a "remove VLAN" service command. If it is determined at step 1818 that a "remove VLAN" service is requested, processing moves to FIG. 18C as indicated by reference "B" in FIGS. 18A and 18C. FIG. 18C will be explained below.

Figure 18D:
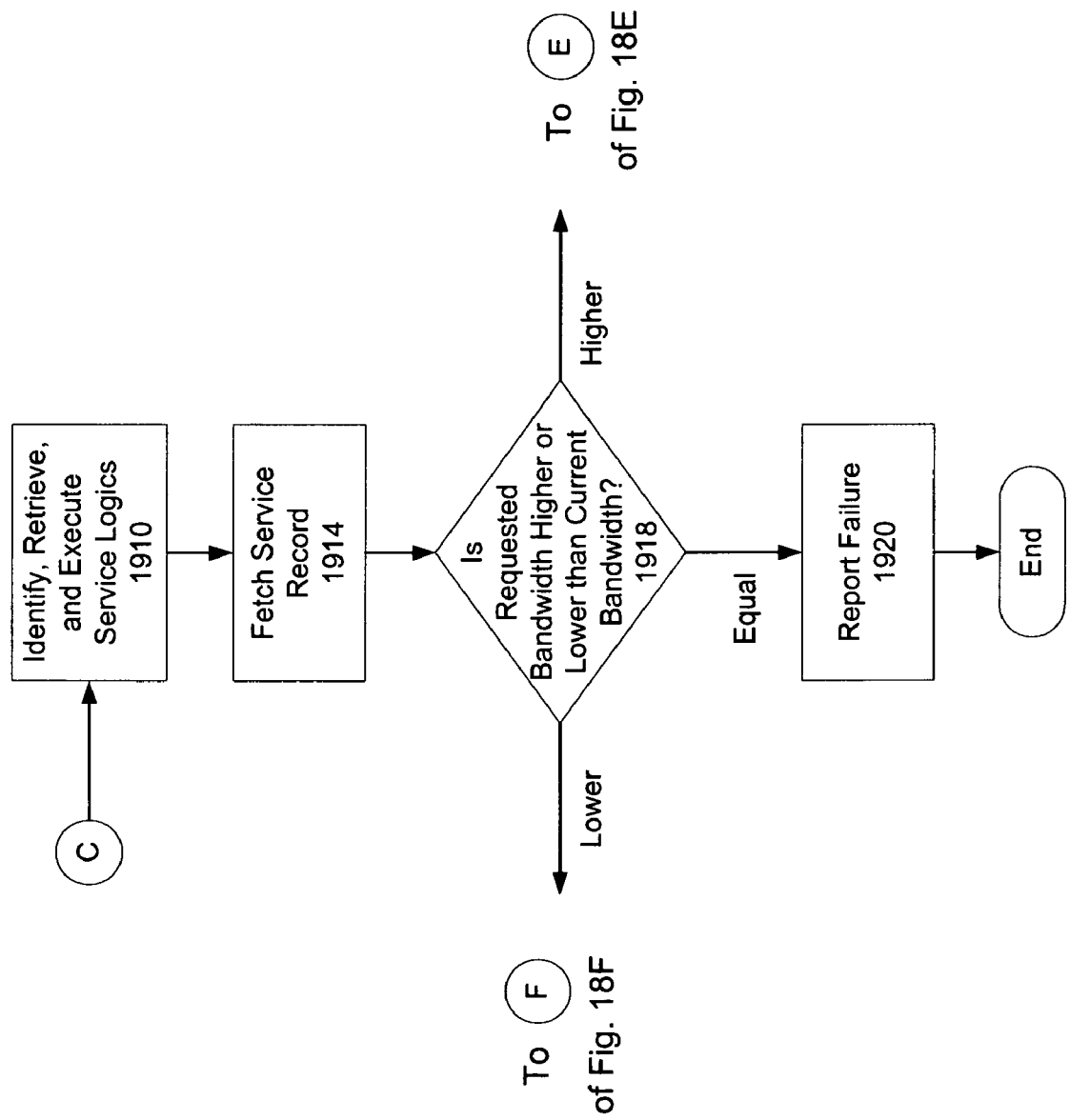
FIG. 18D is a flowchart illustrating steps for modifying bandwidth for the W-VLAN service of FIGS. 17A and 17B, according to one embodiment.

On the other hand, it is determined at step 1818 that the service command does not indicate a "remove VLAN" service request, processing moves to step 1822. At step 1822, it is determined whether the service command indicates a "modify VLAN" service command. If it is determined at step 1822 that a "modify VLAN" service is requested, processing moves to FIG. 18D as indicated by reference "C" in FIGS. 18A and 18D. FIG. 18D will be explained below.

On the other hand, if it is determined at step 1822 that the service command does not indicate a "modify VLAN" service request, processing moves to step 1826. At step 1826, another type of service request indicated by the service command is processed. Otherwise, an error message is generated and provided to the requestor of the service.

A. An Example of Service Logics for Processing Requests to Add VLAN for W-VLAN Services As mentioned above, if it is determined at step 1814 of FIG. 18A that the service command indicates an "add VLAN" service request, processing moves to "A" of FIG. 18B, which Figure illustrates steps for adding a VLAN for the W-VLAN service of FIG. 17A, according to one embodiment. At step 1830 of FIG. 18B, the Layer-2 OSS 1230 identifies, retrieves, and executes the appropriate Layer-2 service logics for a W-VLAN "add VLAN" service command. Steps 1834-1850 describe the execution of the retrieved Layer-2 service logics.

At step 1834, the Layer-2 OSS 1230 stores information associated with the service command, including any of the parameters discussed above that accompany the service command, in a local service record (also referred to as a "local call record"). For example, service request parameters associated with an "add VLAN" service request may include but are not limited to port identifications for the endpoints of the VLAN, a service identifier, an order number, and account number, a transaction number, maximum bandwidth, and a priority level associated with the VLAN. In one embodiment, the priority level parameter is used to identify whether the service is a high or low priority service, which may be used by the oversubscription policies to determine whether bandwidth for a span should be adjusted, as discussed below.

From the service command information and Layer-2 routing information, one or more spans 1710 of the VLAN sub-network are identified as target spans 1710 on which provisioning is requested. Proper bandwidth counters (e.g., BW_HIGH and BW_LOW described above) for each of the target spans 1710 are updated by the maximum bandwidth specified in the service command parameters.

At step 1836, it is determined whether Layer-1 provisioning is invoked by the service command. To make this determination, the service logics module 1434 of the Layer-2 OSS 1230 consults the service provisioning policy module 1438 to determine whether predefined service policies (e.g., oversubscription policies) indicate that Layer-1 provisioning will be invoked. This determination may include one or more comparisons of VLAN bandwidth parameters (e.g., bandwidth counters such as BW_TTL, BW_HIGH, and/or BW_LOW) on one or more affected (i.e., traversed) VLAN spans and/or service command information with predefined conditions and thresholds. For example, Table 2 lists a predefined "add policy" heuristic for determining whether Layer-1 provisioning will be invoked to add requested bandwidth, according to one embodiment.

TABLE 2

An Embodiment of an Add Policy for a W-VLAN Service

If BW_TTL < BW_PRV, then RETURN NONE;
If ((BW_TTL >= BW_PRV) AND (BW_HIGH <= BW_PRV))
 { if(PCT < 0.3), then RETURN NONE;
   Else RETURN ADD; }
If (BW_HIGH > BW_PRV), then RETURN ADD;
If ((BW_HIGH != 0) OR (BW_LOW != 0)) AND (BW_PRV == 0),
then
 RETURN ADD;
RETURN NONE;

As listed in Table 2, a number of comparisons are made to determine whether the service policy module 1438 will return an "ADD" or a "NONE" value. When an "ADD" value is returned, it will be determined at step 1836 that Layer-1 provisioning will be invoked. Conversely, return of a "NONE" value will lead to a determination at step 1836 that Layer-1 provisioning will not be invoked.

In the service policy example shown in Table 2, it is determined whether the total bandwidth (BW_TTL) of an indicated target span 1710 is less than the bandwidth already provided (BW_PRV) at the span 1710. If BW-TTL is less than BW_PRV, then "NONE" is returned to indicate that Layer-1 provisioning will not be invoked because the already-provisioned bandwidth is higher than the total bandwidth demand.

On the other hand, if BW_TTL is not less than BW_PRV, then the subsequent condition shown in Table 2 is tested to account for a predefined over-subscription policy. If BW_TTL is greater than or equal to BW_PRV and the bandwidth for high priority traffic (BW_HIGH) is less than or equal to the provisioned bandwidth (BW_PRV), then the service policy of Table 2 will determine whether the oversubscription of low-priority traffic is less than a predefined threshold percentage (PCT) of total traffic. In the embodiment shown in Table 2, the predefined oversubscription threshold percentage (PCT) is thirty percent (0.3 in Table 2). This value may be predetermined and implemented in the service policies of the service policy module 1438. The value may be any value useful for a particular service or application.

In Table 2, if the PCT is less than the predefined oversubscription percentage, a "NONE" value is returned to indicate that Layer-1 provisioning will not be invoked because the level of oversubscription of low priority services has not reached the predefined threshold. On the other hand, if the PCT is not less than the predefined over-subscription percentage, an "ADD" value is returned to indicate that Layer-1 provisioning will be invoked because the level or oversubscription has reached the predefined threshold. Bandwidth will then be added to maintain the rate of oversubscription below the predefined threshold. PCT may be calculated as shown in Equation 1.

$$PCT = 1.0 - \left(\frac{BW\_PRV - BW\_HIGH}{BW\_LOW}\right) \text{ if } BW\_LOW > 0 \quad \text{Equation 1}$$

If the oversubscription tests of Table 2 were not invoked because the BW_HIGH was not less than the BW PRV, then additional test conditions will be checked. As shown in Table 2, if the bandwidth for high-priority traffic (BW_HIGH) is greater than the provisioned bandwidth (BW_PRV) of the span 1710, then an "ADD" value will be returned to indicate that Layer-1 provisioning will be invoked because high priority traffic demand has exceeded the provisioned bandwidth of the span 1710.

If the bandwidth for high-priority traffic (BW_HIGH) or the bandwidth for low-priority traffic (BW_LOW) is not equal to zero, and the provisioned bandwidth (BW_PRV) equals zero, then an "ADD" value will be returned because bandwidth is now being demanded on a span 1710 on which no bandwidth is currently provided.

If none of the above conditions returns a value, the add policy of Table 2 will return a "NONE" value to indicate that Layer-1 provisioning will not be invoked.

Based on the "add policy" heuristic of Table 2, if it is determined at step 1836 that Layer-1 provisioning will not be invoked, processing moves to step 1840. At step 1840, Layer-2 provisioning is performed. The Layer-2 provisioning may include steps known to those skilled in the art. For example, Layer-2 provisioning may include allocating an unused VLAN identifier for the target VLAN span 1710. The VLAN identifier may be provisioned at the L-1 network elements 54 at both ends of the span 1710. The VLAN identifier is also provisioned at the intermediate L-2 network elements 64 (e.g., Layer-2 switches) that are on the span 1710. Further, traffic policing and shaping functions may be activated at the access ports associated with the span 1710.

Processing then moves to step 1844, at which step successful execution of the "ADD VLAN" service request is reported to the requesting client. At step 1844, a notice indicating successful provisioning of additional bandwidth, as well as the selected VLAN identifier, may be sent to the SMS 1208 for forwarding to the client device 1204. The notice may include a VLAN identifier associated with the target span 1710. At step 1846, the service record and related databases are updated to reflect the successful provisioning. The Layer-2 OSS 1230 then waits for another service request.

On the other hand, if it is determined at step 1836, that Layer-1 provisioning will be invoked, processing moves to step 1852. At step 1852, the Layer-2 OSS 1230 sends an "ADD" provisioning request to the Layer-1 OSS 1220 to request setup of additional bandwidth for the target span 1710. The Layer-2 OSS 1230 then waits for a response from the Layer-1 OSS 1220. As discussed above, the Layer-1 OSS 1220 may function as the NG_OSS 140 of the subsystem 100 to provision bandwidth at the physical layer 50 for use by the Layer-2 sub-network of FIG. 17A. The subsystem 100 can provision the additional bandwidth using any of the techniques described above, including the embodiments shown in FIGS. 10A and 11A. In one embodiment, the Layer-1 provisioning includes provisioning additional STSs along spans 1710 of the Layer-2 sub-network shown in FIG. 17A.

The Layer-1 OSS 1220 may generate and send a report of success or failure of the Layer-1 provisioning to the Layer-2 OSS 1230. From this report, the Layer-2 OSS 1230 determines at step 1856 whether the Layer-1 provisioning was successful. If it is determined at step 1856 that Layer-1 provisioning was not successful, processing moves to step 1848. At step 1848, the Layer-2 OSS 1230 reports the failure and failure code to the service requestor. At step 1850, the service record is cleared. The Layer-2 OSS 1230 then waits for another service request.

If it is determined at step 1856 that Layer-1 provisioning was successful, processing moves to step 1860. At step 1860, a count indicative of the amount of provisioned bandwidth on the target span 1710 is incremented by an amount corresponding with the amount of bandwidth that was provisioned. For example, in the case that additional bandwidth is provisioned at Layer 1 in the form of STS1s, the parameter STS1_CNT associated with the target span 1710 will be incremented to reflect the total number of STS1s that are provisioned at the span 1710.

Processing then moves to step 1840, which is executed as discussed above. Steps 1844 and 1846 are also executed as described above to report successful provisioning and to update the service record.

B. An Example of Service Logics for Processing Requests to Remove VLAN from W-VLAN Services As mentioned above, if it is determined at step 1818 of FIG. 18A that the service command indicates a "remove VLAN" service request, processing moves to "B" of FIG. 18C, which Figure illustrates steps for removing a VLAN from the W-VLAN service provided by the system 1700 of FIG. 17A, according to one embodiment. At step 1864 of FIG. 18C, the Layer-2 OSS 1230 identifies, retrieves, and executes the appropriate Layer-2 service logics for a W-VLAN "remove VLAN" service command. Steps 1866-1878 describe the execution of the retrieved Layer-2 service logics.

At step 1866, the Layer-2 OSS 1230 fetches the particular service record identified by the service command. In one embodiment, a VLAN identifier is provided with the service command for identifying affected target spans 1710 of the VLAN sub-network shown in FIG. 17A.

At step 1868, bandwidth counters are updated according to the following rules. If it is a low-priority VLAN to be removed, the maximum bandwidth of the VLAN to be removed is subtracted from counters BW_LOW and BW_TTL. If it is a high-priority VLAN to be removed, the maximum bandwidth of the VLAN to be removed is subtracted from counters BW_HIGH and BW_TTL. The maximum bandwidth associated with the identified VLAN may be specified by the retrieved service record.

At step 1868, Layer-2 provisioning is performed using the information associated with the identified service record and the service command (e.g., the VLAN identifier). The Layer-2 provisioning at step 1868 may include steps known to those skilled in the art. For example, Layer-2 provisioning may include deleting the VLAN identifier at both ends of the target span 1710. The VLAN identifier is also deleted at the intermediate L-2 network elements 64 (e.g., Layer-2 switches) that are on the span 1710. Further, traffic policing and shaping functions may be deactivated at the access ports associated with the span 1710.

Processing then moves to step 1872, at which step it is determined whether Layer-1 provisioning is invoked by the service command. To make this determination, the service logics module 1434 of the Layer-2 OSS 1230 consults the service provisioning policy module 1438 to determine whether predefined service policies (e.g., oversubscription policies) indicate that Layer-1 provisioning will be invoked. This determination may include one or more comparisons of VLAN bandwidth parameters (e.g., bandwidth counters such as BW_TTL, BW_HIGH, and/or BW_LOW) on one or more affected (i.e., traversed) VLAN spans and/or service command information with predefined conditions and thresholds. For example, Table 3 lists a predefined "remove policy" heuristic for determining whether Layer-1 provisioning will be invoked to remove bandwidth from the target span 1710.

TABLE 3

An Embodiment of a Remove Policy for a W-VLAN Service

If ((BW_PRV >= BW_TTL) AND ((BW_PRV − BW_HIGH) >= 48))
  { if (BW_LOW > 0)
    { if (((BW_PRV − 48 − BW_HIGH) / BW_LOW) > 0.7), then
      RETURN REMOVE;
      else RETURN NONE; }
    else { if ((BW_PRV − 48) >= BW_HIGH), then
      RETURN REMOVE;
      else RETURN NONE; }
  }
RETURN NONE;

As listed in Table 3, a number of comparisons are made to determine whether the service policy module 1438 will return a "REMOVE" or a "NONE" value. When a "REMOVE" value is returned, it will be determined at step 1836 that Layer-1 provisioning will be invoked. Conversely, return of a "NONE" value will lead to a determination at step 1836 that Layer-1 provisioning will not be invoked.

In the service policy example shown in Table 3, it is first determined whether the bandwidth provisioned (BW_PRV) at an indicated target span 1710 is greater than the total bandwidth (BW_TTL) demanded of the target span 1710. If BW_PRV is not greater than BW_TTL, then the first condition is not satisfied and a "NONE" value will be returned to indicate that Layer-1 bandwidth provisioning will not be invoked to remove bandwidth from the target span 1710. Conversely, if BW_PRV is greater than BW-TTL, then an additional condition will be checked. It will be determined whether the difference of bandwidth of high-priority traffic subtracted from the bandwidth provisioned at target span 1710 is greater than or equal to a Layer-1 bandwidth increment. The Layer-1 bandwidth increment may be approximately the amount of bandwidth provided by an STS, which is typically about 50 Mbps. In the embodiment listed in Table 3, this value is predefined as 48 Mbps. If the difference is smaller than approximately the predefined Layer-1 bandwidth increment, the condition is not satisfied and a "NONE" value will be returned because the amount of bandwidth for low-priority traffic is less than the amount of bandwidth provided by a single STS, for example.

On the other hand, if the difference is greater than or equal to the predefined Layer-1 bandwidth increment (e.g., 48 Mbps), another condition will be tested. As listed in Table 3, it will be determined whether the bandwidth for low-priority traffic (BW_LOW) on the target span 1710 is greater than zero. If BW-LOW is greater than zero, then an oversubscription condition will be checked. The oversubscription condition includes determining whether the quotient of the difference of BW_PRV subtract the Layer-1 bandwidth increment (e.g., 48 Mbps) subtract BW_HIGH divided by BW_LOW is greater than a predetermined non-oversubscription threshold (e.g., 0.7 (i.e., 70%) in Table 3). If the quotient is greater than the threshold, then a "REMOVE" value is returned because oversubscription of low-priority traffic is less than the predetermined oversubscription threshold. Otherwise, a "NONE" value is returned to indicate that Layer-1 provisioning will not be invoked.

On the other hand, if it is determined that BW_LOW is not greater than zero, a different condition is checked. As listed in Table 3, it is then determined whether the difference of BW_PRV subtract the Layer-1 bandwidth increment (e.g., 48 Mbps) is greater than or equal to the bandwidth of high-priority traffic (BW_HIGH) on the target span 1710. If it is determined that the difference is greater than or equal to BW_HIGH, then a "REMOVE" value is returned to indicate that Layer-1 provisioning will be invoked to remove bandwidth because, for example, more than one STS is provisioned and can be removed to prevent over-provisioning of resources. Otherwise, a "NONE" value is returned to indicate that Layer-1 provisioning will not be invoked at step 1872.

Thus, from the value returned by the service policy module 1438, it is determined at step 1872 whether Layer-1 provisioning will be invoked. Based on the "remove policy" heuristic described above, if it is determined at step 1872 that Layer-1 provisioning will not be invoked, processing moves to step 1876. At step 1876, successful execution of the "remove VLAN" service request is reported to the requesting client. Also at step 1876, a notice indicating successful bandwidth VLAN removal may be sent to the service requestor (e.g., to the SMS 1208 for forwarding to the client device 1204). The notice may include the VLAN identifier that identifies the target span 1710. At step 1878, the appropriate service record and related databases are updated to reflect the successful bandwidth VLAN removal. The Layer-2 OSS 1230 then waits for another service request.

On the other hand, if it is determined at step 1872, that Layer-1 provisioning will be invoked, processing moves to step 1880. At step 1880, the Layer-2 OSS 1230 sends a "REMOVE" provisioning request to the Layer-1 OSS 1220 to request removal of provisioned bandwidth from the target span 1710. The Layer-2 OSS 1230 then waits for a response from the Layer-1 OSS 1220. As discussed above, the Layer-1 OSS 1220 may function as the NG_OSS 140 of the subsystem 100 to manage removal of bandwidth at Layer 1. The subsystem 100 can remove bandwidth using any of the techniques describe above, including the embodiments shown in FIGS. 10C and 10C. In one embodiment, the Layer-1 provisioning includes removing STSs from spans 1710 of the Layer-2 sub-network shown in FIG. 17A.

The Layer-1 OSS 1220 may generate and send a report of success or failure of the Layer-1 provisioning to the Layer-2 OSS 1230. From this report, the Layer-2 OSS 1230 determines at step 1882 whether the Layer-1 provisioning was successful. If it is determined at step 1882 that Layer-1 provisioning was not successful, processing moves to step 1884. At step 1884, the Layer-2 OSS 1230 reports the failure and a failure code to the requesting client. Processing then move to step 1878, at which step the associated service record is updated. The Layer-2 OSS 1230 then waits for another service request.

If it is determined at step 1882 that Layer-1 provisioning was successful, processing moves to step 1886. At step 1886, a count indicative of the amount of provisioned bandwidth on the target span 1710 is decremented by an amount corresponding with the amount of bandwidth that was removed. For example, in the case that bandwidth in the form of STSs is removed at Layer 1, the parameter STS1_CNT associated with the target span 1710 will be decremented to reflect the total number of STSs that remain provisioned at the span 1710.

Processing then moves to step 1876, which is executed as discussed above to report successful execution of the remove request. Step 1878 is also executed as described above to update the appropriate service record. The Layer-2 OSS 1230 then waits for another service request.

C. An Example of Service Logics for Processing Requests to Modify VLAN Bandwidth from W-VLAN Services As mentioned above, if it is determined at step 1822 of FIG. 18A that the service command indicates a "modify VLAN" service request, processing moves to "C" of FIG. 18D, which Figure illustrates steps for modifying VLAN bandwidth of the W-VLAN service provided by the system 1700 of FIG. 17A, according to one embodiment. The service command should be accompanied by at least a VLAN identifier for identifying a target span 1710 to be modified, as well as a value indicating the amount of bandwidth requested (BW_REQ) for the target span 1710. At step 1910 of FIG. 18D, the Layer-2 OSS 1230 identifies, retrieves, and executes the appropriate Layer-2 service logics for a W-VLAN "modify VLAN" service command. Steps 1914-1934 describe the execution of the retrieved Layer-2 service logics.

At step 1914, the Layer-2 OSS 1230 fetches the particular service record identified by service command. In one embodiment, the VLAN identifier provided with the "modify VLAN" service command identifies a target span 1710 of the VLAN sub-network shown in FIG. 17A.

At step 1918, it is determined whether the requested amount of bandwidth is higher or lower than the bandwidth currently provided on the target span 1710. Step 1918 may include comparing the amount of requested bandwidth (BW REQ) with the amount of already-provisioned bandwidth (BW_PRV) on the target span 1710. If it is determined at step 1918 that the requested amount of bandwidth is equal to the already-provisioned bandwidth on the target span 1710, processing moves to step 1920, at which step a failure report and a failure code are generated and provided to the requesting client. The Layer-2 OSS 1230 then waits for another service request.

Figure 18E:
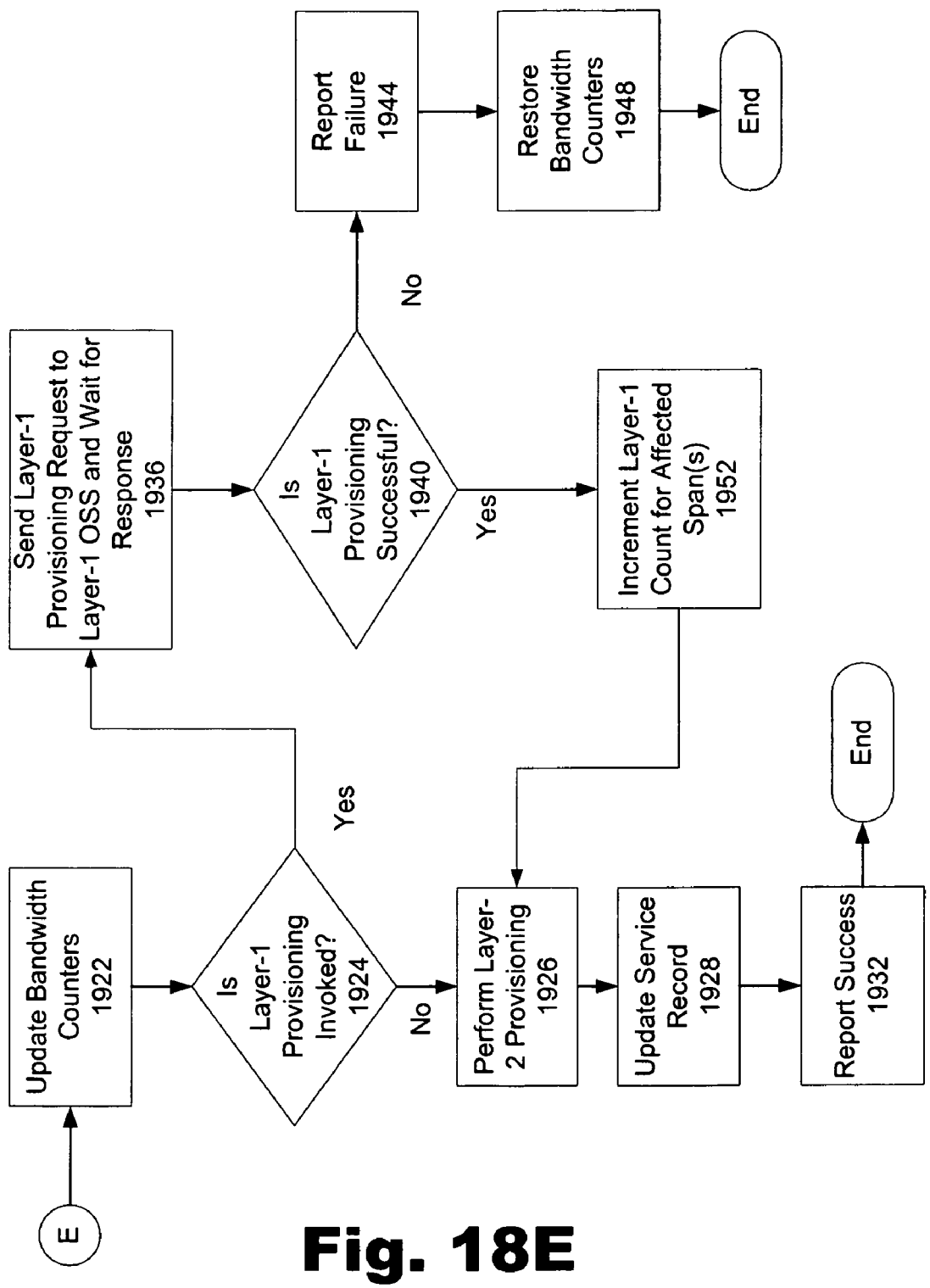
FIG. 18E is a flowchart illustrating steps for increasing bandwidth for the W-VLAN service of FIGS. 17A and 17B, according to one embodiment.

If it is determined at step 1918 that the requested amount of bandwidth is higher than the currently provided bandwidth on the target span 1710, processing moves to "E" of FIG. 18E. On the other hand, if it is determined at step 1918 that the requested amount of bandwidth is lower than the currently provided bandwidth on the target span 1710, processing moves to "F" of FIG. 18F.

FIG. 18E illustrates steps for increasing VLAN bandwidth of the W-VLAN service provided by the system 1700 of FIGS. 17A and 17B, according to one embodiment. At step 1922, appropriate bandwidth counters (e.g., BW_TTL, BW_LOW, and/or BW_HIGH) are updated to reflect an addition of the requested additional bandwidth to the VLAN being modified.

At step 1924, it is determined whether Layer-1 provisioning is invoked by the "modify VLAN" service command. To make this determination, the service logics module 1434 of the Layer-2 OSS 1230 consults the service provisioning policy module 1438 to determine whether predefined service policies (e.g., over-subscription policies) indicate that Layer-1 provisioning will be invoked. This determination may include one or more comparisons of VLAN bandwidth parameters (e.g., bandwidth counters such as BW_TTL, BW_HIGH, and/or BW_LOW) on one or more affected (i.e., traversed) VLAN spans and/or service command information with predefined conditions and thresholds. For example, the "add policy" heuristic of Table 2 may be used to determine whether Layer-1 provisioning will be invoked to add requested bandwidth to the identified VLAN, according to one embodiment, as discussed above.

If it is determined at step 1924 that Layer-1 provisioning will not be invoked, processing moves to step 1926, at which step Layer-2 provisioning is performed to adjust traffic policing and shaping functions at the access ports of the VLAN endpoints. Processing then moves to step 1928. At step 1928, the service record associated with the service request is updated. At step 1932, successful VLAN modification is reported to the service requestor.

On the other hand, if it is determined at step 1924 that Layer-1 provisioning will be invoked, processing moves to step 1936. At step 1936, a Layer-1 provisioning request is sent to the Layer-1 OSS 1220. Also at step 1936, the Layer-2 OSS 1230 waits for a response from the Layer-1 OSS 1220. When a response is received, processing continues at step 1940.

At step 1940, it is determined, based on the response received from the Layer-1 OSS 1220, whether Layer-1 provisioning is successful. If it is determined at step 1940 that Layer-1 provisioning is not successful, processing moves to step 1944, at which step a "modify VLAN" failure and associated failure code are reported. At step 1948, the bandwidth counters that were updated in step 1922 are restored to their previous settings.

On the other hand, if it is determined at step 1940 that Layer-1 provisioning is successful, processing moves to step 1952. At step 1952, a Layer-1 count is incremented to reflect additional bandwidth that was added to a span at Layer 1. For example, STS1_CNT may be incremented by the number of STS1s that were added to the span. Processing then moves to step 1926 to reconfigure traffic policing and shaping mechanisms for the new bandwidth. At step 1928, the service record associated with the "modify VLAN" service request is updated to reflect the changes. At step 1932, a successful "modify VLAN" report is provided.

Figure 18F:
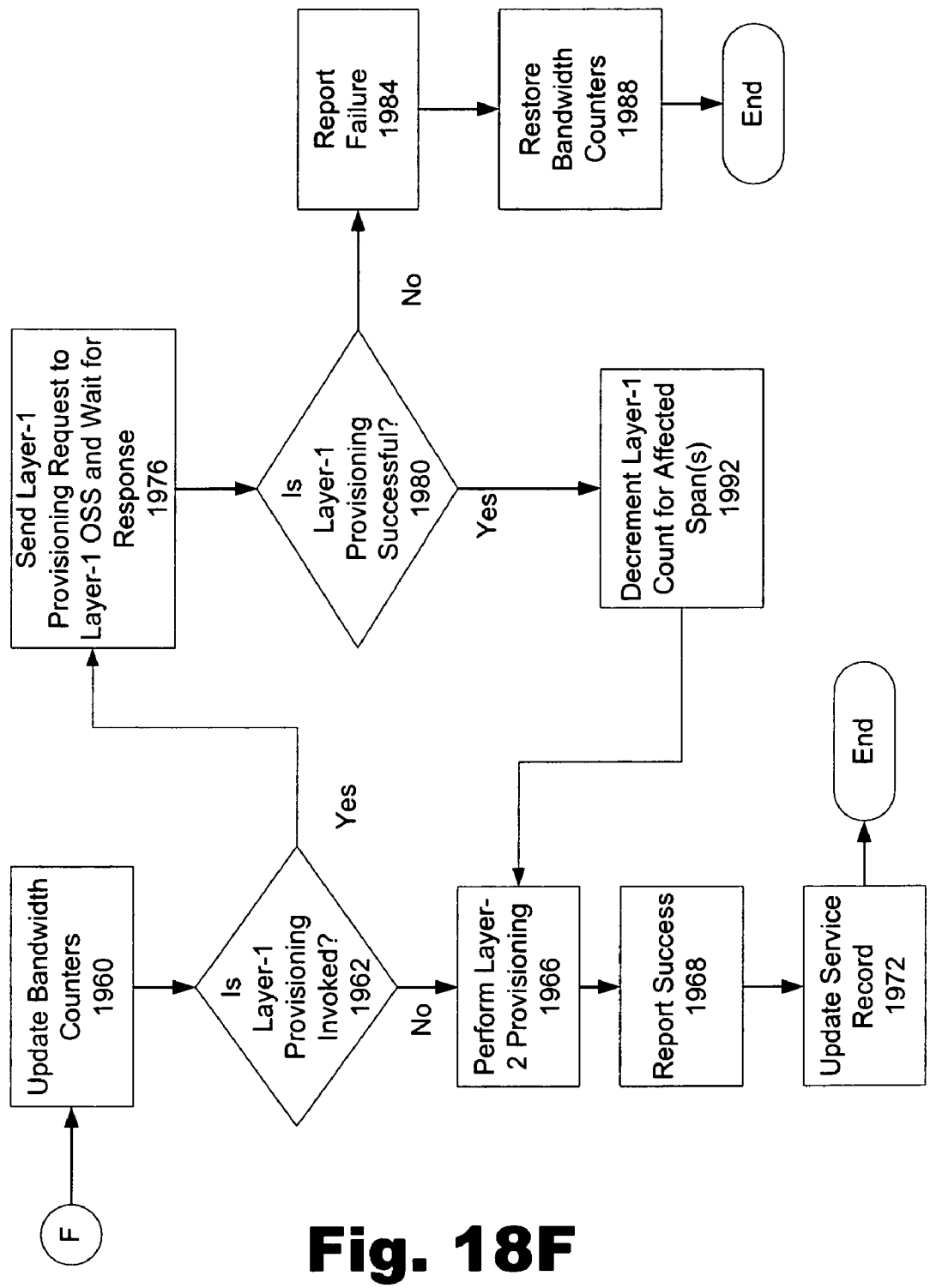
FIG. 18F is a flowchart illustrating steps for decreasing bandwidth for the W-VLAN service of FIGS. 17A and 17B, according to one embodiment.

For a request to decrease bandwidth of a VLAN, the steps shown in FIG. 18F may be performed. FIG. 18F illustrates steps for decreasing VLAN bandwidth of the W-VLAN service provided by the system 1700 of FIGS. 17A and 17B, according to one embodiment. At step 1960, appropriate bandwidth counters (e.g., BW_TTL, BW_LOW, and/or BW_HIGH) are updated (decremented) to reflect a removal of the requested amount of bandwidth from the VLAN being modified.

At step 1962, it is determined whether Layer-1 provisioning is invoked by the "modify VLAN" service command. To make this determination, the service logics module 1434 of the Layer-2 OSS 1230 consults the service provisioning policy module 1438 to determine whether predefined service policies (e.g., over-subscription policies) indicate that Layer-1 provisioning will be invoked. This determination may include one or more comparisons of VLAN bandwidth parameters (e.g., bandwidth counters such as BW_TTL, BW_HIGH, and/or BW_LOW) on one or more affected (i.e., traversed) VLAN spans and/or service command information with predefined conditions and thresholds. For example, the "remove policy" heuristic of Table 3 may be used to determine whether Layer-1 provisioning will be invoked to remove bandwidth from the identified VLAN, according to one embodiment, as discussed above.

If it is determined at step 1962 that Layer-1 provisioning will not be invoked, processing moves to step 1966, at which step Layer-2 provisioning is performed to adjust traffic policing and shaping functions at the access ports of the VLAN endpoints. Processing then moves to step 1968. At step 1968, the service record associated with the service request is updated. At step 1972, successful VLAN modification is reported to the service requestor.

On the other hand, if it is determined at step 1962 that Layer-1 provisioning will be invoked, processing moves to step 1976. At step 1976, a Layer-1 provisioning request is sent to the Layer-1 OSS 1220. Also at step 1976, the Layer-2 OSS 1230 waits for a response from the Layer-1 OSS 1220. When a response is received, processing continues at step 1980.

At step 1980, it is determined, based on the response received from the Layer-1 OSS 1220, whether Layer-1 provisioning is successful. If it is determined at step 1980 that Layer-1 provisioning is not successful, processing moves to step 1984, at which step a "modify VLAN" failure and associated failure code are reported. At step 1988, the bandwidth counters that were updated in step 1960 are restored to their previous settings.

On the other hand, if it is determined at step 1980 that Layer-1 provisioning is successful, processing moves to step 1992. At step 1992, a Layer-1 count is decremented to reflect the bandwidth that was removed from a span at Layer 1. For example, STS1_CNT may be decremented by the number of STS1s that were removed from the span. Processing then moves to step 1966, at which step Layer-2 traffic policing and shaping are adjusted at the access ports of the VLAN endpoints. At step 1968, a successful "modify VLAN" report is provided. At step, 1972, the service record associated with the "modify VLAN" service request is updated to reflect the changes.

The embodiment of the W-VLAN service described above, including its service logics for adding, removing, and modifying bandwidth VLAN based on predefined service policies is merely illustrative of a particular class of service that is enabled by the system 1200. The system 1200 is able to support many additional types and classes of services. Service logics and service policies may be defined to create such services. These services are able to provide robust and flexible on-demand provisioning of optical transport bandwidth to clients by utilizing the on-demand bandwidth provisioning features of the Layer-1 subsystem 100. Services at higher layers (e.g., Layer 2 and Layer 3) may be interfaced with Layer-1 provisioning functions by the integrated multi-service OSS 1210. This multi-layer management interface allows bandwidth-on-demand features to be utilized to maintain QoS levels of services at various network functional layers 30, including Layer-2 and Layer-3 services.

VIII. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
   a multiple layer-specific operation support subsystem (OSS) including at least one predefined bandwidth provisioning policy, said multiple layer-specific OSS further including:
   a lower layer operation support subsystem configured to manage a plurality of network elements forming a sub-network over an optical transport network having bandwidth-on-demand provisioning capabilities; and
   a higher layer operation support subsystem in communication with said lower layer operation support subsystem and configured to selectively request on-demand provisioning of bandwidth on said sub-network from said lower layer operation support subsystem based on said predefined bandwidth provisioning policy.

2. The system of claim 1, wherein said at least one predefined bandwidth provisioning policy includes at least a subset of a service provisioning policy and a QoS-triggered provisioning policy.

3. The system of claim 2, wherein said service provisioning policy includes at least a subset of an add policy, a remove policy, and an oversubscription policy.

4. The system of claim 2, wherein said QoS-triggered provisioning policy includes at least one predefined QoS event configured to trigger said selective request of on-demand provisioning of bandwidth on said sub-network.

5. The system of claim 4, wherein said QoS event includes at least a subset of link utilization rate, a queue length, or a packet loss rate exceeding a predetermined maximum threshold or falling below a predetermined minimum threshold for at least a predefined time period.

6. The system of claim 1, wherein said layer-specific OSS is configured to request on-demand provisioning of additional bandwidth on said sub-network responsive to said at least one predefined bandwidth provisioning policy indicating that traffic demand on at least one span of said sub-network has exceeded a level of bandwidth already provided for said span.

7. The system of claim 1, wherein said layer-specific OSS is configured to request on-demand provisioning to remove bandwidth from said sub-network responsive to said at least one predefined bandwidth provisioning policy indicating that traffic demand is less than a level of bandwidth already provided for at least one span of said sub-network by at least a minimum incremental amount of bandwidth that will be removed from said span.

8. The system of claim 1, wherein said sub-network supports both high-priority traffic and low-priority traffic, and said higher layer OSS is configured to request on-demand provisioning of additional bandwidth on said sub-network responsive to said at least one predefined bandwidth provisioning policy indicating that the low-priority traffic is oversubscribed at a level that exceeds a predefined oversubscription threshold.

9. The system of claim 8, wherein said higher layer OSS is configured to request on-demand provisioning of additional bandwidth on said sub-network responsive to said at least one predefined bandwidth provisioning policy indicating that high-priority traffic demand exceeds a level of bandwidth already provided for at least one span of said sub-network.

10. The system of claim 8, wherein said higher layer OSS is configured to request on-demand provisioning to remove bandwidth from said sub-network in response to said at least one predefined bandwidth provisioning policy indicating that if a minimum incremental amount of bandwidth is removed from said at least one span of said sub-network, the low-priority traffic demand for said at least one span will still be less than said predefined oversubscription threshold by at least said minimum incremental amount of bandwidth that will be removed from said at least one span, and the high-priority traffic will still have reserved bandwidth on said at least one span.

11. The system of claim 8, wherein said higher layer OSS is configured to request on-demand provisioning to remove bandwidth from said sub-network responsive to said at least one predefined bandwidth provisioning policy indicating that high-priority traffic demand on said at least one span of said sub-network is less than a level of bandwidth already provided for said at least one span by at least a minimum incremental amount of bandwidth that will be removed from said at least one span.

12. The system of claim 1, wherein said higher layer OSS is configured to request on-demand provisioning of additional bandwidth on said sub-network responsive to said at least one predefined bandwidth provisioning policy indicating that at least one QoS parameter associated with said sub-network has exceeded a predefined QoS maximum threshold for at least a predefined time period.

13. The system of claim 1, wherein said higher layer OSS is configured to request on-demand provisioning to remove bandwidth from said sub-network responsive to said at least one predefined bandwidth provisioning policy indicating that at least one QoS parameter associated with said sub-network has been less than a predefined QoS minimum threshold for at least a predetermined time period.

14. A system comprising:
a physical layer (Layer-1) operation support subsystem (OSS) configured to manage a plurality of Layer-1 network elements of a next-generation optical transport network (NG-OTN), the NG-OTN including an intelligent control plane (ICP) and new-generation synchronous optical network (NG-SONET) capabilities configured to provide bandwidth-on-demand provisioning capabilities; and
at least one other layer-specific OSS communicatively coupled to said Layer-1 OSS, said at least one other layer-specific OSS including at least one predefined bandwidth provisioning policy;
said at least one other layer-specific OSS being configured to communicate with said Layer-1 OSS to selectively request that bandwidth-on-demand provisioning actions be performed, based on said at least one predefined bandwidth provisioning policy.

15. The system of claim 14, wherein said at least one predefined bandwidth provisioning policy includes at least a subset of a service provisioning policy and a QoS-triggered provisioning policy.

16. The system of claim 15, wherein said service provisioning policy includes at least a subset of an add policy, a remove policy, and an oversubscription policy.

17. The system of claim 15, wherein said QoS-triggered provisioning policy includes at least one predefined QoS event configured to trigger said selective request of on-demand provisioning of bandwidth on said sub-network.

18. The system of claim 17, wherein said QoS event includes at least a subset of a link utilization rate, a queue length, or a packet loss rate exceeding a predetermined maximum threshold or falling below a predetermined minimum threshold for at least a predefined time period.

19. The system of claim 14, wherein at least a subset of said plurality of Layer-1 network elements is configured to form a sub-network on the NG-OTN, said sub-network being configured to support a service defined by said at least one other layer-specific OSS.

20. The system of claim 19, wherein said at least one other layer-specific OSS is configured to request that said bandwidth-on-demand provisioning actions be invoked to add bandwidth to said sub-network responsive to said at least one predefined bandwidth provisioning policy indicating that traffic demand on at least one span of said sub-network has exceeded a level of bandwidth already provided for said span of said sub-network.

21. The system of claim 19, wherein said at least one other layer-specific OSS is configured to request that said bandwidth-on-demand provisioning actions be invoked to remove bandwidth from said sub-network responsive to said at least one predefined bandwidth provisioning policy indicating that traffic demand is less than a level of bandwidth already provided for at least one span of said sub-network by at least a minimum incremental amount of bandwidth that will be removed from said sub-network by said bandwidth-on-demand provisioning actions.

22. The system of claim 19, wherein said at least one predefined bandwidth provisioning policy includes an oversubscription policy configured to indicate whether traffic demand on at least one span of said sub-network exceeds a predefined oversubscription threshold.

23. The system of claim 22, wherein said sub-network supports both high-priority traffic and low-priority traffic, and said at least one other layer-specific OSS on said sub-network is configured to request that said bandwidth-on-demand provisioning actions be invoked to add bandwidth to said sub-network in response to said at least one predefined bandwidth provisioning policy indicating that high-priority traffic demands are met and that the low-priority traffic is oversubscribed at a level that exceeds said predefined oversubscription threshold.

24. The system of claim 22, wherein said at least one other layer-specific OSS is configured to request that said bandwidth-on-demand provisioning actions be invoked to add bandwidth to said sub-network responsive to said at least one predefined bandwidth provisioning policy indicating that the high-priority traffic demands are met, but demand on said at least one span of said sub-network exceeds a level of bandwidth already provided for said at least one span.

25. The system of claim 22, wherein said at least one other layer-specific OSS is configured to request that said bandwidth-on-demand provisioning actions be invoked to remove bandwidth from said sub-network responsive to said at least one predefined bandwidth provisioning policy indicating that if a minimum incremental amount of bandwidth is removed from said at least one span of said sub-network, the low-priority traffic demand for said at least one span will still be less than said predefined oversubscription threshold by at least said minimum incremental amount of bandwidth that will be removed from said at least one span, and the high-priority traffic will still have reserved bandwidth on said at least one span.

26. The system of claim 19, wherein said sub-network comprises a plurality of virtual local area networks (VLANs) arranged to form one or more paths between Layer-2 network elements.

27. The system of claim 19, wherein said at least one other layer-specific OSS is configured to request that said bandwidth-on-demand provisioning actions be invoked to add bandwidth to said sub-network responsive to said at least one predefined bandwidth provisioning policy indicating that at least one QoS parameter associated with said sub-network has exceeded a predefined QoS maximum threshold for at least a predetermined time period.

28. The system of claim 19, wherein said at least one other layer-specific OSS is configured to request that said bandwidth-on-demand provisioning actions be invoked to remove bandwidth from said sub-network responsive to said at least one predefined bandwidth provisioning policy indicating that at least one QoS parameter associated with said sub-network has been less than a predefined QoS minimum threshold for at least a predetermined time period.

29. The system of claim 14, wherein said at least one other layer-specific OSS includes at least one of a Layer-2 OSS and a Layer-3 OSS, said Layer-2 OSS being configured to manage a plurality of Layer-2 network elements, and said Layer-3 OSS being configured to manage a plurality of Layer-3 network elements.

30. A system for providing multi-layer bandwidth-on-demand services over an optical transport core network, the system comprising:
    a next-generation optical transport network (NG-OTN) including an intelligent control plane (ICP) and new-generation synchronous optical network (NG-SONET) capabilities, said NG-OTN further including a plurality of Layer-1 network elements configured to form one or more physical layer paths over said NG-OTN;
    a sub-network formed on said NG-OTN by at least a subset of said plurality of Layer-1 network elements, said sub-network being configured to support a service at a layer other than the physical layer; and
    a multi-layer operation support subsystem (OSS) including a physical layer (Layer-1) OSS and at least one other layer-specific OSS communicatively connected to each other, said Layer-1 OSS being configured to manage said plurality of Layer-1 network elements to provide bandwidth-on-demand provisioning capabilities, and said at least one other layer-specific OSS including at least one predefined bandwidth provisioning policy;
    whereby said at least one other layer-specific OSS is configured to communicate with said Layer-1 OSS to selectively request, based on said at least one predefined bandwidth provisioning policy, that bandwidth-on-demand provisioning actions be performed to provision bandwidth for use by said sub-network to support said service.

* * * * *